United States Patent
Choi et al.

(10) Patent No.: US 11,012,699 B2
(45) Date of Patent: May 18, 2021

(54) METHOD FOR DECODING IMAGE ON BASIS OF CCLM PREDICTION IN IMAGE CODING SYSTEM, AND DEVICE THEREFOR

(71) Applicant: LG ELECTRONICS INC., Seoul (KR)

(72) Inventors: Jangwon Choi, Seoul (KR); Jin Heo, Seoul (KR); Seunghwan Kim, Seoul (KR); Sunmi Yoo, Seoul (KR); Ling Li, Seoul (KR); Jungah Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/892,095

(22) Filed: Jun. 3, 2020

(65) Prior Publication Data
US 2020/0296391 A1 Sep. 17, 2020

Related U.S. Application Data

(63) Continuation of application No. PCT/KR2019/015253, filed on Nov. 11, 2019.
(Continued)

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/136* (2014.11); *H04N 19/176* (2014.11)

(58) Field of Classification Search
CPC .... H04N 19/105; H04N 19/186; H04N 19/59; H04N 19/593
See application file for complete search history.

(56) References Cited

U.S. PATENT DOCUMENTS

2012/0328013 A1* 12/2012 Budagavi ............... H04N 19/59
375/240.12
2014/0003512 A1* 1/2014 Sato ..................... H04N 19/157
375/240.12
(Continued)

FOREIGN PATENT DOCUMENTS

KR 101756843 B1 7/2017
KR 20170107448 A 9/2017
(Continued)

OTHER PUBLICATIONS

Zhang, et. al., Enhanced Cross-Component Linear Model for Chroma Intra-Prediction in Video Coding, Aug. 2018, IEEE Transaction on Image Processing, vol. 27, No. 8, Aug. 2018, pp. 3983-3997 (Year: 2018).*
(Continued)

*Primary Examiner* — Jayanti K Patel
*Assistant Examiner* — Christopher Kingsbury Glover
(74) *Attorney, Agent, or Firm* — Dentons US LLP

(57) ABSTRACT

A video decoding method performed by a decoding apparatus according to the present disclosure includes deriving one of a plurality of cross-component linear model (CCLM) prediction mode as a CCLM prediction mode of the current chroma block, deriving a sample number of neighboring chroma samples of the current chroma block based on the CCLM prediction mode of the current chroma block, a size of the current chroma block, and a specific value; deriving the neighboring chroma samples of the sample number, calculating CCLM parameters based on the neighboring chroma samples and the down sampled neighboring luma
(Continued)

samples, deriving prediction samples for the current chroma block based on the CCLM parameters and the down sampled luma samples and generating reconstructed samples for the current chroma block based on the prediction samples, wherein the specific value is derived as 2.

18 Claims, 43 Drawing Sheets

Related U.S. Application Data

(60) Provisional application No. 62/770,835, filed on Nov. 23, 2018.

(51) Int. Cl.
*H04N 19/136* (2014.01)
*H04N 19/176* (2014.01)

(56) References Cited

U.S. PATENT DOCUMENTS

2016/0277762 A1* 9/2016 Zhang .................. H04N 19/167
2018/0205946 A1* 7/2018 Zhang .................. H04N 19/136
2020/0359051 A1* 11/2020 Zhang .................. H04N 19/186

FOREIGN PATENT DOCUMENTS

| KR | 20170129750 A | 11/2017 |
| KR | 1020180110201 A | 10/2018 |

OTHER PUBLICATIONS

Junru Li, et.al., Sub-Sampled Cross-Component Prediction for Chroma Component Coding, Mar. 24-27, 2020, IEEE, 2020 DCC, pp. 203-212 (Year: 2020).*

* cited by examiner

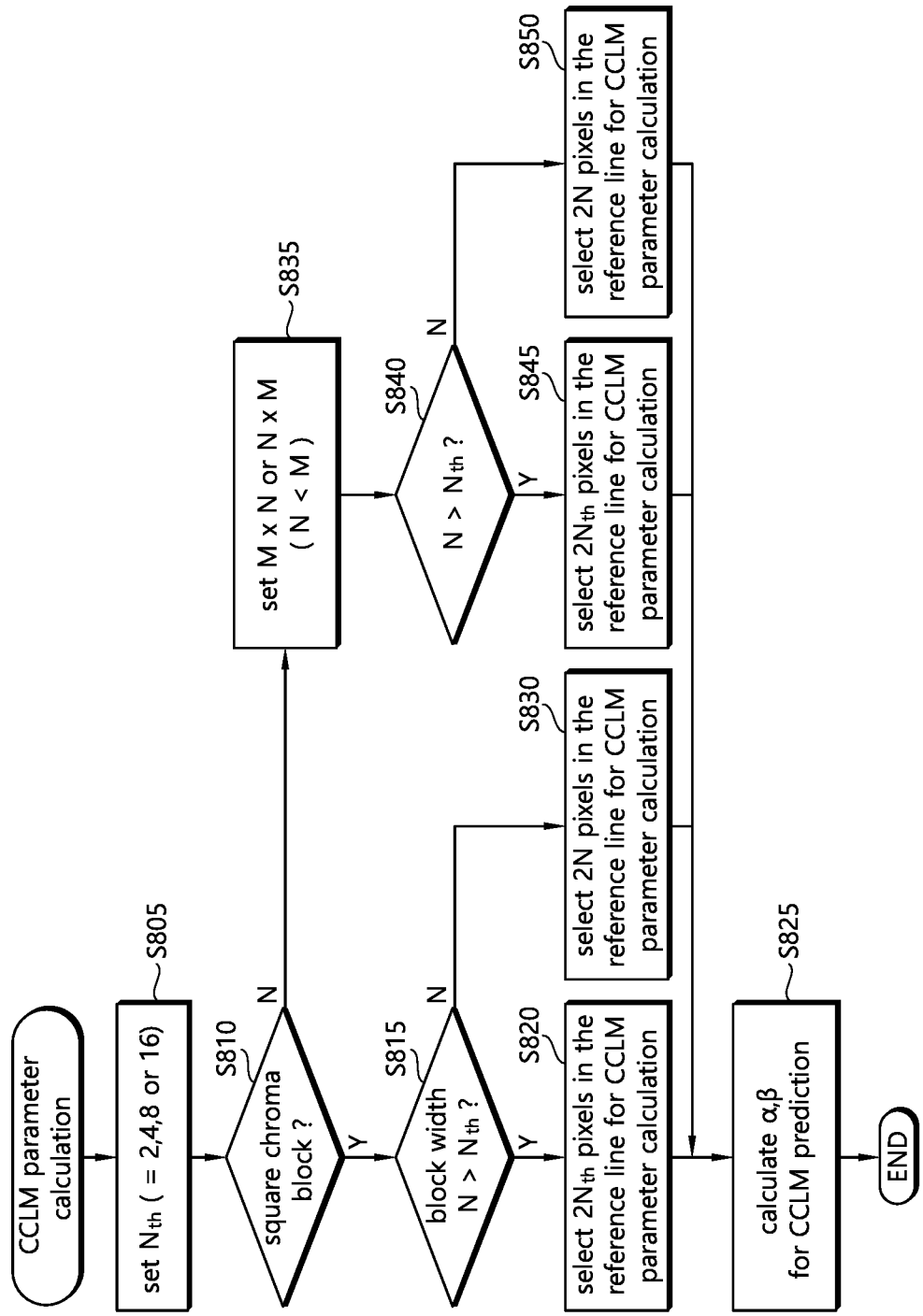

downsampled Y          Cb / Cr previous reference subsampling method downsampled Y          Cb / Cr proposed reference subsampling method downsampled Y   Cb / Cr previous reference subsampling method downsampled Y   Cb / Cr proposed reference subsampling method downsampled Y   Cb / Cr previous reference subsampling method downsampled Y   Cb / Cr proposed reference subsampling method

[Table 2]

METHOD FOR DECODING IMAGE ON BASIS OF CCLM PREDICTION IN IMAGE CODING SYSTEM, AND DEVICE THEREFOR

CROSS-REFERENCE TO RELATED APPLICATION

Pursuant to 35 U.S.C. § 119(e), this application is a continuation of International Application PCT/KR2019/015253, with an international filing date of Nov. 11, 2019, which claims the benefit of U.S. Provisional Patent Application No. 62/770,835 filed on Nov. 23, 2018, the contents of which are hereby incorporated by reference herein in its entirety.

BACKGROUND OF THE DISCLOSURE

Field of the Disclosure

The present disclosure relates to a video coding technique, and more particularly, to a video decoding method and device based on CCLM prediction in a video coding system.

Related Art

Recently, demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and device for improving image coding efficiency.

The present disclosure also provides a method and device for improving intra-prediction efficiency.

The present disclosure also provides a method and device for improving intra-prediction efficiency based on Cross Component Linear Model (CCLM).

The present disclosure also provides an efficient encoding and decoding method of CCLM prediction including a plurality of CCLM prediction modes, and a device for performing the encoding and decoding method.

The present disclosure also provides a method and device for selecting a neighboring sample for deriving a linear model parameter for a plurality of CCLM prediction modes.

According to an embodiment of the present disclosure, a video decoding method performed by a decoding apparatus is provided. The method includes obtaining video information comprising prediction mode information for a current chroma block, deriving one of a plurality of cross-component linear model (CCLM) prediction mode as a CCLM prediction mode of the current chroma block, deriving a sample number of neighboring chroma samples of the current chroma block based on the CCLM prediction mode of the current chroma block, a size of the current chroma block, and a specific value; deriving the neighboring chroma samples of the sample number, deriving down sampled neighboring luma samples and down sampled luma samples of a current luma block, wherein the neighboring luma samples correspond to the neighboring chroma samples, calculating CCLM parameters based on the neighboring chroma samples and the down sampled neighboring luma samples, deriving prediction samples for the current chroma block based on the CCLM parameters and the down sampled luma samples and generating reconstructed samples for the current chroma block based on the prediction samples, wherein the specific value is derived as 2.

According to another embodiment of the present disclosure, a decoding apparatus for performing video decoding is provided. The decoding apparatus includes an entropy decoder for obtaining video information comprising prediction mode information for a current chroma block, a predictor for deriving one of a plurality of cross-component linear model (CCLM) prediction mode as a CCLM prediction mode of the current chroma block, deriving a sample number of neighboring chroma samples of the current chroma block based on the CCLM prediction mode of the current chroma block, a size of the current chroma block, and a specific value; deriving the neighboring chroma samples of the sample number, deriving down sampled neighboring luma samples and down sampled luma samples of a current luma block, wherein the neighboring luma samples correspond to the neighboring chroma samples, calculating CCLM parameters based on the neighboring chroma samples and the down sampled neighboring luma samples, deriving prediction samples for the current chroma block based on the CCLM parameters and the down sampled luma samples, and a subtractor for generating reconstructed samples for the current chroma block based on the prediction samples, wherein the specific value is derived as 2.

According to still another embodiment of the present disclosure, a video encoding method performed by an encoding apparatus is provided. The method includes determining a cross-component linear model (CCLM) prediction mode among a plurality of CCLM prediction modes; deriving a sample number of neighboring chroma samples of the current chroma block based on the CCLM prediction mode of the current chroma block, a size of the current chroma block, and a specific value; deriving the neighboring chroma samples of the sample number; deriving down sampled neighboring luma samples and down sampled luma samples of a current luma block, wherein the neighboring luma samples correspond to the neighboring chroma samples; calculating CCLM parameters based on the neighboring chroma samples and the down sampled neighboring luma samples; deriving prediction samples for the current chroma block based on the CCLM parameters and the down sampled luma samples; and encoding video information including prediction mode information for the current chroma block, wherein the specific value is derived as 2.

According to still another embodiment of the present disclosure, a video encoding apparatus is provided. The encoding apparatus includes a predictor for determining a cross-component linear model (CCLM) prediction mode among a plurality of CCLM prediction modes, deriving a sample number of neighboring chroma samples of the current chroma block based on the CCLM prediction mode of the current chroma block, a size of the current chroma block, and a specific value, deriving the neighboring chroma samples of the sample number, deriving down sampled neighboring luma samples and down sampled luma samples of a current luma block, wherein the neighboring luma samples correspond to the neighboring chroma samples, deriving CCLM parameters based on the neighboring chroma samples and the down sampled neighboring luma samples, deriving prediction samples for the current chroma block based on the CCLM parameters and the down sampled luma samples and an entropy encoder for encoding video information including prediction mode information for the current chroma block, wherein the specific value is derived as 2.

According to the present disclosure, overall image/video compression efficiency can be improved.

According to the present disclosure, the efficiency of intra-prediction can be improved.

According to the present disclosure, the image coding efficiency can be improved by performing an intra-prediction based on CCLM.

According to the present disclosure, the efficiency of intra-prediction can be improved, which is based on CCLM including a plurality of LM modes, that is, multi-directional Linear Model (MDLM).

According to the present disclosure, the number of neighboring samples selected for deriving a linear model parameter for multi-directional Linear Model (MDLM) performed in a chroma block having a great size is limited to a specific number, and accordingly, intra-prediction complexity can be reduced.

BRIEF DESCRIPTION OF THE DRAWINGS

FIGS. 8a and 8b are diagrams for describing a procedure of performing CCLM prediction for a current chroma block according to an embodiment.

DESCRIPTION OF EXEMPLARY EMBODIMENTS

Figure 1:
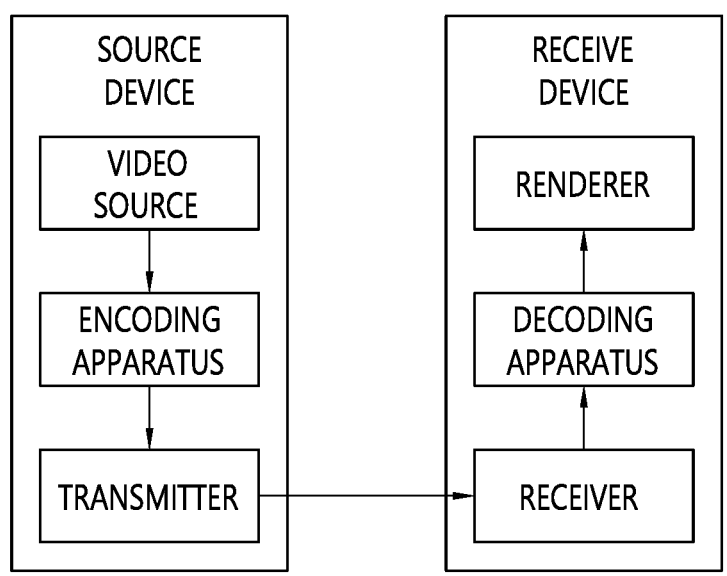
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
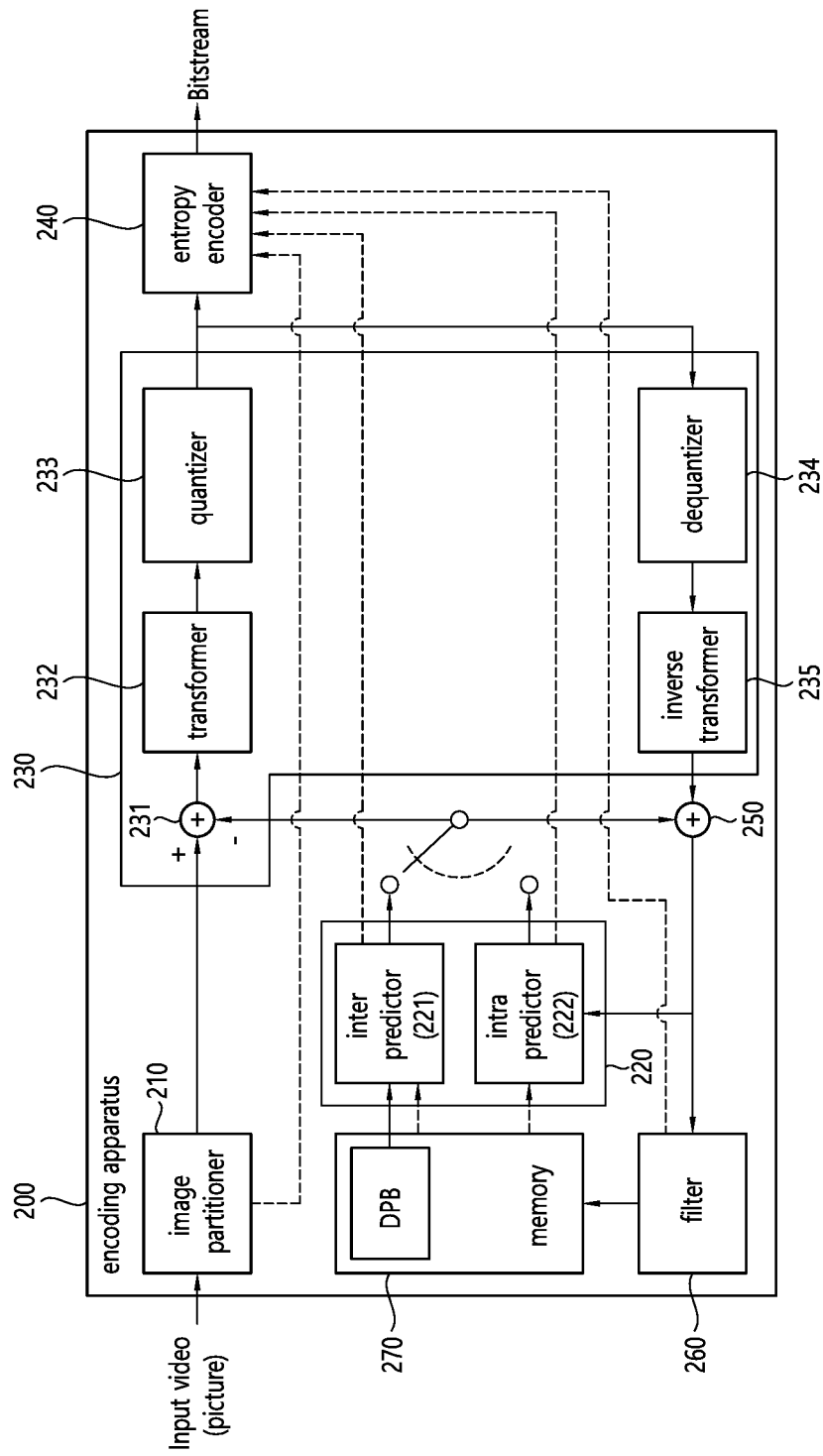
FIG. 2 is a schematic diagram illustrating a configuration of a video/image encoding apparatus to which the embodiment(s) of the present document may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
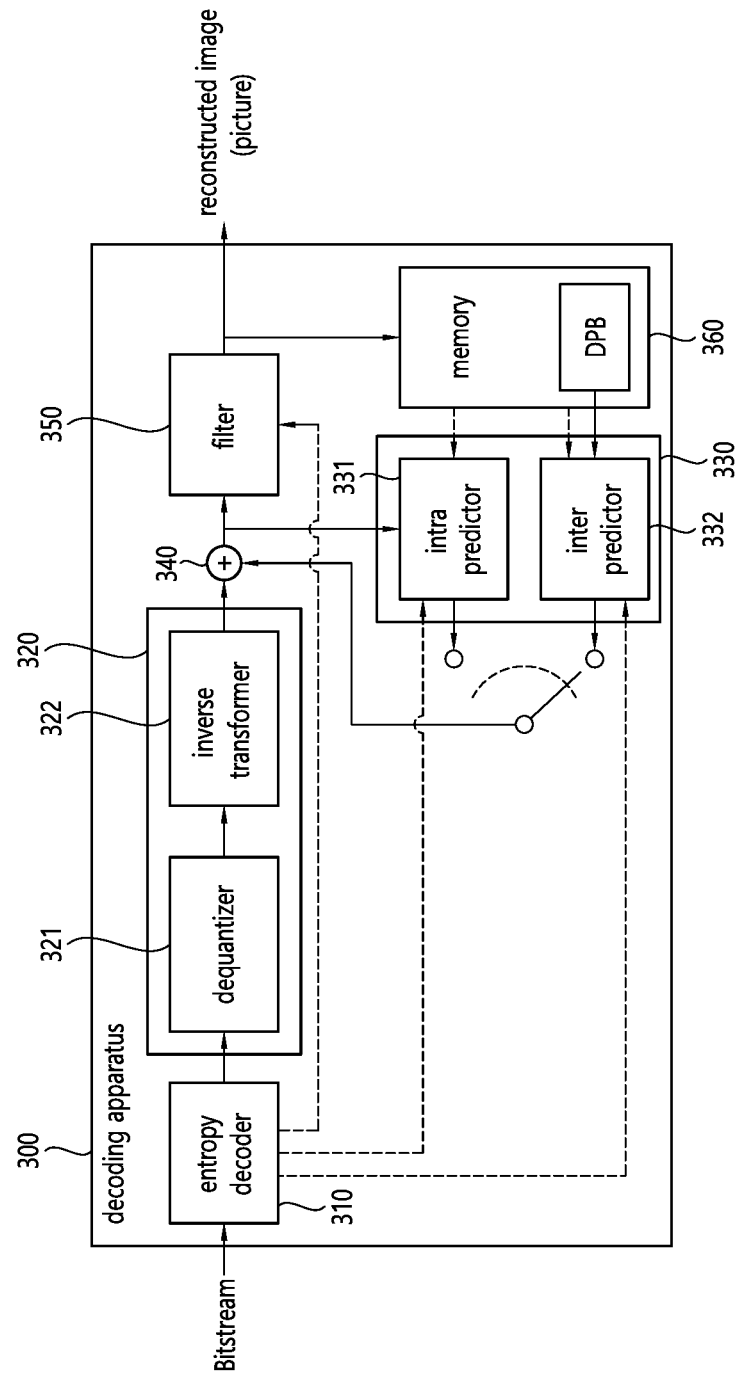
FIG. 3 is a schematic diagram illustrating a configuration of a video/image decoding apparatus to which the embodiment(s) of the present document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, in performing video coding, a prediction is performed to enhance compression efficiency. Accordingly, a prediction block including prediction samples for a current block, that is, a coding target block, may be generated. In this case, the predicted block includes prediction samples in a spatial domain (or pixel domain). The prediction block is identically derived in the encoding apparatus and the decoding apparatus. The encoding apparatus may improve image coding efficiency by signaling residual information on a residual between an original block and the predicted block not an original sample value of the original block itself to the decoding apparatus. The decoding apparatus may derive a residual block including residual samples based on the residual information, may generate a reconstructed block including reconstructed samples by adding up the residual block and the prediction block, and may generate a reconstructed picture including the reconstructed block.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bit stream). In this case, the residual information may include information, such as value information, location information, a transform scheme, a transform kernel and a quantization parameter of the quantized transform coefficients. The decoding apparatus may perform a dequantization/inverse transform procedure based on the residual information and may derive the residual samples (or residual block). The decoding apparatus may generate the reconstructed picture based on the prediction block and the residual block. The encoding apparatus may also derive the residual block by performing a dequantization/inverse transform on the quantized transform coefficients for the reference of inter prediction of a subsequent picture and may generate the reconstructed picture based on the residual block.

Figure 4:
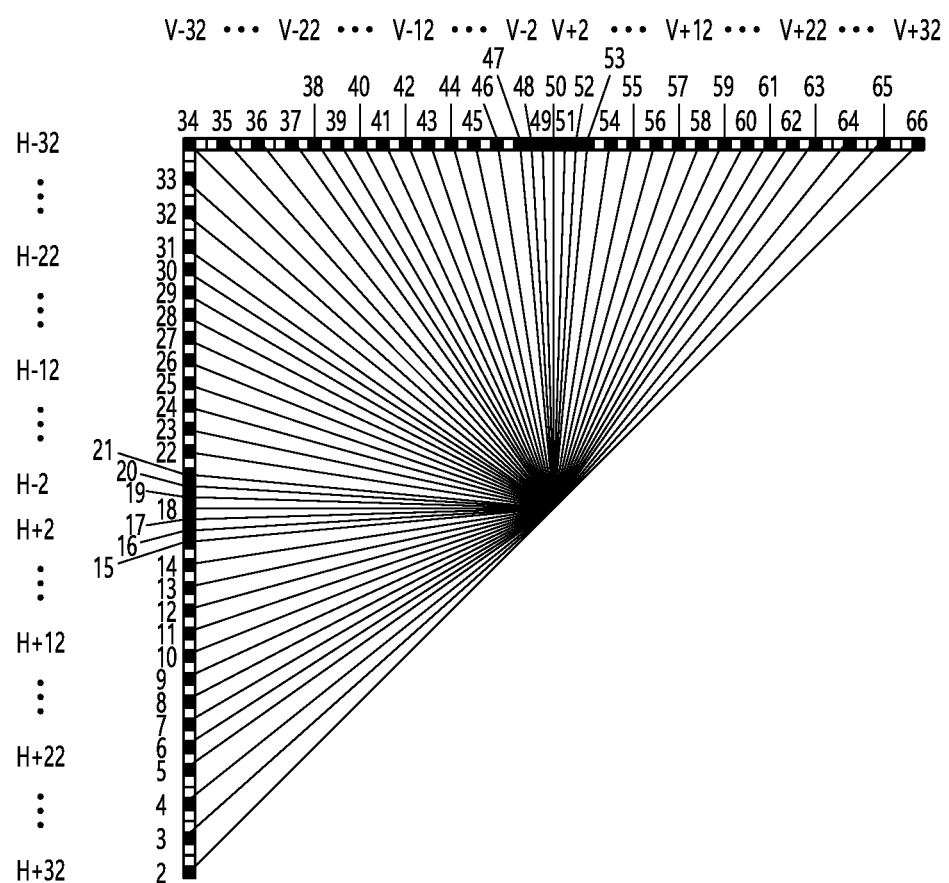
FIG. 4 illustrates intra-directional modes of 65 prediction directions.

FIG. 4 illustrates intra-directional modes of 65 prediction directions.

Referring to FIG. 4, intra-prediction modes having horizontal directionality and intra-prediction modes having vertical directionality may be classified based on an intra-prediction mode #34 having an upper left diagonal prediction direction. H and V in FIG. 3 represent the horizontal directionality and the vertical directionality, respectively, and the numbers from −32 to 32 represent displacements of 1/32 unit on sample grid positions. Intra-prediction modes #2 to #33 have the horizontal directionality and intra-prediction modes #34 to #66 have the vertical directionality. Intra-prediction mode #18 and intra-prediction mode #50 represent a horizontal intra-prediction mode and a vertical intra-prediction mode, respectively. Intra-prediction modes #2 may be called a lower left diagonal intra-prediction mode, intra-prediction mode #34 may be called an upper left diagonal intra-prediction mode and intra-prediction mode #66 may be called an upper right diagonal intra-prediction mode.

Figure 5:
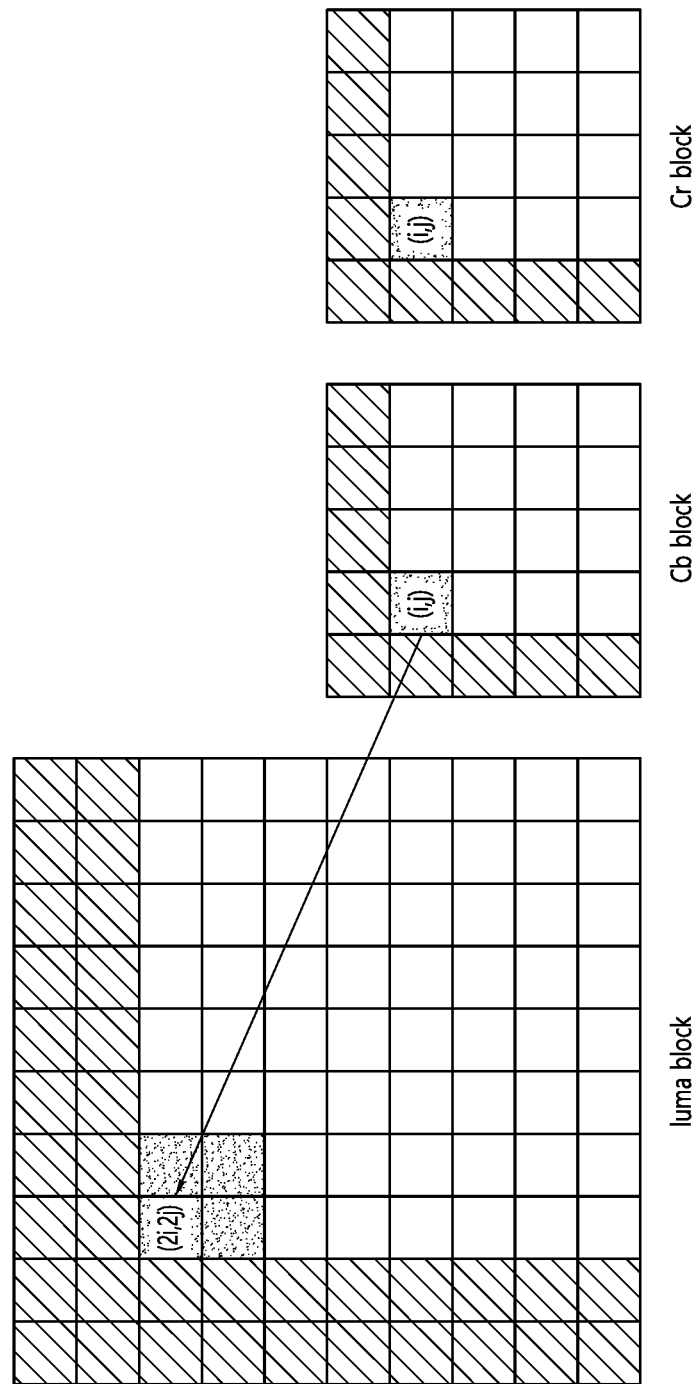
FIG. 5 is a diagram for describing a process of deriving an intra-prediction mode of a current chroma block according to an embodiment.

FIG. 5 is a diagram for describing a process of deriving an intra-prediction mode of a current chroma block according to an embodiment.

In the present disclosure, "chroma block", "chroma image", and the like may represent the same meaning of chrominance block, chrominance image, and the like, and accordingly, chroma and chrominance may be commonly used. Likewise, "luma block", "luma image", and the like may represent the same meaning of luminance block, luminance image, and the like, and accordingly, luma and luminance may be commonly used.

In the present disclosure, a "current chroma block" may mean a chroma component block of a current block, which is a current coding unit, and a "current luma block" may mean a luma component block of a current block, which is a current coding unit. Accordingly, the current luma block and the current chroma block correspond with each other. However, block formats and block numbers of the current luma block and the current chroma block are not always the same but may be different depending on a case. In some cases, the current chroma block may correspond to the current luma region, and in this case, the current luma region may include at least one luma block.

In the present disclosure, "reference sample template" may mean a set of reference samples neighboring a current chroma block for predicting the current chroma block. The reference sample template may be predefined, or information for the reference sample template may be signaled to the decoding apparatus 300 from the encoding apparatus 200.

Referring to FIG. 5, a set of samples one shaded line neighboring 4×4 block, which is a current chroma block, represents a reference sample template. It is shown in FIG. 5 that the reference sample template includes a reference sample of one line, but the reference sample region in a luma region corresponding to the reference sample template includes two lines.

In an embodiment, when an intra encoding of a chroma image is performed in Joint Exploration TEST Model (JEM) used in Joint Video Exploration Team (JVET), Cross Component Linear Model (CCLM) may be used. CCLM is a method of predicting a pixel value of a chroma image based on a pixel value of a reconstructed luma image, which is based on the property of high correlation between a chroma image and a luma image.

CCLM prediction of Cb and Cr chroma images may be based on the equation below.

$$Pred_C(i,j) = \alpha \cdot Rec'_L(i,j) + \beta \qquad \text{[Equation 1]}$$

Herein, $pred_c$ (i, j) means Cb or Cr chroma image to be predicted, $Rec_L'(i, j)$ means a luma image to be reconstructed which is adjusted to a chroma block size and (i, j) means a coordinate of a pixel. In 4:2:0 color format, since a size of luma image is double of that of a chroma image, $Rec_L'$ of a chroma block size should be generated through down-sampling, and accordingly, a pixel of luma image to be used in chroma image $pred_c$ (i, j) may also use neighboring pixels in addition to $Rec_L(2i, 2j)$. The $pred_c$ (i, j) may be represented as a down-sampled luma sample. In addition, $\alpha$ and $\beta$ may be called a linear model or CCLM parameter. Particularly, $\alpha$ may be called a scaling factor, and $\beta$ may be called an offset. Prediction mode information that indicates whether CCLM prediction is applied to the current block may be generated in the encoding apparatus and transmitted to the decoding apparatus, and the CCLM parameter may be calculated in the encoding apparatus and the decoding apparatus based on a neighboring reconstructed sample (or template) in the same way.

Meanwhile, for example, the $pred_c$ (i, j) may be derived by using 6 neighboring pixels as represented in the equation below.

$$Rec'_L(i,j) = (2 \times Rec_L(2i,2j) + 2 \times Rec_L(2i,2j+1) + Rec_L(2i-1,2j) + Rec_L(2i+1,2j) + Rec_L(2i-1,2j+1)) \qquad \text{[Equation 2]}$$

In addition, as shown in the shaded area of FIG. 3, α and β represent a cross-correlation and a difference of average values between Cb or Cr chroma block neighboring template and luma block neighboring template, and α and β are represented as Equation 3 below.

$$\alpha = \frac{M(t_L(i,j) - M(t_L)) \times M(t_C(i,j) - M(t_C))}{M(t_L(i,j) - M(t_L)) \times M(t_L(i,j) - M(t_L))}, \qquad \text{[Equation 3]}$$

$$\beta = M(t_c) - \alpha M(t_L)$$

Here, $t_L$ means a neighboring reference sample of a luma block corresponding to a current chroma image, $t_C$ means neighboring reference sample of a current chroma block to which encoding is applied currently, and (i, j) means a position of a pixel. In addition, M(A) means an average of A pixels.

Meanwhile, samples for parameter calculation (i.e., for example, α and β) for CCLM prediction described above may be selected as below.

In the case that a current chroma block is a chroma block of N×N size, total 2N (N horizontal and N vertical) neighboring reference sample pairs (luma and chroma) of the current chroma block may be selected.

In the case that a current chroma block is a chroma block of N×M size or M×N size (herein, N<=M), total 2N (N horizontal and N vertical) neighboring reference sample pairs of the current chroma block may be selected. Meanwhile, since M is greater than N (e.g., M=2N or 3N, etc.), among M samples, N sample pairs may be selected through subsampling.

Alternatively, in the case that CCLM prediction is performed based on a plurality of CCLM modes, that is, in the case that multi-directional Linear Model (MDLM) is applied, samples for parameter calculation may be selected as below.

In the case that a current chroma block is a chroma block of N×N size to which the existing CCLM prediction, that is, Linear Model_Left Top (LM_LT) mode is applied, total 2N (N horizontal and N vertical) neighboring reference sample pairs (luma and chroma) of the current chroma block may be selected. Here, the LM_LT mode may also be called Linear Model_Left Above (LM_LA) mode.

In the case that a current chroma block is a chroma block of N×M size or M×N size (herein, N<=M) to which the LM_LT mode is applied, total 2N (N horizontal and N vertical) neighboring reference sample pairs of the current chroma block may be selected. Meanwhile, since M is greater than N (e.g., M=2N or 3N, etc.), among M samples, N sample pairs may be selected through subsampling.

In the case that a current chroma block is a chroma block of N×M to which MDLM, that is, CCLM prediction mode except the LM_LT mode is applied, Linear Model_Top (LM_T) mode may be applied to the current chroma block, and total 2N upper neighboring reference sample pairs may be selected. Here, the LM_T mode may also be called Linear Model_Above (LM_A) mode.

In the case that a current chroma block is a chroma block of M×N to which MDLM, that is, CCLM prediction mode except the LM_LT mode is applied, Linear Model_Left (LM_L) mode may be applied to the current chroma block, and total 2N left neighboring reference sample pairs may be selected.

Meanwhile, the MDLM may represent the CCLM prediction performed based on the CCLM prediction mode selected among a plurality of CCLM prediction modes. The plurality of CCLM prediction modes may include the LM_L mode, the LM_T mode and the LM_LT mode. The LM_T mode may represent the CCLM prediction mode that performs CCLM using only a top reference sample of the current block, and the LM_L mode may represent the CCLM prediction mode that performs CCLM using only a left reference sample of the current block. In addition, the LM_LT mode may represent the CCLM prediction mode that performs CCLM using a top reference sample and a left reference sample of the current block like the existing CCLM prediction. Detailed description for the MDLM will be described below.

Figure 6:
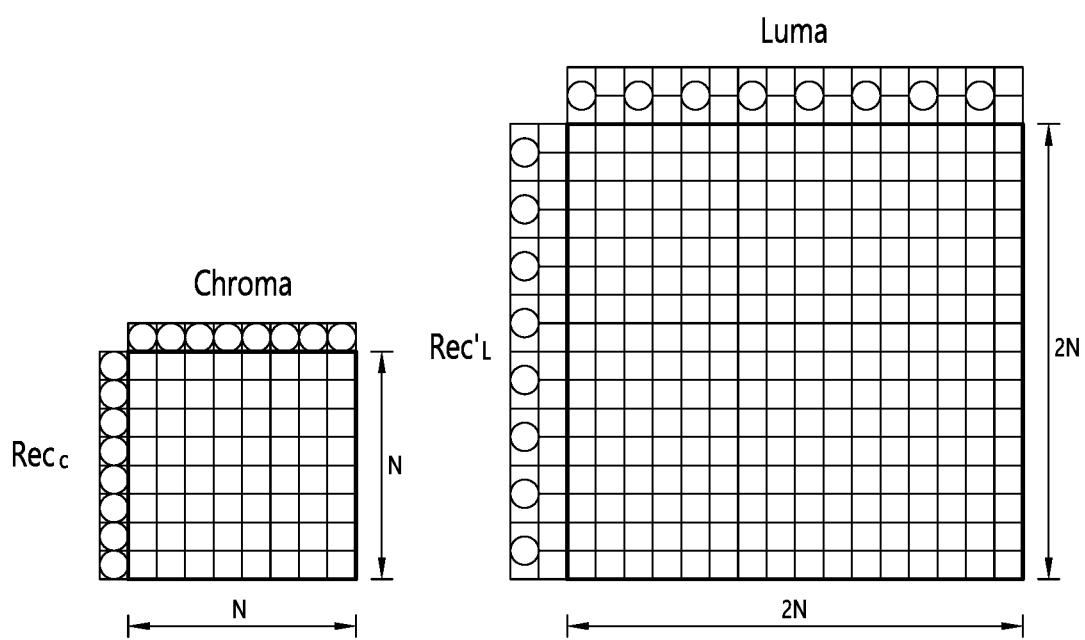
FIG. 6 illustrates 2N reference samples for parameter calculation for CCLM prediction described above.

FIG. 6 illustrates 2N reference samples for parameter calculation for CCLM prediction described above. Referring to FIG. 6, 2N reference sample pairs are shown, which is derived for parameter calculation for the CCLM prediction. The 2N reference sample pairs may include 2N reference samples adjacent to the current chroma block and 2N reference samples adjacent to the current luma block.

As described above, 2N sample pairs may be derived, and in the case that CCLM parameters α and β are calculated using Equation 3 using the sample pair described above, the operation of numbers as represented in Table 1 below may be required.

TABLE 1

| operations | Number of operations |
|---|---|
| Multiplications | 2N + 5 |
| Sums | 8N − 1 |
| Division | 2 |

Referring to Table 1 above, for example, in the case of a chroma block of 4×4 size, 21 multiplication operations and 31 addition operations may be required for calculating CCLM parameter, and in the case of a chroma block of 32×32 size, 133 multiplication operations and 255 addition operations may be required for calculating CCLM parameter. That is, as the size of the chroma block increases, an amount of operation required for calculating CCLM parameter increases rapidly, which may be directly connected to a delay problem in hardware implementation. Particularly, since the CCLM parameter should be derived through calculation eve in the decoding apparatus, the amount of operation may be connected to a delay problem in hardware implementation of the decoding apparatus and increase of implementation cost.

Meanwhile, in VTM 3.0, the CCLM parameter may be calculated by using variation inclination of two luma and chroma sample pair to decrease multiplication and addition operations in calculating α and β. For example, the CCLM parameter may be calculated by the following equation.

$$\alpha = \frac{y_B - y_A}{x_B - x_A} \quad \beta = y_A - \alpha x_A \qquad [\text{Equation 4}]$$

Herein, $(x_A, y_A)$ may represent sample values a luma sample $y_A$ of which luma value is the smallest among neighboring reference samples of a current block for calculating the CCLM parameter and a chroma sample $x_A$ which is a pair of the luma sample, and $(x_B, y_B)$ may represent sample values a luma sample $y_B$ of which luma value is the greatest among neighboring reference samples of a current block for calculating the CCLM parameter and a chroma sample $x_B$ which is a pair of the luma sample. That is, in other words, $y_A$ may represent a luma sample of which luma value is the smallest among neighboring reference samples of a current block, $x_A$ may represent a chroma sample which is a pair of the luma sample $y_A$, $y_B$ may represent a luma sample of which luma value is the greatest among neighboring reference samples of a current block, and $x_B$ may represent a chroma sample which is a pair of the luma sample $y_B$.

Figure 29:
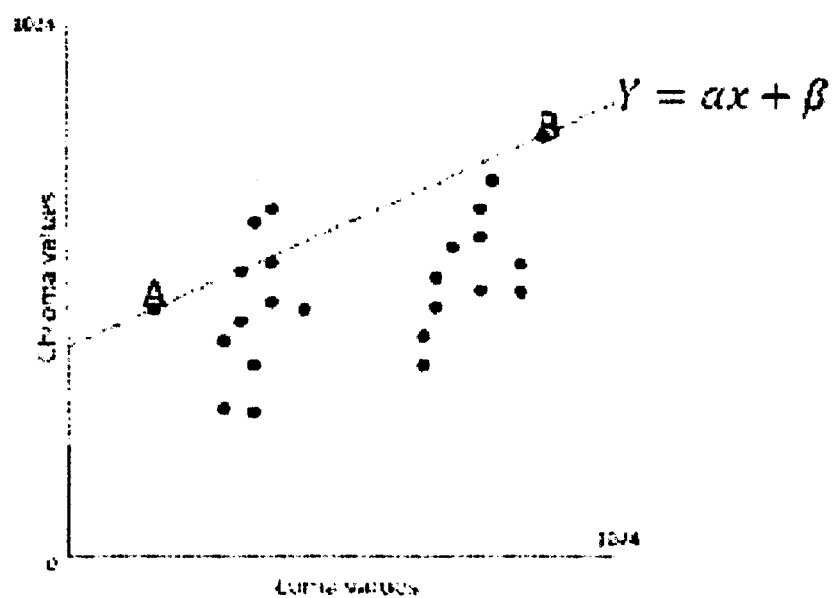
FIG. 29 is Table 2 illustrating the CCLM parameter derived by a simplified calculation method.

FIG. 29 illustrates Table 2 illustrating the CCLM parameter derived by a simplified calculation method.

When the CCLM parameter is calculated by using the equation described above, there is an advantage that the amount of multiplication and addition operations may be reduced significantly in comparison with the existing method, but since a minimum value and a maximum value should be determined among neighboring luma samples of a current block, a comparison operation is added. That is, in order to determine sample minimum value and maximum value in 2N neighboring samples, 4N comparison operations are required, and the addition of the comparison operations may cause a delay in hardware implementation.

In addition, in performing CCLM prediction, multi-directional LM (MDLM), which is adopted in VTM 3.0, may be performed.

Figure 7:
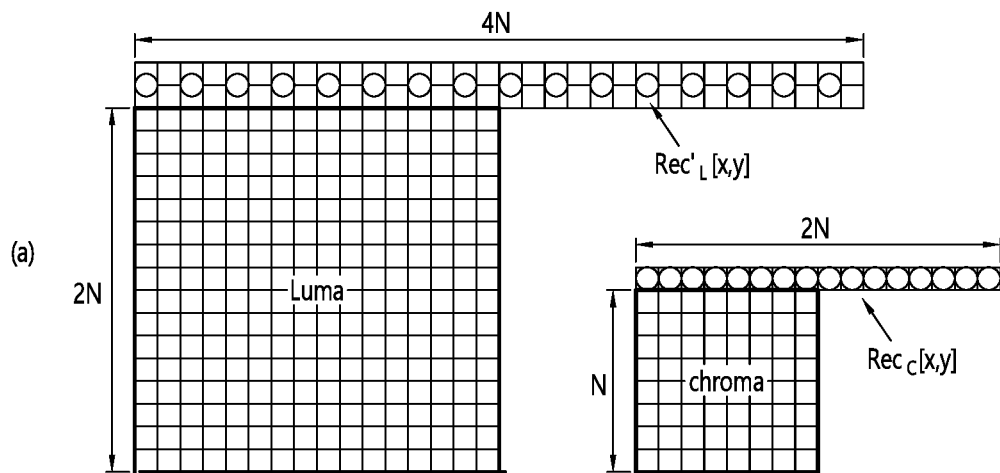
FIG. 7 illustrates LM_A (Linear Model_Above) mode and LM_L (Linear Model_Left) mode.
Figure 7:
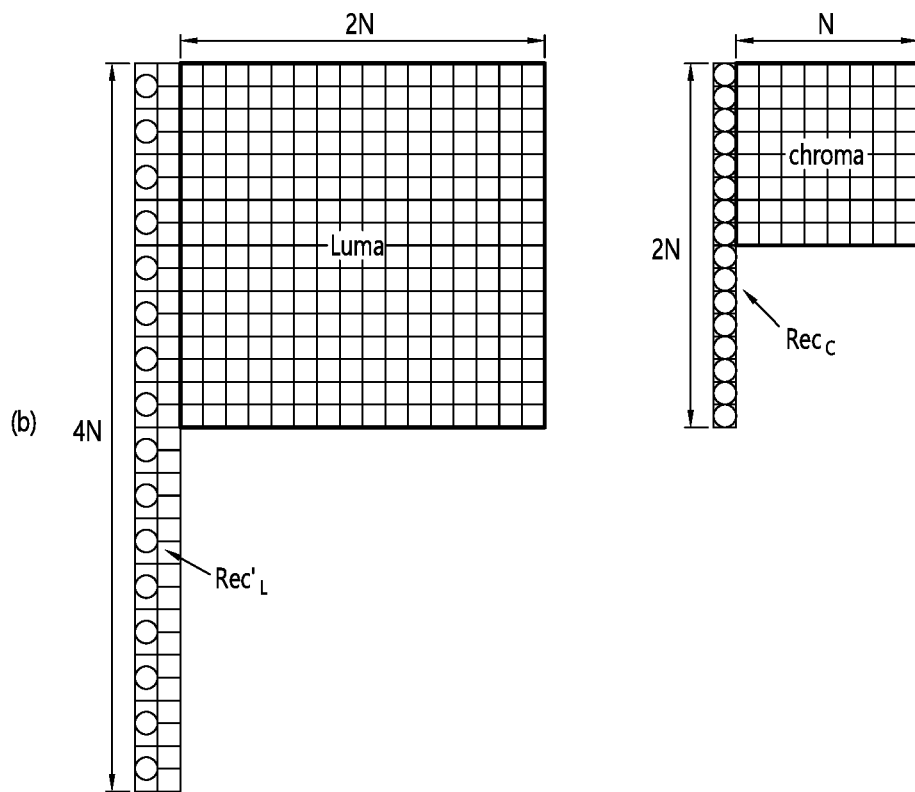

FIG. 7 illustrates LM_A (Linear Model_Above) mode and LM_L (Linear Model_Left) mode. The encoding apparatus and the decoding apparatus may perform CCLM prediction to which the LM_A mode and the LM_L mode. The LM_A mode may represent the CCLM prediction mode for performing CCLM by using only a top reference sample of a current block. In this case, as shown in FIG. 7, CCLM prediction may be performed based on top reference samples which is extended two times of the top reference samples in the existing CCLM prediction to a right side. The LM_A mode may also be called Linear Model_Top (LM_T) mode. Further, the LM_L mode may represent the CCLM prediction mode for performing CCLM by using only a left reference sample of the current block. In this case, as shown in FIG. 7, CCLM prediction may be performed based on left reference samples which is extended two times of the left reference samples in the existing CCLM prediction to a bottom side. Meanwhile, the mode of performing the CCLM prediction based on the existing CCLM prediction, that is, the top reference samples and the left reference samples of the current block may be represented as LM_LA mode or LM_LT mode. Parameter α and β in the MDLM including a plurality of CCLM prediction modes may be calculated by using a variation inclination of two luma and chroma sample pair described above. Accordingly, many comparison operations are required in calculating parameters for the MDLM, and the addition of comparison operations may cause a delay in hardware implementation. Particularly, in the case that the CCLM parameter α and β are calculated through Equation 4 that uses 2N sample pairs described above, 4N comparison operations are required. That is, in the case of 4×4 chroma block, 16 comparison operations are required for calculating CCLM parameter, and in the case of 32×32 chroma block, 128 comparison operations are required for calculating CCLM parameter. That is, as the size of the chroma block increases, an amount of operation required for calculating CCLM parameter increases rapidly, which may be directly connected to a delay problem in hardware implementation. Particularly, since the CCLM parameter should be derived through calculation eve in the decoding apparatus, the addition of comparison operations may be connected to a delay problem in hardware implementation of the decoding apparatus and increase of implementation cost.

Accordingly, a method of reducing the delay is required, and therefore, the present disclosure proposes embodiment for reducing operation complexity for deriving CCLM parameters, and through this, reducing hardware cost and complexity and time of decoding procedure.

The present embodiment may reduce operation complexity for deriving CCLM parameters, and through this, may reduce hardware cost and complexity and time of decoding procedure.

As an example, in order to solve the problem of increase of CCLM parameter operation amount as the chroma block size increase described above, an embodiment may be proposed for calculating a CCLM parameter by selecting a chroma block neighboring pixel, after configuring a neighboring sample selection upper limit $N_{th}$ as described below. The $N_{th}$ may also be represented as a maximum neighboring sample number. For example, $N_{th}$ may be set as 2, 4, 8 or 16.

The CCLM parameter calculation procedure according to the present embodiment may be as below.

In the case that a current chroma block is a chroma block of N×N size and $N_{th}$>=N, total 2N (N horizontal and N vertical) neighboring reference sample pairs of the current chroma block may be selected.

In the case that a current chroma block is a chroma block of N×N size and $N_{th}$<N, total $2*N_{th}$ ($2*N_{th}$ horizontal and $2*N_{th}$ vertical) neighboring reference sample pairs of the current chroma block may be selected.

In the case that a current chroma block is a chroma block of N×M size or M×N size (herein, N<=M) and $N_{th}$>=N, total 2N (N horizontal and N vertical) neighboring reference sample pairs of the current chroma block may be selected. Since M is greater than N (e.g., M=2N or 3N, etc.), among M samples, N sample pairs may be selected through subsampling.

In the case that a current chroma block is a chroma block of N×M size or M×N size (herein, N<=M) and $N_{th}$<N, total $2*N_{th}$ ($2*N_{th}$ horizontal and $2*N_{th}$ vertical) neighboring reference sample pairs of the current chroma block may be selected. Since M is greater than N (e.g., M=2N or 3N, etc.), among M samples, $N_{th}$ sample pairs may be selected through subsampling.

As described above, according to the present embodiment, a neighboring reference sample number for CCLM parameter calculation may be limited by setting $N_{th}$ which is a maximum number of selected neighboring sample numbers, and through this, a CCLM parameter may be calculated through relatively less calculations even in a chroma block of big size.

In addition, in the case of setting $N_{th}$ as relatively small number (e.g., 4 or 8), in hardware implementation of CCLM parameter calculation, a worst case operation (e.g., chroma block of 32×32 size) may be avoided, and therefore, a required hardware gate numbers may be reduced in comparison with the worst case, and through this, there is also an effect of reducing hardware implementation cost.

For example, in the case that $N_{th}$ is 2, 4 and 8, an amount of the CCLM parameter calculation for a chroma block size may be represented as the following table.

TABLE 3

| Block size | Number of operations ( multiplication + sums ) | | | |
| --- | --- | --- | --- | --- |
| | Original CCLM | Proposed method ($N_{th}$ = 2) | Proposed method ($N_{th}$ = 4) | Proposed method ($N_{th}$ = 8) |
| N = 2 | 24 | 24 | 24 | 24 |
| N = 4 | 44 | 24 | 44 | 44 |
| N = 8 | 84 | 24 | 44 | 84 |
| N = 16 | 164 | 24 | 44 | 84 |
| N = 32 | 324 | 24 | 44 | 84 |

Meanwhile, $N_{th}$ may be derived as a predetermined value in the encoding apparatus and the decoding apparatus without need to transmit additional information representing $N_{th}$. Alternatively, additional information representing $N_{th}$ may be transmitted in a unit of a Coding Unit (CU), a slice, a picture or a sequence, and $N_{th}$ may be derived based on the additional information representing $N_{th}$. The additional information representing $N_{th}$ may be generated and encoded in the encoding apparatus and may be transmitted or signaled to the decoding apparatus. Hereinafter, transmission or signaling of value $N_{th}$ may represent transmission or signaling of the information representing $N_{th}$ from the encoding apparatus to the decoding apparatus.

For example, in the case that the additional information representing $N_{th}$ is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), a CCLM parameter calculation is performed through the existing CCLM neighboring sample selection method.

In the case that the cclm_reduced_sample_flag is 1 (true), $N_{th}$ is set to 2, and a CCLM parameter calculation is performed through the neighboring sample selection method proposed in the present embodiment described above.

Alternatively, in the case that the additional information representing $N_{th}$ is transmitted in a unit of slice, picture or sequence, as described below, $N_{th}$ value may be decoded based on the additional information transmitted through a high level syntax (HLS). The additional information representing $N_{th}$ may be encoded in the encoding apparatus and included in a bitstream, and then, transmitted.

For example, the additional information signaled through a slice header may be represented as the following table.

TABLE 4

| slice_header( ) { | Descriptor |
|---|---|
| ... | |
| cclm_reduced_sample_num | f(2) |
| ... | | cclm_reduced_sample_num may represent a syntax element of the additional information representing $N_{th}$.

Alternatively, for example, the additional information signaled through a Picture Parameter Set (PPS) may be represented as the following table.

TABLE 5

| pic_parameter_set_rbsp( ) { | Descriptor |
|---|---|
| ... | |
| cclm_reduced_sample_num | f(2) |
| ... | |

Alternatively, for example, the additional information signaled through a Sequence Parameter Set (SPS) may be represented as the following table.

TABLE 6

| seq_parameter_set_rbsp( ) { | Descriptor |
|---|---|
| ... | |
| cclm_reduced_sample_num | f(2) |
| ... | |

$N_{th}$ value, which is derived based on the cclm_reduced_sample_num value (i.e., a value derived by decoding cclm_reduced_sample_num) transmitted through the slice header, the PPS or the SPS, may be derived as represented in the following table.

TABLE 7

| cclm_reduced_sample_num | $N_{th}$ |
|---|---|
| 0 | 2 |
| 1 | 4 |
| 2 | 8 |
| 3 | 16 |

For example, referring to Table 7 above, $N_{th}$ may be derived based on the cclm_reduced_sample_num. In the case that the cclm_reduced_sample_num value is 0, $N_{th}$ may be derived as 2, in the case that the cclm_reduced_sample_num value is 1, $N_{th}$ may be derived as 4, in the case that the cclm_reduced_sample_num value is 2, $N_{th}$ may be derived as 8, and in the case that the cclm_reduced_sample_num value is 3, $N_{th}$ may be derived as 16.

Meanwhile, in the case that the additional information representing $N_{th}$ is transmitted in a unit of CU, slice, picture or sequence, the encoding apparatus may determine the $N_{th}$ value as below and transmit the additional information representing $N_{th}$ that represent the $N_{th}$ value.

In the case that the additional information representing $N_{th}$ is transmitted in a unit of CU, when an intra-prediction mode of the current chroma block is CCLM mode, the encoding apparatus may determine a side of good encoding efficiency between two following cases through RDO and transmit information of the determined method to the decoding apparatus.

1) In the case that encoding efficiency is good when a CCLM parameter calculation is performed through the existing CCLM reference sample selection method, cclm_reduced_sample_flag of value 0 (false) is transmitted.

2) In the case that encoding efficiency is good when $N_{th}$ is set to 2 and a CCLM parameter calculation is performed through the CCLM reference sample selection method proposed in the present embodiment, cclm_reduced_sample_flag of value 1 (true) is transmitted.

Alternatively, in the case that the additional information representing $N_{th}$ is transmitted in a unit of slice, picture or sequence, the encoding apparatus may add a high level syntax (HLS) as represented in Table 4, Table 5 or Table 6 described above and transmit the additional information representing $N_{th}$. The encoding apparatus may configure the $N_{th}$ value by considering a size of input image or in accordance with an encoding target bitrate.

1) For example, in the case that an input image is HD quality or more, the encoding apparatus may set as $N_{th}=8$, and in the case that an input image is HD quality or less, the encoding apparatus may set as $N_{th}=4$.

2) In the case that image encoding of high quality is required, the encoding apparatus may set as $N_{th}=8$, and in the case that image encoding of normal quality is required, the encoding apparatus may set as $N_{th}=2$.

Meanwhile, as represented in Table 3 described above, when the method proposed in the present embodiment is used, it is identified that an amount of operation required for the CCLM parameter calculation is not increase even a block size is increased. As an example, in the case that a current chroma block size is 32×32, an amount of operation required for the CCLM parameter calculation may be reduced as 86% through the method proposed in the present embodiment (e.g., it is set: $N_{th}=4$).

The table below may represent an experiment result data in the case that the $N_{th}$ is 2.

TABLE 8

| | All Intra Main 10 | | | | |
|---|---|---|---|---|---|
| | Over VTM-2.0.1 | | | | |
| | Y | U | V | EncT | DecT |
| Class A1 | 0.58% | 2.19% | 1.87% | 100% | 99% |
| Class A2 | 0.37% | 1.92% | 0.83% | 100% | 100% |
| Class B | 0.21% | 0.91% | 1.08% | 100% | 98% |
| Class C | 0.21% | 1.07% | 1.35% | 99% | 99% |

TABLE 8-continued

|  | All Intra Main 10 | | | | |
|  | Over VTM-2.0.1 | | | | |
|  | Y | U | V | EncT | DecT |
| --- | --- | --- | --- | --- | --- |
| Class E | 0.13% | 1.14% | 0.88% | 99% | 98% |
| Overall | 0.28% | 1.37% | 1.20% | 100% | 99% |
| Class D | 0.18% | 1.05% | 0.72% | 99% | 95% |

In addition, the table below may represent an experiment result data in the case that the $N_{th}$ is 4.

TABLE 9

|  | All Intra Main 10 | | | | |
|  | Over VTM-2.0.1 | | | | |
|  | Y | U | V | EncT | DecT |
| --- | --- | --- | --- | --- | --- |
| Class A1 | 0.58% | 2.19% | 1.87% | 100% | 99% |
| Class A2 | 0.37% | 1.92% | 0.83% | 100% | 100% |
| Class B | 0.21% | 0.91% | 1.08% | 100% | 98% |
| Class C | 0.21% | 1.07% | 1.35% | 99% | 99% |
| Class E | 0.13% | 1.14% | 0.88% | 99% | 98% |
| Overall | 0.28% | 1.37% | 1.20% | 100% | 99% |
| Class D | 0.18% | 1.05% | 0.72% | 99% | 95% |

In addition, the table below may represent an experiment result data in the case that the $N_{th}$ is 8.

TABLE 10

|  | All Intra Main 10 | | | | |
|  | Over VTM-2.0.1 | | | | |
|  | Y | U | V | EncT | DecT |
| --- | --- | --- | --- | --- | --- |
| Class A1 | 0.00% | −0.22% | −0.14% | 98% | 98% |
| Class A2 | 0.01% | 0.18% | −0.05% | 98% | 98% |
| Class B | 0.00% | −0.04% | −0.06% | 97% | 94% |
| Class C | −0.01% | 0.02% | 0.00% | 95% | 92% |
| Class E | −0.02% | 0.00% | −0.17% | 97% | 95% |
| Overall | 0.00% | −0.01% | −0.08% | 97% | 95% |
| Class D | 0.01% | 0.02% | −0.10% | 97% | 92% |

In addition, the table below may represent an experiment result data in the case that the $N_{th}$ is 16.

TABLE 11

|  | All Intra Main 10 | | | | |
|  | Over VTM-2.0.1 | | | | |
|  | Y | U | V | EncT | DecT |
| --- | --- | --- | --- | --- | --- |
| Class A1 | −0.04% | −0.22% | −0.16% | 99% | 98% |
| Class A2 | 0.00% | 0.06% | −0.02% | 98% | 97% |
| Class B | −0.01% | −0.02% | −0.09% | 97% | 94% |
| Class C | −0.01% | 0.01% | 0.11% | 97% | 93% |
| Class E | −0.01% | −0.21% | −0.12% | 96% | 90% |
| Overall | −0.01% | −0.07% | −0.05% | 97% | 94% |
| Class D | −0.01% | 0.06% | −0.07% | 98% | 92% |

Table 8 to Table 11 above may represent coding efficiency and operation complexity in the case that the $N_{th}$ is 2, 4, 8 and 16, respectively.

Referring to Table 8 to Table 11 above, it is identified that encoding efficiency is not significantly changed even in the case of reducing an amount of operation required for the CCLM parameter calculation. For example, referring to Table 9, in the case that the $N_{th}$ is set to 4 ($N_{th}$=4), encoding efficiency for each component is Y 0.04%, Cb 0.12% and Cr 0.07%, which identifies that encoding efficiency is not significantly changed in comparison with the case of not setting the $N_{th}$, and encoding and decoding complexity is reduced to 97% and 95%, respectively.

In addition, referring to Table 10 and Table 11, in the case of reducing an amount of operation required for the CCLM parameter calculation (i.e., $N_{th}$=8 or 16), it is identified that encoding efficiency becomes better, and encoding and decoding complexity is reduced.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 8A:
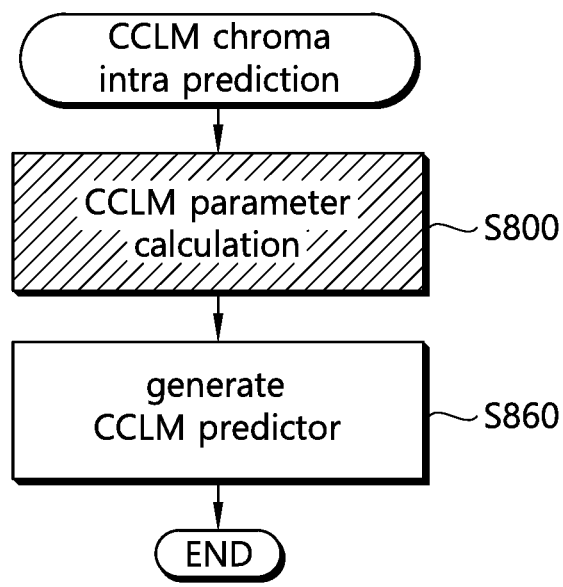

FIGS. 8a and 8b are diagrams for describing a procedure of performing CCLM prediction for a current chroma block according to an embodiment.

Referring to FIG. 8a, the encoding apparatus/decoding apparatus may calculate a CCLM parameter for the current block (step, S800). For example, the CCLM parameter may be calculated as the present embodiment shown in FIG. 8b.

FIG. 8b may illustrate a specific embodiment of calculating the CCLM parameter. For example, referring to FIG. 8b, the encoding apparatus/decoding apparatus may set $N_{th}$ for the current chroma block (step, S805). The $N_{th}$ may be a predetermined value or derived based on the additional information for $N_{th}$. The $N_{th}$ may be set to 2, 4, 8 or 16.

Later, the encoding apparatus/decoding apparatus may determine whether the current chroma block is a square chroma block (step, S810).

In the case that the current chroma block is a square chroma block, the encoding apparatus/decoding apparatus may determine whether N, a width of the current block, is greater than the $N_{th}$ (step, S815).

In the case that N is greater than the $N_{th}$, the encoding apparatus/decoding apparatus may select $2N_{th}$ neighboring samples in a reference line adjacent to the current block as a reference sample for the CCLM parameter calculation (step, S820).

The encoding apparatus/decoding apparatus may derive parameters α and β for the CCLM prediction based on the selected reference samples (step, S825).

In addition, in the case that N is not greater than the $N_{th}$, the encoding apparatus/decoding apparatus may select 2N neighboring samples in a reference line adjacent to the current block as a reference sample for the CCLM parameter calculation (step, S830). Later, the encoding apparatus/decoding apparatus may derive the parameters α and β for the CCLM prediction based on the selected reference samples (step, S825).

Meanwhile, in the case that the current chroma block is not a square chroma block, a size of the current chroma block may be derived in M×N size or N×M size (step, S835). Here, M may represent a value greater than N (N<M).

Later, the encoding apparatus/decoding apparatus determine whether the N is greater than the $N_{th}$ (step, S840).

In the case that N is greater than the $N_{th}$, the encoding apparatus/decoding apparatus may select $2N_{th}$ neighboring samples in a reference line adjacent to the current block as a reference sample for the CCLM parameter calculation (step, S845).

The encoding apparatus/decoding apparatus may derive parameters α and β for the CCLM prediction based on the selected reference samples (step, S825).

In addition, in the case that N is not greater than the $N_{th}$, the encoding apparatus/decoding apparatus may select 2N neighboring samples in a reference line adjacent to the current block as a reference sample for the CCLM parameter calculation (step, S850). Later, the encoding apparatus/decoding apparatus may derive the parameters α and β for the CCLM prediction based on the selected reference samples (step, S825).

Referring to FIG. 8a again, in the case that the parameters for CCLM prediction for the current chroma block is calculated, the encoding apparatus/decoding apparatus may perform the CCLM prediction based on the parameters and generate a prediction sample for the current chroma block (step, S860). For example, the encoding apparatus/decoding apparatus may generate a prediction sample for the current chroma block based on the calculated parameters and Equation 1 described above in which reconstructed samples of the current luma block for the current chroma block.

Meanwhile, in the present disclosure, in deriving the CCLM parameter, an embodiment which is different from the present embodiment of reducing operation complexity for deriving the CCLM parameter may be proposed.

As an example, in order to solve the problem of increase of the CCLM parameter operation amount as the chroma block size increase described above, an embodiment may be proposed for calculating the CCLM parameter by configuring a neighboring sample selection upper limit $N_{th}$ to a block size of the current chroma block adaptively and selecting a neighboring pixel of the current chroma block based on the configured $N_{th}$. The $N_{th}$ may also be represented as a maximum neighboring sample number.

For example, the $N_{th}$ may be configured to a block size of the current chroma block adaptively as below.

In the case that N<=TH in the current chroma block of N×M size or M×N size (here, N<=M), it is configured: $N_{th}$=2.

In the case that N>TH in the current chroma block of N×M size or M×N size (here, N<=M), it is configured: $N_{th}$=4.

In this case, for example, depending on a threshold value TH, a reference sample used for calculating the CCLM parameter may be selected as below.

For example, in the case that the TH is 4 (TH=4), and in the case that the N of the current chroma block is 2 or 4, two sample pairs for a block side is used, and the CCLM parameter may be calculated, and in the case that the N is 8, 16 or 32, four sample pairs for a block side is used, and the CCLM parameter may be calculated.

In addition, for example, in the case that the TH is 8 (TH=8), two sample pairs for a block side is used, and the CCLM parameter may be calculated, and in the case that the N is 16 or 32, four sample pairs for a block side is used, and the CCLM parameter may be calculated.

As described above, according to the present embodiment, the $N_{th}$ is configured to a block size of the current chroma block adaptively, a sample number which is optimized for a block size may be selected.

For example, an amount of operation for the CCLM parameter calculation according to the existing CCLM reference sample selection method and the present embodiment may be represented as the following table.

TABLE 12

| | Number of operations ( multiplication + sums ) | | |
|---|---|---|---|
| Block size | Original CCLM | Proposed method (TH = 4) | Proposed method (TH = 8) |
| N = 2 | 24 | 24 | 24 |
| N = 4 | 44 | 24 | 24 |
| N = 8 | 84 | 44 | 24 |
| N = 16 | 164 | 44 | 44 |
| N = 32 | 324 | 44 | 44 |

Here, the N may represent the smallest value of a width and a height of the current block. Referring to Table 12 above, in the case that the CCLM reference sample selection method proposed in the present embodiment is used, an amount of operation required for the CCLM parameter calculation is not increased even in the case that a block size is increased.

Meanwhile, the TH may be derived as a predetermined value in the encoding apparatus and the decoding apparatus without need to transmit additional information representing the TH. Alternatively, additional information representing the TH may be transmitted in a unit of Coding Unit (CU), slice, picture or sequence, and the TH may be derived based on the additional information representing the TH. The additional information representing the TH may represent a value of the TH.

For example, in the case that the additional information representing TH is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), it is configured the $N_{th}$=4 for all blocks, and a CCLM parameter calculation is performed through the neighboring sample selection method of the present embodiment proposed in FIG. 8 described above.

In the case that the cclm_reduced_sample_flag is 1 (true), it is configured the TH=4, and a CCLM parameter calculation is performed through the neighboring sample selection method proposed in the present embodiment described above.

Alternatively, in the case that the additional information representing TH is transmitted in a unit of slice, picture or sequence, as described below, TH value may be decoded based on the additional information transmitted through a high level syntax (HLS).

For example, the additional information signaled through a slice header may be represented as the following table.

TABLE 13

| slice_header( ) { | Descriptor |
|---|---|
| ... | |
| cclm_reduced_sample_threshold | u(1) |
| ... | | cclm_reduced_sample_threshold may represent a syntax element of the additional information representing TH.

Alternatively, for example, the additional information signaled through a Picture Parameter Set (PPS) may be represented as the following table.

TABLE 14

| pic_parameter_set_rbsp( ) { | Descriptor |
|---|---|
| ... | |
| cclm_reduced_sample_threshold | u(1) |
| ... | |

Alternatively, for example, the additional information signaled through a Sequence Parameter Set (SPS) may be represented as the following table.

TABLE 15

| sps_parameter_set_rbsp( ) { | Descriptor |
|---|---|
| ... | |
| cclm_reduced_sample_threshold | u(1) |
| ... | |

TH value, which is derived based on the cclm_reduced_sample_threshold value (i.e., a value derived by decoding cclm_reduced_sample_threshold) transmitted through the slice header, the PPS or the SPS, may be derived as represented in the following table.

TABLE 16

| cclm_reduced_sample_threshold | TH |
|---|---|
| 0 | 4 |
| 1 | 8 |

For example, referring to Table 16 above, the TH may be derived based on the cclm_reduced_sample_threshold. In the case that the cclm_reduced_sample_threshold value is 0, the TH may be derived as 4, and in the case that the cclm_reduced_sample_threshold value is 1, the TH may be derived as 8.

Meanwhile, in the case that the TH is derived as a predetermined value in the encoding apparatus and the decoding apparatus without transmitting separate additional information, the encoding apparatus may perform the CCLM parameter calculation for the CCLM prediction as the present embodiment described above based on the predetermined TH value.

Alternatively, the encoding apparatus may determine whether to use the threshold value TH and may transmit information representing whether to use the TH and the additional information representing the TH value to the decoding apparatus as below.

In the case that the information representing whether to use the TH is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 4 for all blocks and a CCLM parameter calculation is performed through the reference sample selection method of the present embodiment proposed in FIG. 8 described above, cclm_reduced_sample_flag of value 0 (false) is transmitted.

2) In the case that encoding efficiency is good when the TH is set to 4 and a CCLM parameter calculation is performed through the reference sample selection method of the present embodiment proposed, cclm_reduced_sample_flag of value 1 (true) is transmitted.

Alternatively, in the case that the information representing whether to use the TH is transmitted in a unit of slice, picture or sequence, the encoding apparatus may add a high level syntax (HLS) as represented in Table 13, Table 14 or Table 15 described above and transmit the information representing whether to use the TH. The encoding apparatus may configure the use of the TH by considering a size of input image or in accordance with an encoding target bitrate.

1) For example, in the case that an input image is HD quality or more, the encoding apparatus may set as TH=8, and in the case that an input image is HD quality or less, the encoding apparatus may set as TH=4.

2) In the case that image encoding of high quality is required, the encoding apparatus may set as TH=8, and in the case that image encoding of normal quality is required, the encoding apparatus may set as TH=4.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 9A:
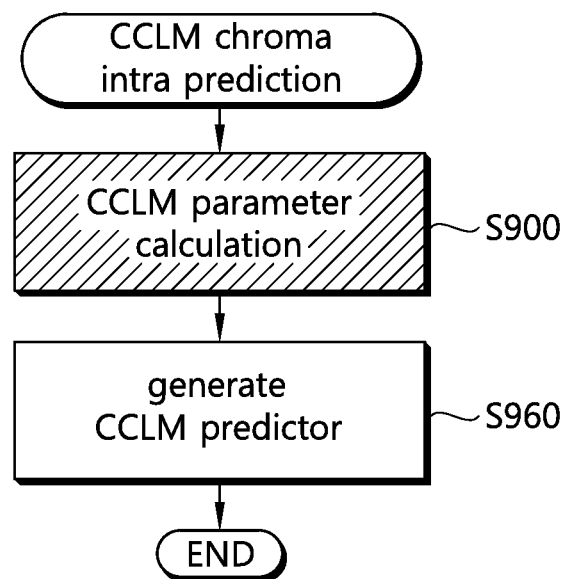
FIGS. 9a and 9b are diagrams for describing a procedure of performing CCLM prediction for a current chroma block according to an embodiment.
Figure 9B:
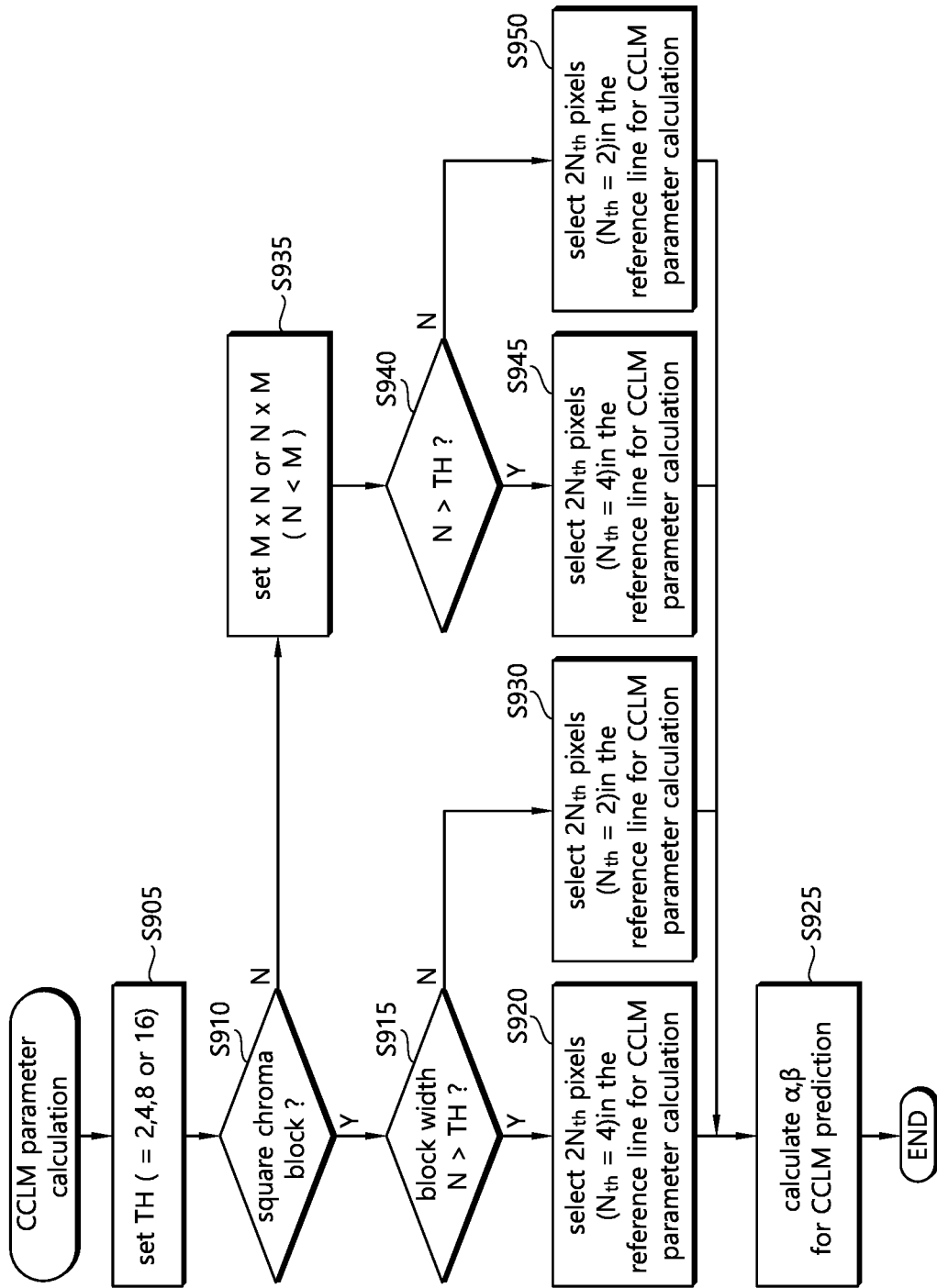

FIGS. 9a and 9b are diagrams for describing a procedure of performing CCLM prediction for a current chroma block according to an embodiment.

Referring to FIG. 9a, the encoding apparatus/decoding apparatus may calculate a CCLM parameter for the current block (step, S900). For example, the CCLM parameter may be calculated as the present embodiment shown in FIG. 9b.

FIG. 9b may illustrate a specific embodiment of calculating the CCLM parameter. For example, referring to FIG. 9b, the encoding apparatus/decoding apparatus may set TH for the current chroma block (step, S905). The TH may be a predetermined value or derived based on the additional information for TH. The TH may be set to 4 or 8.

Later, the encoding apparatus/decoding apparatus may determine whether the current chroma block is a square chroma block (step, S910).

In the case that the current chroma block is a square chroma block, the encoding apparatus/decoding apparatus may determine whether N, a width of the current block, is greater than the TH (step, S915).

In the case that N is greater than the TH, the encoding apparatus/decoding apparatus may select $2N_{th}$ neighboring samples in a reference line adjacent to the current block as a reference sample for the CCLM parameter calculation (step, S920). Here, the $N_{th}$ may be 4. That is, in the case that N is greater than the TH, the $N_{th}$ may be 4.

The encoding apparatus/decoding apparatus may derive parameters α and β for the CCLM prediction based on the selected reference samples (step, S925).

In addition, in the case that N is not greater than the TH, the encoding apparatus/decoding apparatus may select $2N_{th}$ neighboring samples in a reference line adjacent to the current block as a reference sample for the CCLM parameter calculation (step, S930). That is, in the case that N is not greater than the TH, the $N_{th}$ may be 2. Later, the encoding apparatus/decoding apparatus may derive the parameters α and β for the CCLM prediction based on the selected reference samples (step, S925).

Meanwhile, in the case that the current chroma block is not a square chroma block, a size of the current chroma block may be derived in M×N size or N×M size (step, S935). Here, M may represent a value greater than N (N<M).

Later, the encoding apparatus/decoding apparatus determine whether the N is greater than the TH (step, S940).

In the case that N is greater than the TH, the encoding apparatus/decoding apparatus may select $2N_{th}$ neighboring samples in a reference line adjacent to the current block as a reference sample for the CCLM parameter calculation (step, S945). Here, the $N_{th}$ may be 4. That is, in the case that N is greater than the TH, the $N_{th}$ may be 4.

The encoding apparatus/decoding apparatus may derive parameters α and β for the CCLM prediction based on the selected reference samples (step, S925).

In addition, in the case that N is not greater than the TH, the encoding apparatus/decoding apparatus may select $2N_{th}$ neighboring samples in a reference line adjacent to the current block as a reference sample for the CCLM parameter calculation (step, S950). Here, the $N_{th}$ may be 2. That is, in the case that N is greater than the TH, the $N_{th}$ may be 2. Later, the encoding apparatus/decoding apparatus may derive the parameters α and β for the CCLM prediction based on the selected reference samples (step, S925).

Referring to FIG. 9a again, in the case that the parameters for CCLM prediction for the current chroma block is calculated, the encoding apparatus/decoding apparatus may perform the CCLM prediction based on the parameters and generate a prediction sample for the current chroma block (step, S960). For example, the encoding apparatus/decoding apparatus may generate a prediction sample for the current chroma block based on the calculated parameters and Equation 1 described above in which reconstructed samples of the current luma block for the current chroma block.

Meanwhile, in the present disclosure, in deriving the CCLM parameter, an embodiment which is different from the present embodiment of reducing operation complexity for deriving the CCLM parameter may be proposed.

Particularly, in order to solve the problem of increase of CCLM parameter operation amount as the chroma block size increase described above, the present embodiment proposes a method of configuring a pixel selection upper limit $N_{th}$ adaptively. In addition, in the case that N=2 (here, N is a smaller value between a width and a height of a chroma block), in order to prevent the worst case operation (a case CCLM prediction is performed for all chroma blocks, after all chroma blocks in a CTU is divided into 2×2 size) occurred in CCLM prediction for a chroma block of 2×2 size, the present embodiment proposes a method of configuring $N_{th}$ adaptively, and through this, an amount of operation for CCLM parameter calculation in the worst cast may be reduced by about 40%.

For example, according to the present embodiment, the $N_{th}$ may be configured to a block size adaptively as below.

Method 1 in the present embodiment (proposed method 1)
In the case that N<=2 in the current chroma block of N×M size or M×N size (here, e.g., N<=M), $N_{th}$ may be set to 1 ($N_{th}$=1).
In the case that N=4 in the current chroma block of N×M size or M×N size (here, e.g., N<=M), $N_{th}$ may be set to 2 ($N_{th}$=2).
In the case that N>4 in the current chroma block of N×M size or M×N size (here, e.g., N<=M), $N_{th}$ may be set to 4 ($N_{th}$=4).

Alternatively, for example, according to the present embodiment, the $N_{th}$ may be configured to a block size adaptively as below.

Method 2 in the present embodiment (proposed method 2)
In the case that N<=2 in the current chroma block of N×M size or M×N size (here, e.g., N<=M), $N_{th}$ may be set to 1 ($N_{th}$=1).
In the case that N=4 in the current chroma block of N×M size or M×N size (here, e.g., N<=M), $N_{th}$ may be set to 2 ($N_{th}$=2).
In the case that N=8 in the current chroma block of N×M size or M×N size (here, e.g., N<=M), $N_{th}$ may be set to 4 ($N_{th}$=4).
In the case that N>8 in the current chroma block of N×M size or M×N size (here, e.g., N<=M), $N_{th}$ may be set to 8 ($N_{th}$=8).

Alternatively, for example, according to the present embodiment, the $N_{th}$ may be configured to a block size adaptively as below.

Method 3 in the present embodiment (proposed method 3)
In the case that N<=2 in the current chroma block of N×M size or M×N size (here, e.g., N<=M), $N_{th}$ may be set to 1 ($N_{th}$=1).
In the case that N>2 in the current chroma block of N×M size or M×N size (here, e.g., N<=M), $N_{th}$ may be set to 2 ($N_{th}$=2).

Alternatively, for example, according to the present embodiment, the $N_{th}$ may be configured to a block size adaptively as below.

Method 4 in the present embodiment (proposed method 4)
In the case that N<=2 in the current chroma block of N×M size or M×N size (here, e.g., N<=M), $N_{th}$ may be set to 1 ($N_{th}$=1).
In the case that N>2 in the current chroma block of N×M size or M×N size (here, e.g., N<=M), $N_{th}$ may be set to 4 ($N_{th}$=4).

Method 1 to method 4 described above in the present embodiment may reduce a complexity of the worst case by about 40%, and since $N_{th}$ may be adaptively applied to each chroma block size, encoding loss may be minimized. In addition, for example, since method 2 may apply $N_{th}$ up to 8 in variable manner, this may proper to high quality image encoding. Since method 3 and method 4 may reduce $N_{th}$ to 4 or 2, CCLM complexity may be reduced significantly, and may proper to low image quality or middle image quality.

As described in method 1 to method 4, according to the present embodiment, $N_{th}$ may be configured adaptively to a block size, and through this, a reference sample number for deriving an optimized CCLM parameter may be selected.

The encoding apparatus/decoding apparatus may set the upper limit $N_{th}$ for neighboring sample selection, and then, calculate a CCLM parameter by selecting a chroma block neighboring sample as described above.

An amount of CCLM parameter calculation according to a chroma block size in the case to which the present embodiment described above is applied may be represented as the following table.

TABLE 17

| | | Number of operations ( multiplication + sums ) | | | |
|---|---|---|---|---|---|
| Block size | Original CCLM | Proposed method 1 ($N_{th}$ = 1, 2, 4) | Proposed method 2 ($N_{th}$ = 1, 2, 4, 8) | Proposed method 3 ($N_{th}$ = 1, 2) | Proposed method 4 ($N_{th}$ = 1, 4) |
| N = 2 | 24 | 14 | 14 | 14 | 14 |
| N = 4 | 44 | 24 | 24 | 24 | 44 |
| N = 8 | 84 | 44 | 44 | 24 | 44 |
| N = 16 | 164 | 44 | 84 | 24 | 44 |
| N = 32 | 324 | 44 | 84 | 24 | 44 |

As represented in Table 17 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the $N_{th}$ value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.

In the case that the cclm_reduced_sample_flag is 0 (false), it is configured $N_{th}$=4 for all blocks, and a CCLM parameter calculation is performed through the neighboring sample selection method of the present embodiment proposed in FIG. 8 described above.

In the case that the cclm_reduced_sample_flag is 1 (true), a CCLM parameter calculation is performed through method 3 of the present embodiment described above.

Alternatively, in the case that the information representing the applied method is transmitted in a unit of slice, picture or sequence, as described below, the method among method 1 to method 4 may be selected based on the information transmitted through a high level syntax (HLS), and based on the selected method, the CCLM parameter may be calculated.

For example, the information representing the applied method signaled through a slice header may be represented as the following table.

TABLE 18

| slice_header( ) { | Descriptor |
|---|---|
| ... | |
| cclm_reduced_sample_threshold | f(2) |
| ... | | cclm_reduced_sample_threshold may represent a syntax element of the information representing the applied method.

Alternatively, for example, the information representing the applied method signaled through a Picture Parameter Set (PPS) may be represented as the following table.

TABLE 19

| pic_parameter_set_rbsp( ) { | Descriptor |
|---|---|
| ... | |
| cclm_reduced_sample_threshold | f(2) |
| ... | |

Alternatively, for example, the information representing the applied method signaled through a Sequence Parameter Set (SPS) may be represented as the following table.

TABLE 20

| sps_parameter_set_rbsp( ) { | Descriptor |
|---|---|
| ... | |
| cclm_reduced_sample_threshold | f(2) |
| ... | |

The method selected based on cclm_reduced_sample_threshold value (i.e., a value derived by decoding cclm_reduced_sample_threshold) transmitted through the slice header, the PPS or the SPS may be derived as represented in the following table.

TABLE 21

| cclm_reduced_sample_threshold | Proposed method |
|---|---|
| 0 | 1 ($N_{th}$ = 1, 2, 4) |
| 1 | 2 ($N_{th}$ = 1, 2, 4, 8) |
| 2 | 3 ($N_{th}$ = 1, 2) |
| 3 | 4 ($N_{th}$ = 1, 4) |

Referring to Table. 21, in the case that the cclm_reduced_sample_threshold value is 0, method 1 may be selected as the method applied to the current chroma block, in the case that the cclm_reduced_sample_threshold value is 1, method 2 may be selected as the method applied to the current chroma block, in the case that the cclm_reduced_sample_threshold value is 2, method 3 may be selected as the method applied to the current chroma block, and in the case that the cclm_reduced_sample_threshold value is 3, method 4 may be selected as the method applied to the current chroma block.

The method proposed in the present embodiment may be used a CCLM mode which is an intra-prediction mode for a chroma component, and the chroma block predicted through the CCLM mode may be used for deriving a residual image through a differential from an original image in the encoding apparatus or used for deriving a reconstructed image through an addition with a residual signal in the decoding apparatus.

Meanwhile, in the case that the information representing one of the methods is transmitted in a unit of CU, slice, picture and sequence, the encoding apparatus may determine one of method 1 to method 4 and transmit the information to the decoding apparatus as below.

In the case that the information representing whether the method of the present embodiment described above is applied is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 4 for all blocks and a CCLM parameter calculation is performed through the reference sample selection method of the present embodiment proposed in FIG. 8 described above, cclm_reduced_sample_flag of value 0 (false) is transmitted.

2) In the case that encoding efficiency is good when it is configured that method 3 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in Table 18, Table 19 or Table 20 described above and transmit the information representing one method among the methods. The encoding apparatus may configure the method applied among the methods by considering a size of input image or in accordance with an encoding target bitrate.

1) For example, in the case that an input image is HD quality or more, the encoding apparatus may apply method 2 ($N_{th}$=1, 2, 4 or 8), and in the case that an input image is HD quality or less, the encoding apparatus may apply method 1 ($N_{th}$=1, 2 or 4).

2) In the case that image encoding of high quality is required, the encoding apparatus may apply method 2 ($N_{th}$=1, 2, 4 or 8), and in the case that image encoding of normal quality is required, the encoding apparatus may apply method 4 ($N_{th}$=1 or 4).

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 10A:
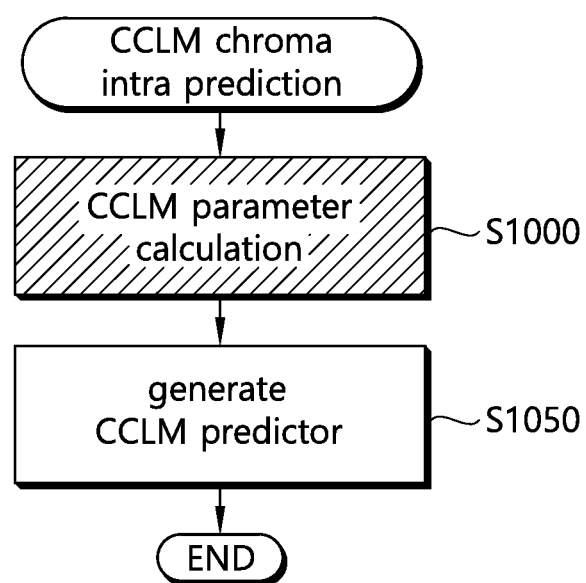
FIGS. 10a and 10b are diagrams for describing a procedure of performing CCLM prediction based on the CCLM parameters of the current chroma block derived according to method 1 of the present embodiment described above.
Figure 10B:
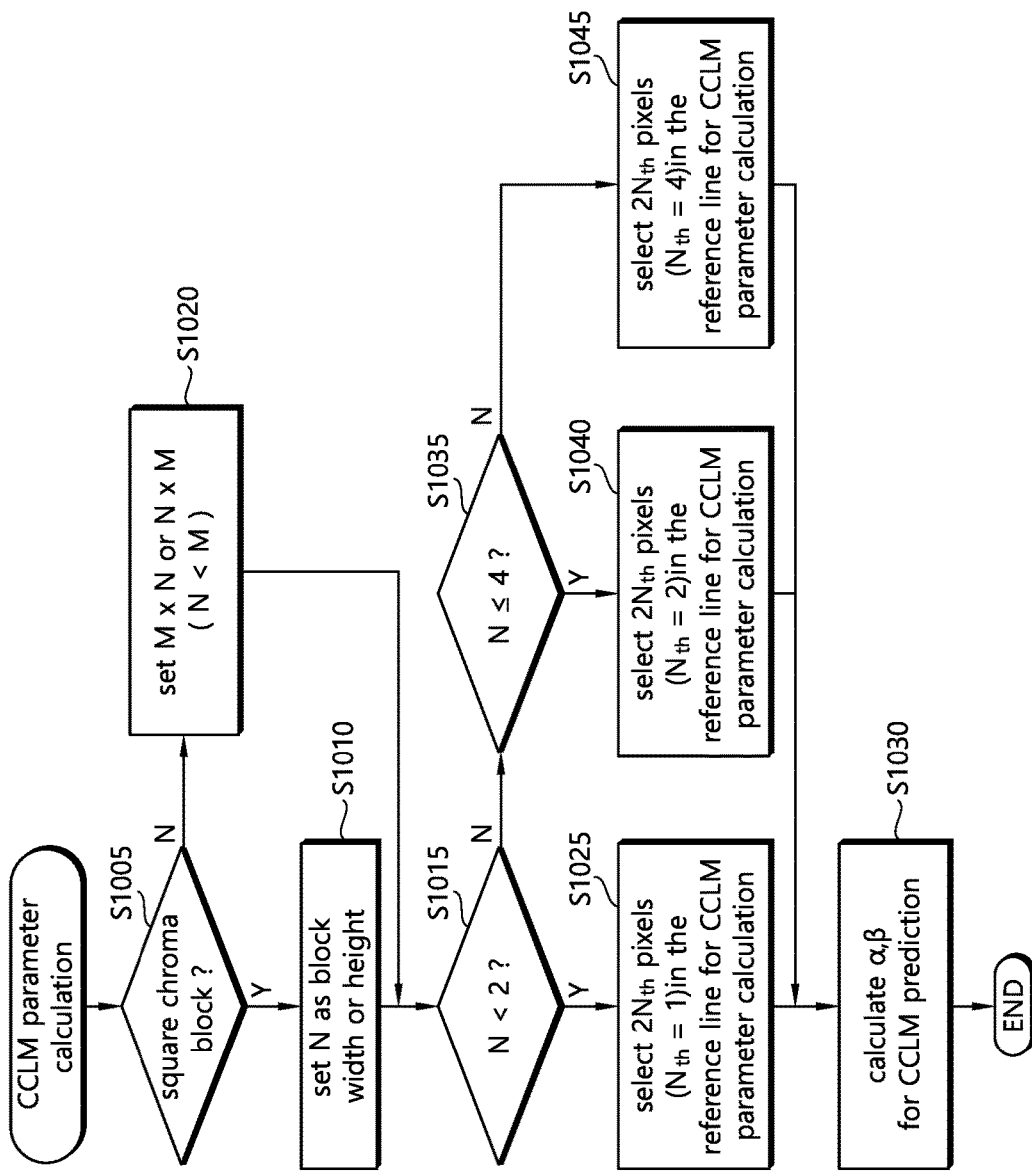

FIGS. 10a and 10b are diagrams for describing a procedure of performing CCLM prediction based on the CCLM parameters of the current chroma block derived according to method 1 of the present embodiment described above.

Referring to FIG. 10a, the encoding apparatus/decoding apparatus may calculate a CCLM parameter for the current block (step, S1000). For example, the CCLM parameter may be calculated as the present embodiment shown in FIG. 10b.

FIG. 10b may illustrate a specific embodiment of calculating the CCLM parameter. For example, referring to FIG. 10b, the encoding apparatus/decoding apparatus may determine whether the current chroma block is a square chroma block (step, S1005).

In the case that the current chroma block is a square chroma block, the encoding apparatus/decoding apparatus may set a width or a height of the current block to N (step, S1010) and determine whether N is smaller than 2 (N<2) (step, S1015).

Alternatively, in the case that the current chroma block is not a square chroma block, a size of the current chroma block may be derived in M×N size or N×M size (step, S1020). The encoding apparatus/decoding apparatus determine whether the N is smaller than 2 (step, S1015). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1025). Here, the $N_{th}$ may be 1 ($N_{th}$=1).

The encoding apparatus/decoding apparatus may derive parameters α and β for the CCLM prediction based on the selected reference samples (step, S1030).

Meanwhile, in the case that the N is not smaller than 2, the encoding apparatus/decoding apparatus may determine whether the N is 4 or less (N<=4) (step, S1035).

In the case that N is 4 or less, the encoding apparatus/decoding apparatus may select $2N_{th}$ neighboring samples in a reference line adjacent to the current block as a reference sample for the CCLM parameter calculation (step, S1040). Here, the $N_{th}$ may be 2. Later, the encoding apparatus/decoding apparatus may derive the parameters α and β for the CCLM prediction based on the selected reference samples (step, S1030).

Alternatively, in the case that N is greater than 4, the encoding apparatus/decoding apparatus may select $2N_{th}$ neighboring samples in a reference line adjacent to the current block as a reference sample for the CCLM parameter calculation (step, S1045). Here, the $N_{th}$ may be 4 ($N_{th}$=4). Later, the encoding apparatus/decoding apparatus may derive the parameters α and β for the CCLM prediction based on the selected reference samples (step, S1030).

Referring to FIG. 10a again, in the case that the parameters for CCLM prediction for the current chroma block is calculated, the encoding apparatus/decoding apparatus may perform the CCLM prediction based on the parameters and generate a prediction sample for the current chroma block (step, S1050). For example, the encoding apparatus/decoding apparatus may generate a prediction sample for the current chroma block based on the calculated parameters and Equation 1 described above in which reconstructed samples of the current luma block for the current chroma block.

Figure 11A:
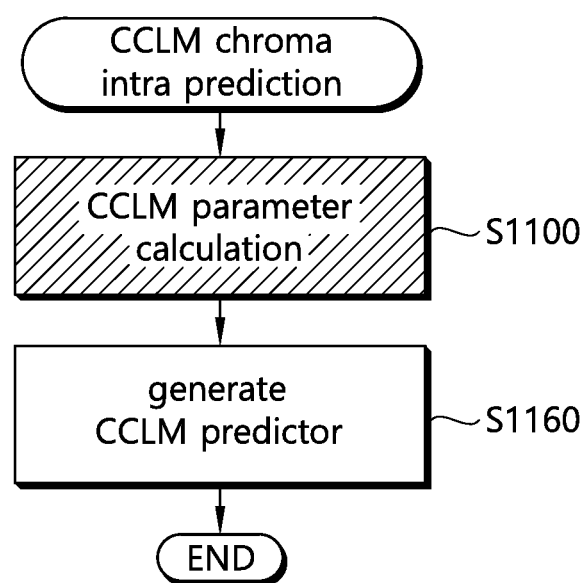
FIGS. 11a and 11b are diagrams for describing a procedure of performing CCLM prediction based on the CCLM parameters of the current chroma block derived according to method 2 of the present embodiment described above.
Figure 11B:
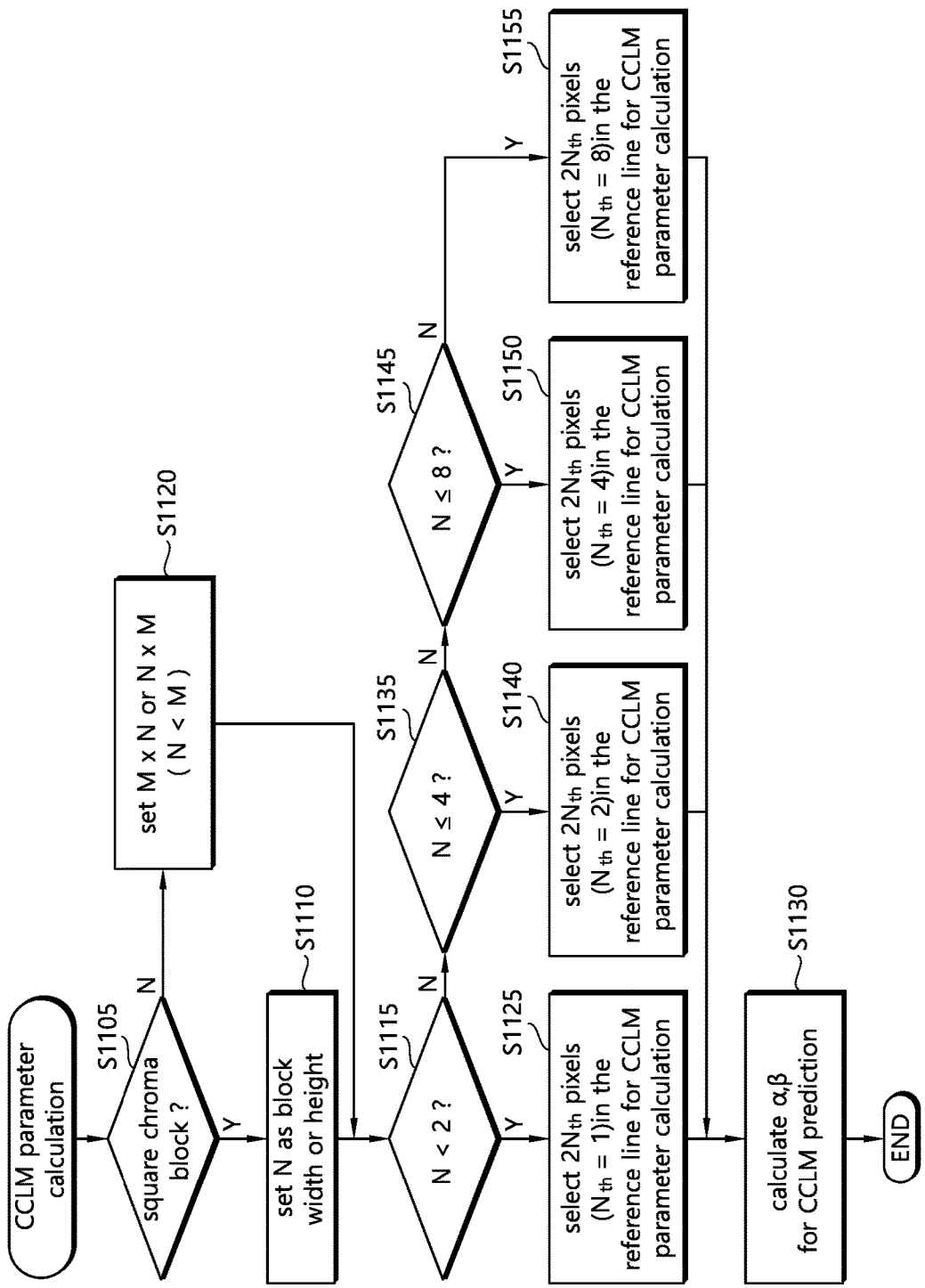

FIGS. 11a and 11b are diagrams for describing a procedure of performing CCLM prediction based on the CCLM parameters of the current chroma block derived according to method 2 of the present embodiment described above.

Referring to FIG. 11a, the encoding apparatus/decoding apparatus may calculate a CCLM parameter for the current block (step, S1100). For example, the CCLM parameter may be calculated as the present embodiment shown in FIG. 11b.

FIG. 11b may illustrate a specific embodiment of calculating the CCLM parameter. For example, referring to FIG. 11b, the encoding apparatus/decoding apparatus may determine whether the current chroma block is a square chroma block (step, S1105).

In the case that the current chroma block is a square chroma block, the encoding apparatus/decoding apparatus may set a width or a height of the current block to N (step, S1110) and determine whether N is smaller than 2 (N<2) (step, S1115).

Alternatively, in the case that the current chroma block is not a square chroma block, a size of the current chroma block may be derived in M×N size or N×M size (step, S1120). The encoding apparatus/decoding apparatus determine whether the N is smaller than 2 (step, S1115). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1125). Here, the $N_{th}$ may be 1 ($N_{th}$=1).

The encoding apparatus/decoding apparatus may derive parameters α and β for the CCLM prediction based on the selected reference samples (step, S1130).

Meanwhile, in the case that the N is not smaller than 2, the encoding apparatus/decoding apparatus may determine whether the N is 4 or less (N<=4) (step, S1135).

In the case that N is 4 or less, the encoding apparatus/decoding apparatus may select $2N_{th}$ neighboring samples in a reference line adjacent to the current block as a reference sample for the CCLM parameter calculation (step, S1140). Here, the $N_{th}$ may be 2. Later, the encoding apparatus/decoding apparatus may derive the parameters α and β for the CCLM prediction based on the selected reference samples (step, S1130).

Meanwhile, in the case that the N is greater than 4, the encoding apparatus/decoding apparatus may determine whether the N is 8 or less (N<=8) (step, S1145).

In the case that the N is 8 or less, the encoding apparatus/decoding apparatus may select $2N_{th}$ neighboring samples in a reference line adjacent to the current block as a reference sample for the CCLM parameter calculation (step, S1150). Here, the $N_{th}$ may be 4 ($N_{th}$=4). Later, the encoding apparatus/decoding apparatus may derive the parameters α and β for the CCLM prediction based on the selected reference samples (step, S1130).

Alternatively, in the case that the N is greater than 8, the encoding apparatus/decoding apparatus may select $2N_{th}$ neighboring samples in a reference line adjacent to the current block as a reference sample for the CCLM parameter calculation (step, S1155). Here, the $N_{th}$ may be 8 ($N_{th}$=8). Later, the encoding apparatus/decoding apparatus may derive the parameters α and β for the CCLM prediction based on the selected reference samples (step, S1130).

Referring to FIG. 11a again, in the case that the parameters for CCLM prediction for the current chroma block is calculated, the encoding apparatus/decoding apparatus may perform the CCLM prediction based on the parameters and generate a prediction sample for the current chroma block (step, S1160). For example, the encoding apparatus/decoding apparatus may generate a prediction sample for the current chroma block based on the calculated parameters and Equation 1 described above in which reconstructed samples of the current luma block for the current chroma block.

Figure 12A:
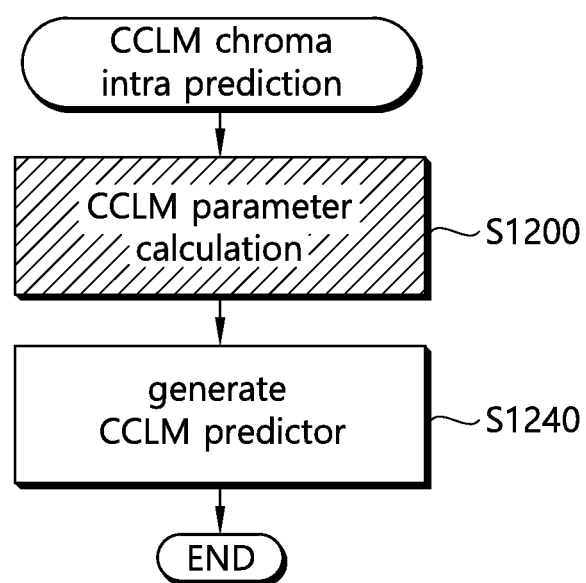
FIGS. 12a and 12b are diagrams for describing a procedure of performing CCLM prediction based on the CCLM parameters of the current chroma block derived according to method 3 of the present embodiment described above.
Figure 12B:
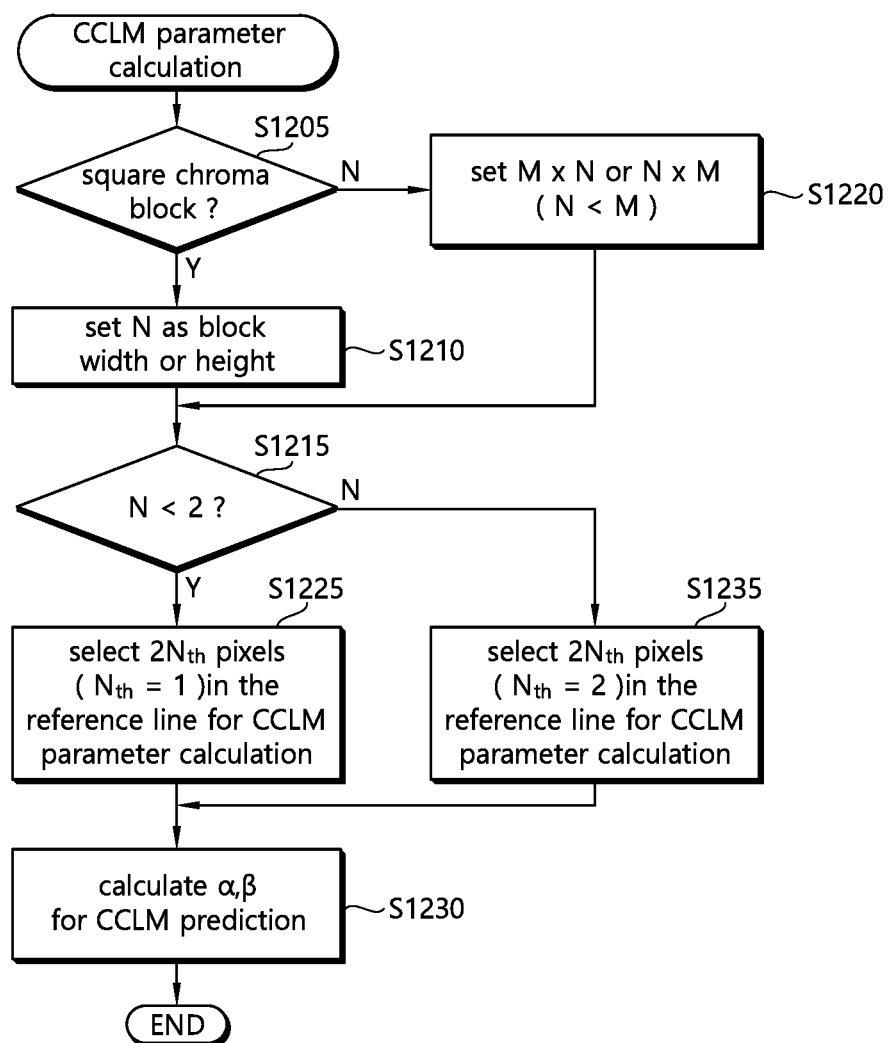

FIGS. 12a and 12b are diagrams for describing a procedure of performing CCLM prediction based on the CCLM parameters of the current chroma block derived according to method 3 of the present embodiment described above.

Referring to FIG. 12a, the encoding apparatus/decoding apparatus may calculate a CCLM parameter for the current block (step, S1200). For example, the CCLM parameter may be calculated as the present embodiment shown in FIG. 12b.

FIG. 12b may illustrate a specific embodiment of calculating the CCLM parameter. For example, referring to FIG. 12b, the encoding apparatus/decoding apparatus may determine whether the current chroma block is a square chroma block (step, S1205).

In the case that the current chroma block is a square chroma block, the encoding apparatus/decoding apparatus may set a width or a height of the current block to N (step, S1210) and determine whether N is smaller than 2 (N<2) (step, S1215).

Alternatively, in the case that the current chroma block is not a square chroma block, a size of the current chroma block may be derived in M×N size or N×M size (step, S1220). The encoding apparatus/decoding apparatus determine whether the N is smaller than 2 (step, S1215). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1225). Here, the $N_{th}$ may be 1 ($N_{th}$=1).

The encoding apparatus/decoding apparatus may derive parameters α and β for the CCLM prediction based on the selected reference samples (step, S1230).

Meanwhile, in the case that the N is not smaller than 2, the encoding apparatus/decoding apparatus may select $2N_{th}$ neighboring samples in a reference line adjacent to the current block as a reference sample for the CCLM parameter calculation (step, S1235). Here, the $N_{th}$ may be 2. Later, the encoding apparatus/decoding apparatus may derive the parameters α and β for the CCLM prediction based on the selected reference samples (step, S1230).

Referring to FIG. 12a again, in the case that the parameters for CCLM prediction for the current chroma block is calculated, the encoding apparatus/decoding apparatus may perform the CCLM prediction based on the parameters and generate a prediction sample for the current chroma block (step, S1240). For example, the encoding apparatus/decoding apparatus may generate a prediction sample for the current chroma block based on the calculated parameters and Equation 1 described above in which reconstructed samples of the current luma block for the current chroma block.

Figure 13A:
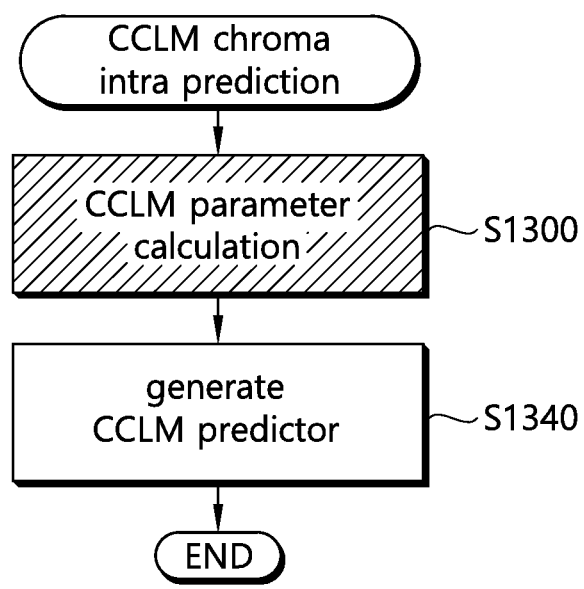
FIGS. 13a and 13b are diagrams for describing a procedure of performing CCLM prediction based on the CCLM parameters of the current chroma block derived according to method 4 of the present embodiment described above.
Figure 13B:
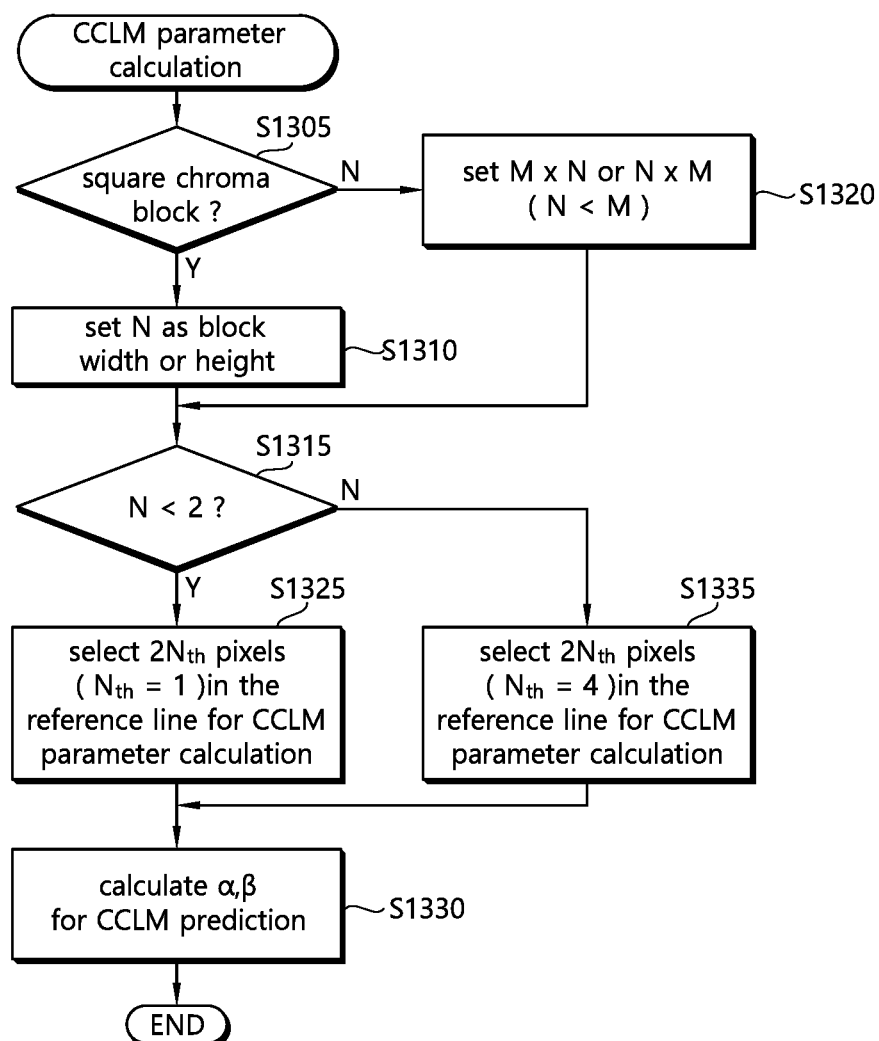

FIGS. 13a and 13b are diagrams for describing a procedure of performing CCLM prediction based on the CCLM parameters of the current chroma block derived according to method 4 of the present embodiment described above.

Referring to FIG. 13a, the encoding apparatus/decoding apparatus may calculate a CCLM parameter for the current block (step, S1300). For example, the CCLM parameter may be calculated as the present embodiment shown in FIG. 13b.

FIG. 13b may illustrate a specific embodiment of calculating the CCLM parameter. For example, referring to FIG. 13b, the encoding apparatus/decoding apparatus may determine whether the current chroma block is a square chroma block (step, S1305).

In the case that the current chroma block is a square chroma block, the encoding apparatus/decoding apparatus may set a width or a height of the current block to N (step, S1310) and determine whether N is smaller than 2 (N<2) (step, S1315).

Alternatively, in the case that the current chroma block is not a square chroma block, a size of the current chroma block may be derived in M×N size or N×M size (step, S1320). The encoding apparatus/decoding apparatus determine whether the N is smaller than 2 (step, S1315). Here, the M represents a value greater than the N (N<M).

In the case that the N is smaller than 2, the encoding apparatus/decoding apparatus may select $2N_{th}$ neighboring samples in a reference line adjacent to the current block as a reference sample for the CCLM parameter calculation (step, S1325). Here, the $N_{th}$ may be 1 ($N_{th}$=1).

The encoding apparatus/decoding apparatus may derive parameters α and β for the CCLM prediction based on the selected reference samples (step, S1330).

Meanwhile, in the case that the N is not smaller than 2, the encoding apparatus/decoding apparatus may select $2N_{th}$ neighboring samples in a reference line adjacent to the current block as a reference sample for the CCLM parameter calculation (step, S1335). Here, the $N_{th}$ may be 4. Later, the encoding apparatus/decoding apparatus may derive the parameters α and β for the CCLM prediction based on the selected reference samples (step, S1330).

Referring to FIG. 13a again, in the case that the parameters for CCLM prediction for the current chroma block is calculated, the encoding apparatus/decoding apparatus may perform the CCLM prediction based on the parameters and generate a prediction sample for the current chroma block (step, S1340). For example, the encoding apparatus/decoding apparatus may generate a prediction sample for the current chroma block based on the calculated parameters and Equation 1 described above in which reconstructed samples of the current luma block for the current chroma block.

Meanwhile, in the present disclosure, in deriving the CCLM parameter, an embodiment which is different from the present embodiment of reducing operation complexity for deriving the CCLM parameter may be proposed.

Particularly, in order to solve the problem of increase of CCLM parameter operation amount as the chroma block size increase described above, the present embodiment proposes a method of configuring a pixel selection upper limit $N_{th}$ adaptively.

For example, according to the present embodiment, the $N_{th}$ may be configured to a block size adaptively as below.

Method 1 in the present embodiment (proposed method 1)

In the case that a current chroma block is a chroma block of 2×2 size, $N_{th}$ may be set to 1 ($N_{th}$=1).

In the case that N=2 in the current chroma block of N×M size or M×N size (here, e.g., N<M), $N_{th}$ may be set to 2 ($N_{th}$=2).

In the case that N>2 in the current chroma block of N×M size or M×N size (here, e.g., N<=M), $N_{th}$ may be set to 4 ($N_{th}$=4).

Alternatively, for example, according to the present embodiment, the $N_{th}$ may be configured to a block size adaptively as below.

Method 2 in the present embodiment (proposed method 2)

In the case that a current chroma block is a chroma block of 2×2 size, $N_{th}$ may be set to 1 ($N_{th}$=1).

In the case that N=2 in the current chroma block of N×M size or M×N size (here, e.g., N<M), $N_{th}$ may be set to 2 ($N_{th}$=2).

In the case that N=4 in the current chroma block of N×M size or M×N size (here, e.g., N<=M), $N_{th}$ may be set to 2 ($N_{th}$=2).

In the case that N>4 in the current chroma block of N×M size or M×N size (here, e.g., N<=M), $N_{th}$ may be set to 4 ($N_{th}$=4).

Alternatively, for example, according to the present embodiment, the $N_{th}$ may be configured to a block size adaptively as below.

Method 3 in the present embodiment (proposed method 3)

In the case that a current chroma block is a chroma block of 2×2 size, $N_{th}$ may be set to 1 ($N_{th}$=1).

In the case that N=2 in the current chroma block of N×M size or M×N size (here, e.g., N<M), $N_{th}$ may be set to 2 ($N_{th}$=2).

In the case that N=4 in the current chroma block of N×M size or M×N size (here, e.g., N<=M), $N_{th}$ may be set to 4 ($N_{th}$=4).

In the case that N>4 in the current chroma block of N×M size or M×N size (here, e.g., N<=M), $N_{th}$ may be set to 8 ($N_{th}$=8).

Method 1 to method 3 described above in the present embodiment may reduce a complexity of the worst case in the case that the current chroma block is 2×2 by about 40%, and since $N_{th}$ may be adaptively applied to each chroma block size, encoding loss may be minimized. In addition, for example, since method 1 and method 3 may apply $N_{th}$ to 4 in the case of N>2, this may proper to high quality image encoding. Since method 2 may reduce $N_{th}$ to 2 even in the case of N=4, CCLM complexity may be reduced significantly, and may proper to low image quality or middle image quality.

As described in method 1 to method 3, according to the present embodiment, $N_{th}$ may be configured adaptively to a block size, and through this, a reference sample number for deriving an optimized CCLM parameter may be selected.

The encoding apparatus/decoding apparatus may set the upper limit $N_{th}$ for neighboring sample selection, and then, calculate a CCLM parameter by selecting a chroma block neighboring sample as described above.

An amount of CCLM parameter calculation according to a chroma block size in the case to which the present embodiment described above is applied may be represented as the following table.

TABLE 22

| Block size | Original CCLM | Number of operations ( multiplication + sums ) | | |
|---|---|---|---|---|
| | | Proposed method 1 ($N_{th}$ = 1, 2, 4) | Proposed method 2 ($N_{th}$ = 1, 2, 2, 4,) | Proposed method 2 ($N_{th}$ = 1, 2, 4, 8) |
| 2 × 2 | 24 | 14 | 14 | 14 |
| N = 2 | 24 | 24 | 24 | 24 |
| N = 4 | 44 | 44 | 24 | 44 |
| N = 8 | 84 | 44 | 44 | 84 |
| N = 16 | 164 | 44 | 44 | 84 |
| N = 32 | 324 | 44 | 44 | 84 |

As represented in Table 22 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the $N_{th}$ value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.

In the case that the cclm_reduced_sample_flag is 0 (false), it is configured $N_{th}$=2 for all blocks, and a CCLM parameter calculation is performed through the neighboring sample selection method of the present embodiment proposed in FIG. 8 described above.

In the case that the cclm_reduced_sample_flag is 1 (true), a CCLM parameter calculation is performed through method 1 of the present embodiment described above.

Alternatively, in the case that the information representing the applied method is transmitted in a unit of slice, picture or sequence, as described below, the method among method 1 to method 3 may be selected based on the information transmitted through a high level syntax (HLS), and based on the selected method, the CCLM parameter may be calculated.

For example, the information representing the applied method signaled through a slice header may be represented as the following table.

TABLE 23

| slice_header( ) { | Descriptor |
|---|---|
| ... | |
| cclm_reduced_sample_threshold | f(2) |
| ... | | cclm_reduced_sample_threshold may represent a syntax element of the information representing the applied method.

Alternatively, for example, the information representing the applied method signaled through a Picture Parameter Set (PPS) may be represented as the following table.

TABLE 24

| pic_parameter_set_rbsp( ) { | Descriptor |
|---|---|
| ... | |

TABLE 24-continued

| cclm_reduced_sample_threshold | f(2) |
|---|---|
| ... | |

Alternatively, for example, the information representing the applied method signaled through a Sequence Parameter Set (SPS) may be represented as the following table.

TABLE 25

| sps_parameter_set_rbsp( ) { | Descriptor |
|---|---|
| ... | |
| cclm_reduced_sample_threshold | f(2) |
| ... | |

The method selected based on cclm_reduced_sample_threshold value (i.e., a value derived by decoding cclm_reduced_sample_threshold) transmitted through the slice header, the PPS or the SPS may be derived as represented in the following table.

TABLE 26

| cclm_reduced_sample_threshold | Proposed method |
|---|---|
| 0 | Not apply |
| 1 | 1 ($N_{th}$ = 1, 2, 4) |
| 2 | 2 ($N_{th}$ = 1, 2, 2, 4) |
| 3 | 3 ($N_{th}$ = 1, 2, 4, 8) |

Referring to Table. 26, in the case that the cclm_reduced_sample_threshold value is 0, the methods of the present embodiment described above may not be applied to the current chroma block, in the case that the cclm_reduced_sample_threshold value is 1, method 1 may be selected as the method applied to the current chroma block, in the case that the cclm_reduced_sample_threshold value is 2, method 2 may be selected as the method applied to the current chroma block, and in the case that the cclm_reduced_sample_threshold value is 3, method 3 may be selected as the method applied to the current chroma block.

The method proposed in the present embodiment may be used a CCLM mode which is an intra-prediction mode for a chroma component, and the chroma block predicted through the CCLM mode may be used for deriving a residual image through a differential from an original image in the encoding apparatus or used for deriving a reconstructed image through an addition with a residual signal in the decoding apparatus.

Meanwhile, in the case that the information representing one of the methods is transmitted in a unit of CU, slice, picture and sequence, the encoding apparatus may determine one of method 1 to method 3 and transmit the information to the decoding apparatus as below.

In the case that the information representing whether the method of the present embodiment described above is applied is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 2 for all blocks and a CCLM parameter calculation is performed through the reference sample selection method of the present embodiment proposed in FIG. 8 described above, cclm_reduced_sample_flag of value 0 (false) is transmitted.

2) In the case that encoding efficiency is good when it is configured that method 1 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in Table 23, Table 24 or Table 25 described above and transmit the information representing one method among the methods. The encoding apparatus may configure the method applied among the methods by considering a size of input image or in accordance with an encoding target bitrate.

1) For example, in the case that an input image is HD quality or more, the encoding apparatus may apply method 3 ($N_{th}$=1, 2, 4 or 8), and in the case that an input image is HD quality or less, the encoding apparatus may apply method 1 ($N_{th}$=1, 2 or 4).

2) In the case that image encoding of high quality is required, the encoding apparatus may apply method 3 ($N_{th}$=1, 2, 4 or 8), and in the case that image encoding of normal quality is required, the encoding apparatus may apply method 2 ($N_{th}$=1, 2, 2 or 4) or method 1 ($N_{th}$=1, 2 or 4).

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 14A:
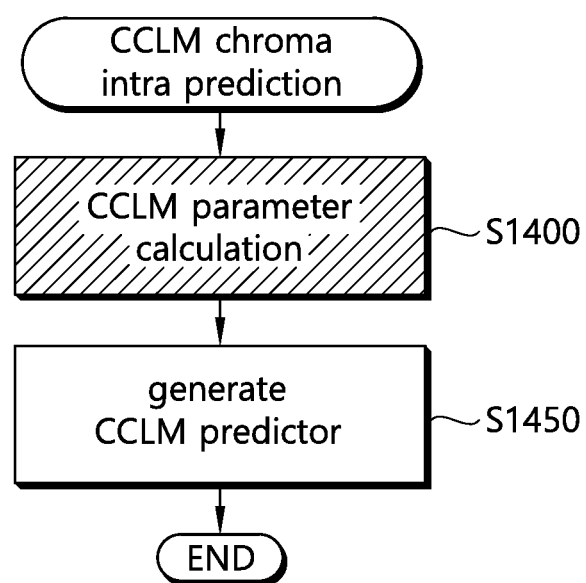
FIGS. 14a and 14b are diagrams for describing a procedure of performing CCLM prediction based on the CCLM parameters of the current chroma block derived according to method 1 of the present embodiment described above.
Figure 14B:
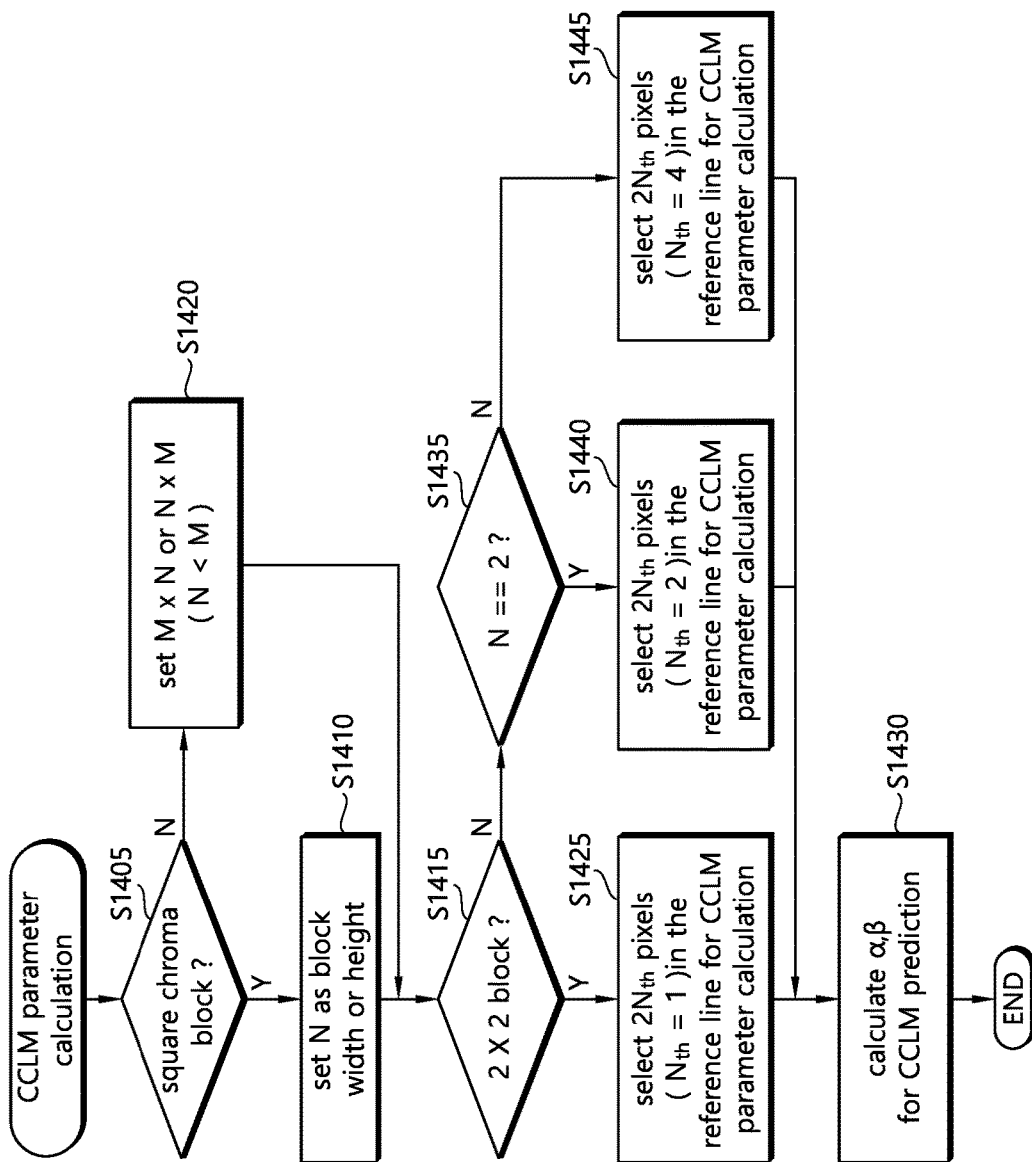

FIGS. 14a and 14b are diagrams for describing a procedure of performing CCLM prediction based on the CCLM parameters of the current chroma block derived according to method 1 of the present embodiment described above.

Referring to FIG. 14a, the encoding apparatus/decoding apparatus may calculate a CCLM parameter for the current block (step, S1400). For example, the CCLM parameter may be calculated as the present embodiment shown in FIG. 14b.

FIG. 14b may illustrate a specific embodiment of calculating the CCLM parameter. For example, referring to FIG. 14b, the encoding apparatus/decoding apparatus may determine whether the current chroma block is a square chroma block (step, S1405).

In the case that the current chroma block is a square chroma block, the encoding apparatus/decoding apparatus may set a width or a height of the current block to N (step, S1410) and determine whether a size of the current chroma block is 2×2 (step, S1415).

Alternatively, in the case that the current chroma block is not a square chroma block, a size of the current chroma block may be derived in M×N size or N×M size (step, S1420). The encoding apparatus/decoding apparatus determine whether a size of the current chroma block is 2×2 (step, S1415). Here, the M represents a value greater than the N (N<M).

In the case that a size of the current chroma block is 2×2, the encoding apparatus/decoding apparatus may select $2N_{th}$ neighboring samples in a reference line adjacent to the current block as a reference sample for the CCLM parameter calculation (step, S1425). Here, the $N_{th}$ may be 1 ($N_{th}$=1).

The encoding apparatus/decoding apparatus may derive parameters α and β for the CCLM prediction based on the selected reference samples (step, S1430).

Meanwhile, in the case that a size of the current chroma block is not 2×2, the encoding apparatus/decoding apparatus determine whether the N is 2 (N==2) (step, S1435).

In the case that the N is 2, the encoding apparatus/decoding apparatus may select $2N_{th}$ neighboring samples in a reference line adjacent to the current block as a reference sample for the CCLM parameter calculation (step, S1440). Here, the $N_{th}$ may be 2 ($N_{th}$=2). Later, the encoding apparatus/decoding apparatus may derive the parameters α and β for the CCLM prediction based on the selected reference samples (step, S1430).

Alternatively, in the case that the N is not 2, the encoding apparatus/decoding apparatus may select $2N_{th}$ neighboring samples in a reference line adjacent to the current block as a reference sample for the CCLM parameter calculation (step, S1445). Here, the $N_{th}$ may be 4 ($N_{th}$=4). Later, the encoding apparatus/decoding apparatus may derive the parameters α and β for the CCLM prediction based on the selected reference samples (step, S1430).

Referring to FIG. 14a again, in the case that the parameters for CCLM prediction for the current chroma block is calculated, the encoding apparatus/decoding apparatus may perform the CCLM prediction based on the parameters and generate a prediction sample for the current chroma block (step, S1450). For example, the encoding apparatus/decoding apparatus may generate a prediction sample for the current chroma block based on the calculated parameters and Equation 1 described above in which reconstructed samples of the current luma block for the current chroma block.

Figure 15A:
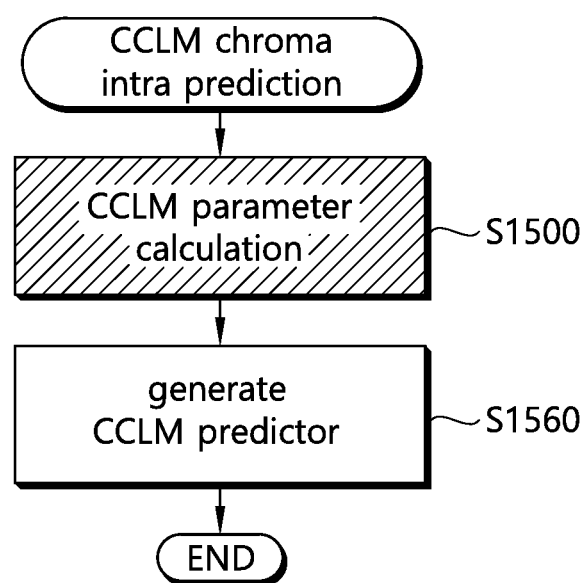
FIGS. 15a and 15b are diagrams for describing a procedure of performing CCLM prediction based on the CCLM parameters of the current chroma block derived according to method 2 of the present embodiment described above.
Figure 15B:
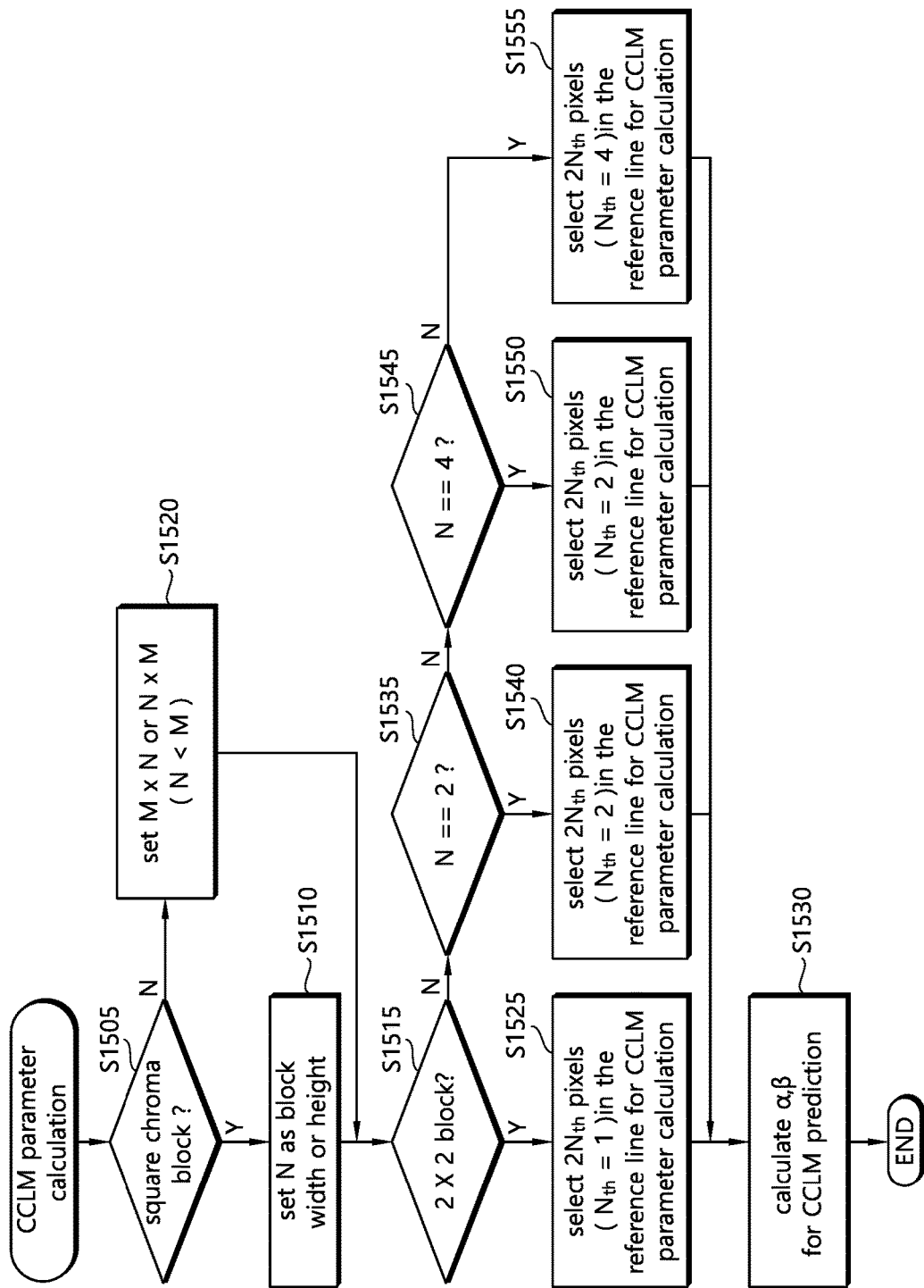

FIGS. 15a and 15b are diagrams for describing a procedure of performing CCLM prediction based on the CCLM parameters of the current chroma block derived according to method 2 of the present embodiment described above.

Referring to FIG. 15a, the encoding apparatus/decoding apparatus may calculate a CCLM parameter for the current block (step, S1500). For example, the CCLM parameter may be calculated as the present embodiment shown in FIG. 15b.

FIG. 15b may illustrate a specific embodiment of calculating the CCLM parameter. For example, referring to FIG. 15b, the encoding apparatus/decoding apparatus may determine whether the current chroma block is a square chroma block (step, S1505).

In the case that the current chroma block is a square chroma block, the encoding apparatus/decoding apparatus may set a width or a height of the current block to N (step, S1510) and determine whether a size of the current chroma block is 2×2 (step, S1515).

Alternatively, in the case that the current chroma block is not a square chroma block, a size of the current chroma block may be derived in M×N size or N×M size (step, S1520). The encoding apparatus/decoding apparatus determine whether a size of the current chroma block is 2×2 (step, S1515). Here, the M represents a value greater than the N (N<M).

In the case that a size of the current chroma block is 2×2, the encoding apparatus/decoding apparatus may select $2N_{th}$ neighboring samples in a reference line adjacent to the current block as a reference sample for the CCLM parameter calculation (step, S1525). Here, the $N_{th}$ may be 1 ($N_{th}$=1).

The encoding apparatus/decoding apparatus may derive parameters α and β for the CCLM prediction based on the selected reference samples (step, S1530).

Meanwhile, in the case that a size of the current chroma block is not 2×2, the encoding apparatus/decoding apparatus determine whether the N is 2 (N==2) (step, S1535).

In the case that the N is 2, the encoding apparatus/decoding apparatus may select $2N_{th}$ neighboring samples in a reference line adjacent to the current block as a reference sample for the CCLM parameter calculation (step, S1540). Here, the $N_{th}$ may be 2 ($N_{th}$=2). Later, the encoding apparatus/decoding apparatus may derive the parameters α and β for the CCLM prediction based on the selected reference samples (step, S1530).

Meanwhile, in the case that the N is not 2, the encoding apparatus/decoding apparatus may determine whether the N is 4 (N==4) (step, S1545).

In the case that the N is 4, the encoding apparatus/decoding apparatus may select $2N_{th}$ neighboring samples in a reference line adjacent to the current block as a reference sample for the CCLM parameter calculation (step, S1550). Here, the $N_{th}$ may be 2 ($N_{th}$=2). Later, the encoding apparatus/decoding apparatus may derive the parameters α and β for the CCLM prediction based on the selected reference samples (step, S1530).

Alternatively, in the case that the N is not 4, the encoding apparatus/decoding apparatus may select $2N_{th}$ neighboring samples in a reference line adjacent to the current block as a reference sample for the CCLM parameter calculation (step, S1555). Here, the $N_{th}$ may be 4 ($N_{th}$=4). Later, the encoding apparatus/decoding apparatus may derive the parameters α and β for the CCLM prediction based on the selected reference samples (step, S1530).

Referring to FIG. 15a again, in the case that the parameters for CCLM prediction for the current chroma block is calculated, the encoding apparatus/decoding apparatus may perform the CCLM prediction based on the parameters and generate a prediction sample for the current chroma block (step, S1560). For example, the encoding apparatus/decoding apparatus may generate a prediction sample for the current chroma block based on the calculated parameters and Equation 1 described above in which reconstructed samples of the current luma block for the current chroma block.

Figure 16A:
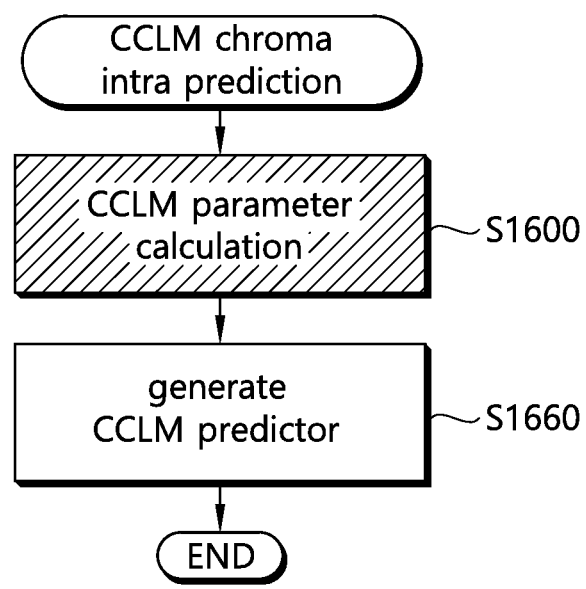
FIGS. 16a and 16b are diagrams for describing a procedure of performing CCLM prediction based on the CCLM parameters of the current chroma block derived according to method 3 of the present embodiment described above.
Figure 16B:
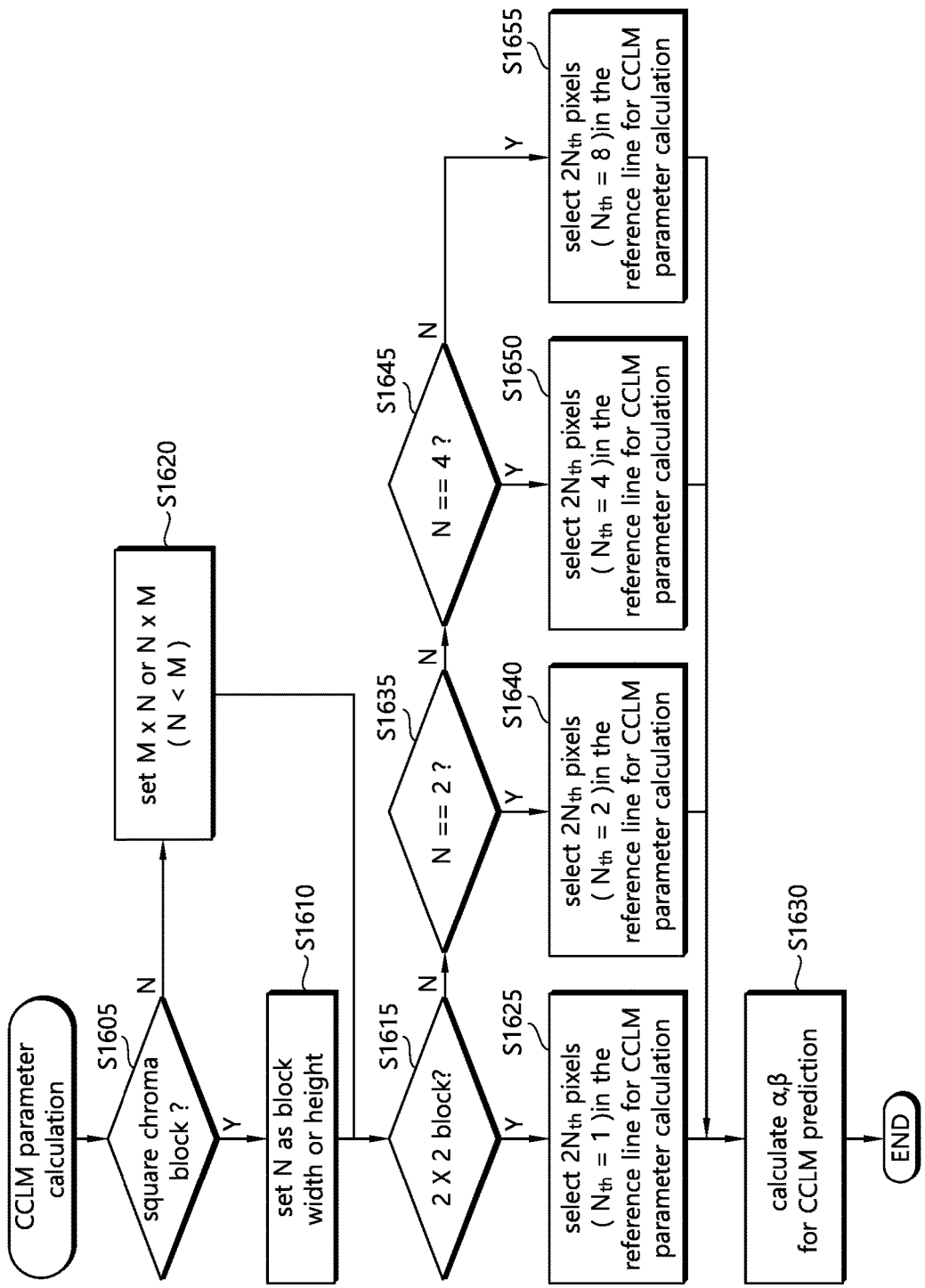

FIGS. 16a and 16b are diagrams for describing a procedure of performing CCLM prediction based on the CCLM parameters of the current chroma block derived according to method 3 of the present embodiment described above.

Referring to FIG. 16a, the encoding apparatus/decoding apparatus may calculate a CCLM parameter for the current block (step, S1600). For example, the CCLM parameter may be calculated as the present embodiment shown in FIG. 16b.

FIG. 16b may illustrate a specific embodiment of calculating the CCLM parameter. For example, referring to FIG. 16b, the encoding apparatus/decoding apparatus may determine whether the current chroma block is a square chroma block (step, S1605).

In the case that the current chroma block is a square chroma block, the encoding apparatus/decoding apparatus may set a width or a height of the current block to N (step, S1610) and determine whether a size of the current chroma block is 2×2 (step, S1615).

Alternatively, in the case that the current chroma block is not a square chroma block, a size of the current chroma block may be derived in M×N size or N×M size (step, S1620). The encoding apparatus/decoding apparatus determine whether a size of the current chroma block is 2×2 (step, S1615). Here, the M represents a value greater than the N (N<M).

In the case that a size of the current chroma block is 2×2, the encoding apparatus/decoding apparatus may select 2N$_{th}$ neighboring samples in a reference line adjacent to the current block as a reference sample for the CCLM parameter calculation (step, S1625). Here, the N$_{th}$ may be 1 (N$_{th}$=1).

The encoding apparatus/decoding apparatus may derive parameters α and β for the CCLM prediction based on the selected reference samples (step, S1630).

Meanwhile, in the case that a size of the current chroma block is not 2×2, the encoding apparatus/decoding apparatus determine whether the N is 2 (N==2) (step, S1635).

In the case that the N is 2, the encoding apparatus/decoding apparatus may select 2N$_{th}$ neighboring samples in a reference line adjacent to the current block as a reference sample for the CCLM parameter calculation (step, S1640). Here, the N$_{th}$ may be 2 (N$_{th}$=2). Later, the encoding apparatus/decoding apparatus may derive the parameters α and β for the CCLM prediction based on the selected reference samples (step, S1630).

Meanwhile, in the case that the N is not 2, the encoding apparatus/decoding apparatus may determine whether the N is 4 (N==4) (step, S1645).

In the case that the N is 4, the encoding apparatus/decoding apparatus may select 2N$_{th}$ neighboring samples in a reference line adjacent to the current block as a reference sample for the CCLM parameter calculation (step, S1650). Here, the N$_{th}$ may be 4 (N$_{th}$=4). Later, the encoding apparatus/decoding apparatus may derive the parameters α and β for the CCLM prediction based on the selected reference samples (step, S1630).

Alternatively, in the case that the N is not 4, the encoding apparatus/decoding apparatus may select 2N$_{th}$ neighboring samples in a reference line adjacent to the current block as a reference sample for the CCLM parameter calculation (step, S1655). Here, the N$_{th}$ may be 8 (N$_{th}$=8). Later, the encoding apparatus/decoding apparatus may derive the parameters α and β for the CCLM prediction based on the selected reference samples (step, S1630).

Referring to FIG. 16a again, in the case that the parameters for CCLM prediction for the current chroma block is calculated, the encoding apparatus/decoding apparatus may perform the CCLM prediction based on the parameters and generate a prediction sample for the current chroma block (step, S1660). For example, the encoding apparatus/decoding apparatus may generate a prediction sample for the current chroma block based on the calculated parameters and Equation 1 described above in which reconstructed samples of the current luma block for the current chroma block.

Meanwhile, in the case that subsampling is required in deriving a neighboring reference sample for a CCLM parameter calculation, the present disclosure proposes an embodiment of selecting a subsampling sample more efficiently.

Figure 17:
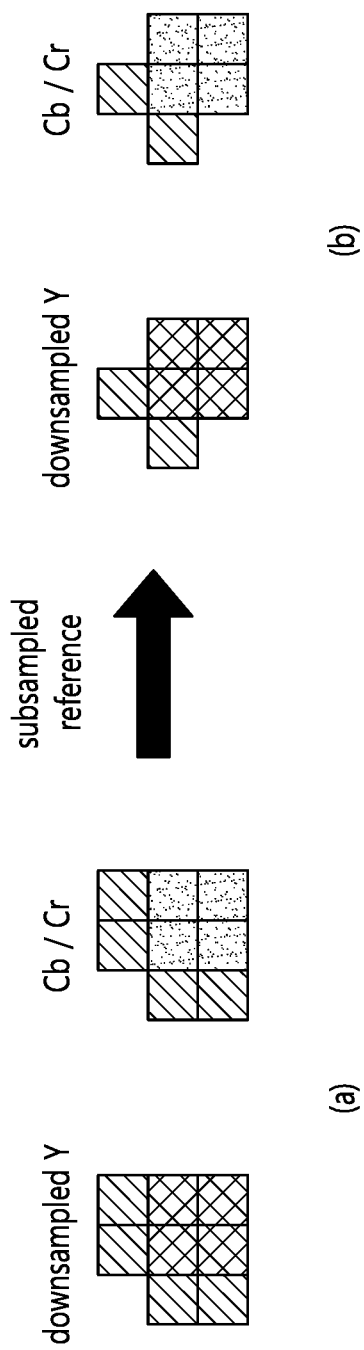
FIG. 17 illustrates an example of selecting a neighboring reference sample of a chroma block.

FIG. 17 illustrates an example of selecting a neighboring reference sample of a chroma block.

Referring to (a) of FIG. 17, in a chroma block of 2×2 size (N=2), CCLM parameters α and β for the chroma block may be calculated based on 4 neighboring reference samples. The neighboring reference samples may include 4 neighboring reference samples of the luma block and 4 neighboring reference samples of the chroma block. In addition, like the present embodiments described above, in the case that N$_{th}$ for the chroma block of 2×2 size is set to 1 (N$_{th}$=1), referring to (b) of FIG. 17, CCLM parameters α and β for the chroma block may be calculated based on 2 neighboring reference samples. However, as shown in FIG. 17, in the case of using neighboring reference samples which are sub-sampled in a half, since the neighboring reference samples are crowded in a top right side of the current chroma block, a problem occurs that diversity of neighboring reference samples is not considered in CCLM parameter calculation, which may be a cause of CCLM parameter accuracy degradation.

Figure 18A:
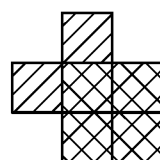
FIGS. 18a to 18c illustrates neighboring reference samples derived through the existing subsampling and neighboring reference samples derived through subsampling according to the present embodiment.
Figure 18A:
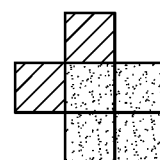
Figure 18A:
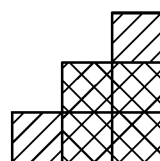
Figure 18A:
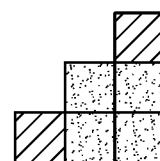
Figure 18B:
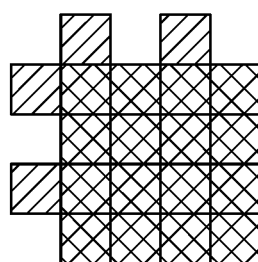
Figure 18B:
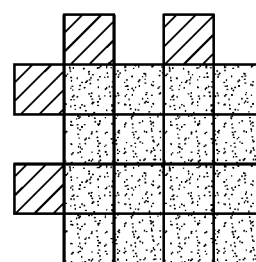
Figure 18B:
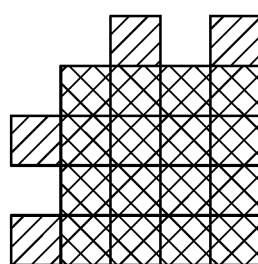
Figure 18B:
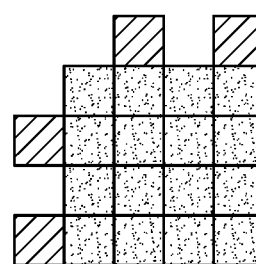
Figure 18C:
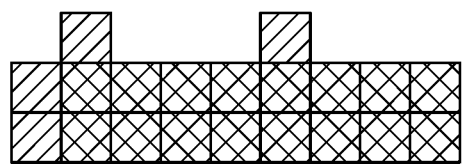
Figure 18C:
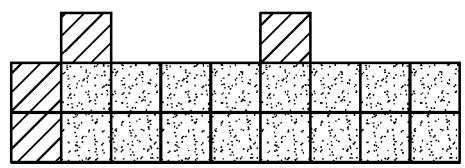
Figure 18C:
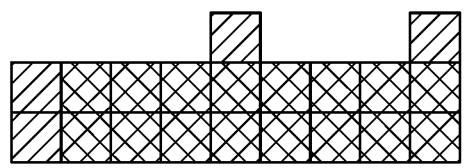
Figure 18C:
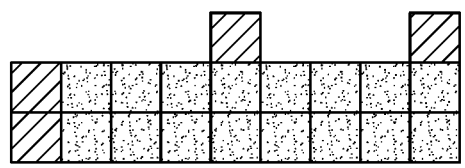

FIGS. 18a to 18c illustrates neighboring reference samples derived through the existing subsampling and neighboring reference samples derived through subsampling according to the present embodiment.

As shown in FIG. 18a and FIG. 18b, a neighboring sample which is far from a top left side of the current chroma block is preferentially selected through the subsampling according to the present embodiment, more diverse sample values may be selected in CCLM parameter calculation.

In addition, as shown in FIG. 18c, the present embodiment proposes subsampling that selects a side far from a top left side preferentially even for a non-square chroma block like n×2 size or 2×n size. Through this, more diverse sample values may be selected in CCLM parameter calculation, and through this, CCLM parameter calculation accuracy may be improved.

Meanwhile, the existing subsampling may be performed based on the following equation.

$$Idx\_w=(x*\text{width})/\text{subsample\_num}$$

$$Idx\_h=(y*\text{height})/\text{subsample\_num} \quad \text{[Equation 5]}$$

Here, Idx_w may represent a neighboring reference sample (or position of neighboring reference sample) adjacent to a top current chroma block which is derived through subsampling, and Idx_h may represent a neighboring reference sample (or position of neighboring reference sample) adjacent to a left current chroma block which is derived through subsampling. Further, width may represent a width of the current chroma block, and height may represent a height of the current chroma block. In addition, subsample_num may represent the number of neighboring reference samples (the number of neighboring reference samples adjacent to a side) which is derived through subsampling.

For example, the subsampling performed based on Equation 5 above may be performed as below.

x of Equation 5 above is a variable and may be increased from 0 to a reference sample number of top neighboring reference samples of the current chroma block after subsampling. As an example, in the case that 2 top neighboring reference samples are selected in the current chroma block of which width is 16, the width of Equation 5 is 16, and x may vary from 0 to 1. In addition, since the Subsample_num is 2, 0 and 8 may be selected as the Idx_w value. Accordingly, in the case that x component and y component of a top left sample position of the current chroma block are 0, the top neighboring reference sample of which x coordinate is 0 and top the neighboring reference sample of which x coordinate is 8 may be selected among the top neighboring reference samples through the subsampling.

y of Equation 5 above is a variable and may be increased from 0 to a reference sample number of left neighboring reference samples of the current chroma block after subsampling. As an example, in the case that 4 left neighboring reference samples are selected in the current chroma block of which height is 32, the height of Equation 5 is 32, and y may vary from 0 to 3. In addition, since the Subsample_num is 4, 0, 8, 16 and 24 may be selected as the Idx_h value. Accordingly, in the case that x component and y component of a top left sample position of the current chroma block are 0, the left neighboring reference sample of which y coordinate is 0, the left neighboring reference sample of which y coordinate is 8, the left neighboring reference sample of which y coordinate is 16 and the left neighboring reference sample of which y coordinate is 24 may be selected among the left neighboring reference samples through the subsampling.

Referring to Equation 5 above, only the samples near to the top left of the current chroma block may be selected through the subsampling.

Therefore, according to the present embodiment, subsampling may be performed based on an equation different from Equation 5 above. For example, the subsampling proposed in the present embodiment may be performed based on the following equation.

$$Idx\_w = \text{width} - 1 - (x*\text{width})/\text{subsample\_num\_width}$$

$$Idx\_h = \text{height} - 1 - (y*\text{height})/\text{subsample\_num\_height} \quad \text{[Equation 6]}$$

Herein, subsample_num_width may represent a top neighboring reference sample number derived through subsampling, and subsample_num_height may represent a left neighboring reference sample number derived through subsampling.

In addition, x is a variable and may be increased from 0 to a reference sample number of top neighboring reference samples of the current chroma block after subsampling. Further, y is a variable and may be increased from 0 to a reference sample number of left neighboring reference samples of the current chroma block after subsampling.

For example, referring to Equation 6 above, in the case that 2 top neighboring reference samples are selected in the current chroma block of which width is 16, the width of Equation 6 is 16, and x may vary from 0 to 1. In addition, since the subsample_num_width is 2, 15 and 7 may be selected as the Idx_w value. Accordingly, in the case that x component and y component of a top left sample position of the current chroma block are 0, the top neighboring reference sample of which x coordinate is 15 and top the neighboring reference sample of which x coordinate is 7 may be selected among the top neighboring reference samples through the subsampling. That is, among the top neighboring reference samples of the current chroma block, the top neighboring reference sample which is far from the top left side of the current chroma block may be selected.

In addition, for example, referring to Equation 6 above, in the case that 4 left neighboring reference samples are selected in the current chroma block of which height is 32, the height of Equation 6 is 32, and y may vary from 0 to 3. In addition, since the subsample_num_height is 4, 31, 23, 15 and 7 may be selected as the Idx_h value. Accordingly, in the case that x component and y component of a top left sample position of the current chroma block are 0, the left neighboring reference sample of which y coordinate is 31, the left neighboring reference sample of which y coordinate is 23, the left neighboring reference sample of which y coordinate is 15 and the left neighboring reference sample of which y coordinate is 7 may be selected among the left neighboring reference samples through the subsampling.

Meanwhile, the subsample_num_width and the subsample_num_height of Equation 6 above may be derived based on a size of the current chroma block. For example, the subsample_num_width and the subsample_num_height may be derived as represented in the following table.

TABLE 27

| Chroma block size | (subsample_num_width, subsample_num_height) |
|---|---|
| 2 × 2, 2 × N, N × 2 (N > 2) | (2, 2) |
| 4 × 4, 4 × N, N × 4 (N > 4) | (4, 4) |
| 8 × 8, 8 × N, N × 8 (N > 8) | (8, 8) |
| 16 × 16, 16 × N, N × 16 (N > 16) | (16, 16) |
| 32 × 32, 32 × N, N × 32 (N > 32) | (32, 32) |
| 64 × 64 | (64, 64) |

Referring to Table 27, subsampling may be performed for neighboring reference samples adjacent to a long side in accordance with a short side between a width and a height of the current chroma block. That is, the number of neighboring reference samples selected among the neighboring reference samples adjacent to a long side may be derived as a smaller value between a width and a height of the current chroma block. For example, it may be derived as subsample_num_width=subsample_num_height=min (width, height).

Alternatively, for example, in the case that the $N_{th}$ is derived, the subsample_num_width and the subsample_num_height may be derived based on the $N_{th}$. For example, the subsample_num_width and the subsample_num_height may be derived as represented in the following table based on the $N_{th}$.

TABLE 28 subsample_num_width = min(width,height) if $N_{th}$ >= width
subsample_num_width = min($N_{th}$, height) if $N_{th}$ < width
subsample_num_height = min(width,height) if $N_{th}$ >= height
subsample_num_height = min($N_{th}$, width) if $N_{th}$ < height Herein, min (A, B) may represent a smaller value between A and B.

Alternatively, for example, based on a predetermined look-up table (LUT), subsampling may be performed for deriving an optimal number of neighboring reference samples in accordance with a shape of the current chroma block. For example, the LUT may be derived as represented in the following table.

TABLE 29

| Chroma block size | (subsample_num_width, subsample_num_height) |
|---|---|
| 2 × 2, 2 × 4, 2 × 8, 2 × 16, 2 × 32 | (2, 2), (2, 2), (2, 6), (2, 14), (2, 30) |
| 4 × 2, 8 × 2, 16 × 2, 32 × 2 | (2, 2), (6, 2), (14, 2), (30, 2) |
| 4 × 4, 4 × 8, 4 × 16, 4 × 32 | (4, 4), (4, 4), (4, 12), (4, 28) |
| 8 × 4, 16 × 4, 32 × 4 | (4, 4), (12, 4), (28, 4) |
| 8 × 8, 8 × 16, 8 × 32 | (8, 8), (8, 8), (8, 24) |
| 16 × 8, 32 × 8 | (8, 8), (24, 8) |
| 16 × 16, 16 × 32 | (16, 16), (16, 16) |
| 32 × 16 | (16, 16) |
| 32 × 32 | (32, 32) |

Referring to Table 29 above, the selected number of neighboring reference samples may be increased in comparison with the subsampling described above, and through this, a CCLM parameter may be calculated in higher accuracy. In subsampling for deriving 6 neighboring reference samples in the example described above, first 6 positions (idx_w or idx_h) may be selected among subsampling for deriving 8 neighboring reference samples, and in subsampling for deriving 12 or 14 neighboring reference samples, first 12 or 14 positions may be selected among subsampling for deriving 16 neighboring reference samples. In addition, in subsampling for deriving 24 or 28 neighboring reference samples, first 24 or 28 positions may be selected among subsampling for deriving 32 neighboring reference samples.

Alternatively, in order to prevent increase of hardware complexity, subsampling for deriving simplified number of neighboring reference samples may be performed. For example, the LUT may be derived as represented in the following table.

TABLE 30

| Chroma block size | (subsample_num_width, subsample_num_height) |
|---|---|
| 2 × 2, 2 × 4, 2 × 8, 2 × 16, 2 × 32 | (2, 2), (2, 2), (2, 6), (2, 6), (2, 6) |
| 4 × 2, 8 × 2, 16 × 2, 32 × 2 | (2, 2), (6, 2), (6, 2), (6, 2) |
| 4 × 4, 4 × 8, 4 × 16, 4 × 32 | (4, 4), (4, 4), (2, 6), (2, 6) |
| 8 × 4, 16 × 4, 32 × 4 | (4, 4), (6, 2), (6, 2) |
| 8 × 8, 8 × 16, 8 × 32 | (4, 4), (4, 4), (2, 6) |
| 16 × 8, 32 × 8 | (4, 4), (6, 2) |
| 16 × 16, 16 × 32 | (4, 4), (4, 4) |
| 32 × 16 | (4, 4) |
| 32 × 32 | (4, 4) |

Referring to Table 30 above, a maximum value of summation of the subsample_num_width and the subsample_num_height may set to 8. Through this, hardware complexity may be reduced, and simultaneously, a CCLM parameter may be calculated efficiently.

In subsampling for deriving 6 neighboring reference samples in the example described above, first 6 positions (idx_w or idx_h) may be selected among subsampling for deriving 8 neighboring reference samples.

According to the proposed method, without need to transmit additional information, a value promised in an encoder or a decoder may be used, or it may be transmitted whether to use the proposed method or a value in a unit of CU, slice, picture and sequence.

In the case that the subsampling using the LUT as represented in Table 29 and Table 30 described above is performed, the encoding apparatus and the decoding apparatus may use the subsample_num_width and subsample_num_height numbers determined in the Table (i.e., LUT), and in the case that the $N_{th}$ is used, the subsample_num_width and the subsample_num_height may be determined based on the $N_{th}$ value. In addition, in the other cases, the value derived as Table 28 may be used as a default subsample_num_width and a subsample_num_height number.

Meanwhile, in the case that the proposed method is transmitted in a unit of CU, that is, the information representing whether to apply subsampling using Equation 6 described above is transmitted, a method for the decoding apparatus to perform a CCLM prediction by parsing cclm_subsample_flag as below, when an intra-prediction mode of the current chroma block is the CCLM mode.

In the case that the cclm_subsample_flag is 0 (false), a neighboring reference sample selection and a CCLM parameter calculation are performed through the existing subsampling method (subsampling based on Equation 5 described above).

In the case that the cclm_subsample_flag is 1 (true), a neighboring reference sample selection and a CCLM parameter calculation are performed through the proposed subsampling method (subsampling based on Equation 6 described above).

In the case that the information representing whether to use the proposed method is transmitted in in a unit of slice, picture and sequence, the information may be transmitted through high level syntax (HLS) as below. The decoding apparatus may select a subsampling method which is performed based on the information.

For example, the information representing whether to use the proposed method signaled through a slice header may be represented as the following Table.

TABLE 31

| slice_header( ) { | Descriptor |
|---|---|
| . . . | |
| cclm_subsample_flag | f(1) |
| . . . | | cclm_reduced_sample_flag may represent a syntax element of the information representing whether to use the proposed method.

Alternatively, for example, the information representing whether to use the proposed method signaled through a Picture Parameter Set (PPS) may be represented as the following table.

TABLE 32

| pic_parameter_set_rbsp( ) { | Descriptor |
|---|---|
| . . . | |
| cclm_subsample_flag | f(1) |
| . . . | |

Alternatively, for example, the information representing whether to use the proposed method signaled through a Sequence Parameter Set (SPS) may be represented as the following table.

TABLE 33

| sps_parameter_set_rbsp( ) { | Descriptor |
|---|---|
| . . . | |
| cclm_subsample_flag | f(1) |
| . . . | |

The method selected based on cclm_reduced_sample_flag value (i.e., a value derived by decoding cclm_reduced_sample_flag) transmitted through the slice header, the PPS or the SPS may be derived as represented in the following table.

TABLE 34

| cclm_subsample_flag | Proposed method |
|---|---|
| 0 | Not apply (Use Equation 5) |
| 1 | Apply (Use Equation 6) |

Referring to Table. 34, in the case that the cclm_reduced_sample_flag value is 0, the subsampling using Equation 5 may be performed, and in the case that the cclm_reduced_sample_flag value is 1, the subsampling using Equation 6 may be performed.

Meanwhile, in the case that a predetermined value is used in the encoding apparatus and the decoding apparatus without transmitting the additional information, the encoding apparatus may perform the embodiment described above in the same manner of the decoding apparatus and perform a CCLM parameter calculation based on the selected neighboring reference samples.

Alternatively, in the case that the information representing whether to apply the proposed subsampling method is transmitted in a unit of CU, slice, picture and sequence, the encoding apparatus may determine whether to apply the proposed subsampling method, and then, transmit information of the determined method to the decoding apparatus.

In the case that the information representing whether to apply the proposed subsampling method is transmitted in a unit of CU, when an intra-prediction mode of the current chroma block is CCLM mode, the encoding apparatus may determine a side of good encoding efficiency between two following cases through RDO and transmit information of the value representing the corresponding case to the decoding apparatus.

1) In the case that encoding efficiency is good when a CCLM parameter calculation are performed through the existing subsampling (subsampling based on Equation 5 described above), cclm_reduced_sample_flag of value 0 (false) is transmitted.

2) In the case that encoding efficiency is good when a CCLM parameter calculation are performed through the proposed subsampling (subsampling based on Equation 5 described above), cclm_reduced_sample_flag of value 1 (true) is transmitted.

In the case that the information representing whether to apply the proposed subsampling method is transmitted in a unit of slice, picture or sequence, the encoding apparatus may add a high level syntax (HLS) as represented in Table 31, Table 32 or Table 33 described above and transmit the information.

Figure 19:
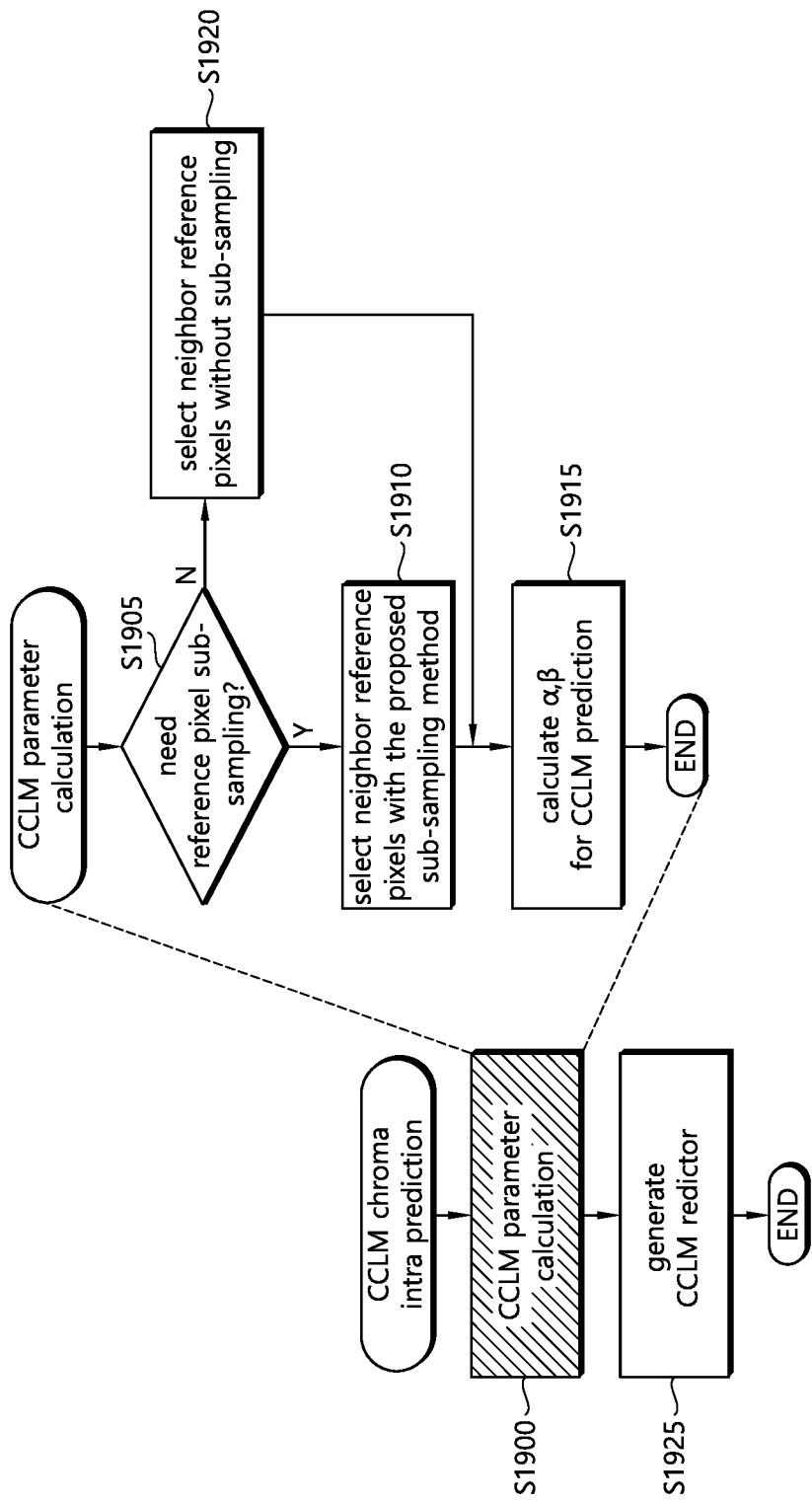
FIG. 19 illustrates an example of performing a CCLM prediction using subsampling using Equation 6 described above.

FIG. 19 illustrates an example of performing a CCLM prediction using subsampling using Equation 6 described above.

Referring to FIG. 19, the encoding apparatus/decoding apparatus may calculate a CCLM parameter for the current block (step, S1900).

Particularly, the encoding apparatus/decoding apparatus may determine whether subsampling for neighboring samples of the current chroma block is required (step, S1905).

For example, in order to derive CCLM parameters for the current chroma block, in the case that top neighboring samples of a smaller number than that of a width of the current chroma block are selected, it is required to perform the subsampling for top neighboring samples of the current chroma block. In addition, for example, in order to derive CCLM parameters for the current chroma block, in the case that top neighboring samples of a smaller number than that of a height of the current chroma block are selected, it is required to perform the subsampling for left neighboring samples of the current chroma block.

In the case that the subsampling is required, the encoding apparatus/decoding apparatus may select a specific number of neighboring samples by performing subsampling using Equation 6 for the neighboring samples (step, S1910). Later, the encoding apparatus/decoding apparatus may calculate CCLM parameters for the current chroma block based on the selected neighboring samples (step, S1915).

In the case that the subsampling is not required, the encoding apparatus/decoding apparatus may not perform the subsampling but select the neighboring samples of the current chroma block (step, S1920). Later, the encoding apparatus/decoding apparatus may calculate the CCLM parameters for the current chroma block based on the selected neighboring samples (step, S1915).

In the case that the CCLM parameters are derived, the encoding apparatus/decoding apparatus may generate a prediction sample of the current chroma block by performing a CCLM prediction for the current chroma block based on the CCLM parameters (step, S1925).

Meanwhile, in the present disclosure, in deriving the CCLM parameter, an embodiment which is different from the present embodiment of reducing operation complexity for deriving the CCLM parameter may be proposed.

In order to solve the problem of increase of CCLM parameter operation amount as the chroma block size increase described above, the present embodiment proposes a method of configuring a pixel selection upper limit $N_{th}$ adaptively. The $N_{th}$ may also be referred to as a maximum neighboring sample number.

In addition, in the case that N=2 (here, N is a smaller value between a width and a height of a chroma block), in order to prevent the worst case operation (a case CCLM prediction is performed for all chroma blocks, after all chroma blocks in a CTU is divided into 2×2 size) occurred in CCLM prediction for a chroma block of 2×2 size, the present embodiment proposes a method of configuring $N_{th}$ adaptively, and through this, an amount of operation for CCLM parameter calculation in the worst cast may be reduced by about 50%.

For example, according to the present embodiment, the $N_{th}$ may be configured to a block size adaptively as below.

Method 1 in the present embodiment (proposed method 1)
In the case that N=2 in the current chroma block of N×M size or M×N size, $N_{th}$ may be set to 1 ($N_{th}$=1).
In the case that N=4 in the current chroma block of N×M size or M×N size, $N_{th}$ may be set to 2 ($N_{th}$=2).
In the case that N>4 in the current chroma block of N×M size or M×N size, $N_{th}$ may be set to 4 ($N_{th}$=4).

Alternatively, for example, according to the present embodiment, the $N_{th}$ may be configured to a block size adaptively as below.

Method 2 in the present embodiment (proposed method 2)
In the case that N=2 in the current chroma block of N×M size or M×N size, $N_{th}$ may be set to 1 ($N_{th}$=1).
In the case that N=4 in the current chroma block of N×M size or M×N size, $N_{th}$ may be set to 2 ($N_{th}$=2).

Alternatively, for example, according to the present embodiment, the $N_{th}$ may be configured to a block size adaptively as below.

Method 3 in the present embodiment (proposed method 3)
In the case that N>4 in the current chroma block of N×M size or M×N size, $N_{th}$ may be set to 4 ($N_{th}$=4).

Alternatively, for example, according to the present embodiment, the $N_{th}$ may be configured to a block size adaptively as below.

Method 4 in the present embodiment (proposed method 4)
In the case that N>2 in the current chroma block of N×M size or M×N size, $N_{th}$ may be set to 2 ($N_{th}$=2).

In the present embodiment, the case that N=2 may represent the case that the neighboring sample number for CCLM parameter calculation is 4 (i.e., 2N), and the case that $N_{th}$=1 may represent the case that only 2 (i.e., $2N_{th}$) neighboring samples are used for CCLM parameter calculation. Further, the case that N=4 may represent the case that the neighboring sample number for CCLM parameter calculation is 8 (i.e., 2N), and the case that $N_{th}$=2 may represent the case that only 4 (i.e., $2N_{th}$) neighboring samples are used for CCLM parameter calculation.

Therefore, according to method 1 above, in the case that 4 neighboring samples may be used for CCLM prediction (e.g., the case that the existing CCLM prediction mode (i.e., LM_LA mode) is applied to the chroma block of 2×N size or N×2 size, the case that LM_A mode is applied to the chroma block of 2×N size and the case that LM_L mode is applied to the chroma block of N×2 size), a CCLM parameter is calculated by using only a half of neighboring samples, and accordingly, an amount of comparison operation may be reduced to a half in the worst case. In addition, even in the case that 8 neighboring samples may be used for CCLM prediction (e.g., the case that the existing CCLM prediction mode (i.e., LM_LA mode) is applied to the chroma block of 4×N size or N×4 size, the case that LM_A mode is applied to the chroma block of 4×N size and the case that LM_L mode is applied to the chroma block of N×4 size), a CCLM parameter is calculated by using only a half of neighboring samples, an amount of comparison operation may be reduced significantly. Further, even for the case of using more neighboring samples, maximum 8 neighboring samples only are used, and the CCLM parameter calculation may be performed.

In addition, according to method 2 above, in the case that 4 neighboring samples may be used for CCLM prediction (e.g., the case that the existing CCLM prediction mode (i.e., LM_LA mode) is applied to the chroma block of 2×N size or N×2 size, the case that LM_A mode is applied to the chroma block of 2×N size and the case that LM_L mode is applied to the chroma block of N×2 size), a CCLM parameter is calculated by using only a half of neighboring samples, and accordingly, an amount of comparison operation may be reduced to a half in the worst case. Further, even for the case of using more neighboring samples, maximum 4 neighboring samples only are used, and the CCLM parameter calculation may be performed.

Furthermore, according to method 3 above, maximum 8 neighboring samples only are used, and the CCLM parameter calculation may be performed, and according to method 4 above, maximum 4 neighboring samples only are used, and the CCLM parameter calculation may be performed. That is, according to method 4, the CCLM parameter may be calculated using 4 neighboring blocks in all chroma blocks.

Method 1 to method 4 described above in the present embodiment may reduce the comparison operation of the worst case of the case that N=2 by about 50%, and since $N_{th}$ may be adaptively applied to each chroma block size, encoding loss may be minimized.

As described in method 1 to method 4, according to the present embodiment, $N_{th}$ may be configured adaptively to a block size, and through this, a reference sample number for deriving an optimized CCLM parameter may be selected.

The encoding apparatus/decoding apparatus may set the upper limit $N_{th}$ for neighboring sample selection, and then, calculate a CCLM parameter by selecting a chroma block neighboring sample as described above.

An amount of CCLM parameter calculation according to a chroma block size in the case to which the present embodiment described above is applied may be represented as the following table.

TABLE 35

| Block size | Original CCLM | Number of comparison operations | | | |
|---|---|---|---|---|---|
| | | Proposed method 1 ($N_{th}$ = 1, 2, 4) | Proposed method 2 ($N_{th}$ = 1, 2) | Proposed method 3 ($N_{th}$ = 4) | Proposed method 4 ($N_{th}$ = 2) |
| N = 2 | 8 | 4 | 4 | 8 | 8 |
| N = 4 | 16 | 8 | 8 | 16 | 8 |
| N = 8 | 32 | 16 | 8 | 16 | 8 |

TABLE 35-continued

| Block size | Original CCLM | Number of comparison operations | | | |
|---|---|---|---|---|---|
| | | Proposed method 1 ($N_{th}$ = 1, 2, 4) | Proposed method 2 ($N_{th}$ = 1, 2) | Proposed method 3 ($N_{th}$ = 4) | Proposed method 4 ($N_{th}$ = 2) |
| N = 16 | 64 | 16 | 8 | 16 | 8 |
| N = 32 | 128 | 16 | 8 | 16 | 8 |

As represented in Table 35 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the $N_{th}$ value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.

In the case that the cclm_reduced_sample_flag is 0 (false), it is configured $N_{th}$=4 for all blocks, and a CCLM parameter calculation is performed through the neighboring sample selection method of the present embodiment proposed in FIG. 8 described above.

In the case that the cclm_reduced_sample_flag is 1 (true), a CCLM parameter calculation is performed through method 2 of the present embodiment described above.

Alternatively, in the case that the information representing the applied method is transmitted in a unit of slice, picture or sequence, as described below, the method among method 1 to method 4 may be selected based on the information transmitted through a high level syntax (HLS), and based on the selected method, the CCLM parameter may be calculated.

For example, the information representing the applied method signaled through a slice header may be represented as the following table.

TABLE 36

| slice_header( ) { | Descriptor |
|---|---|
| ... | |
| cclm_reduced_sample_threshold | f(2) |
| ... | | cclm_reduced_sample_threshold may represent a syntax element of the information representing the applied method.

Alternatively, for example, the information representing the applied method signaled through a Picture Parameter Set (PPS) may be represented as the following table.

TABLE 37

| pic_parameter_set_rbsp( ) { | Descriptor |
|---|---|
| ... | |
| cclm_reduced_sample_threshold | f(2) |
| ... | |

Alternatively, for example, the information representing the applied method signaled through a Sequence Parameter Set (SPS) may be represented as the following table.

TABLE 38

| sps_parameter_set_rbsp( ) { | Descriptor |
|---|---|
| ... | |
| cclm_reduced_sample_threshold | f(2) |
| ... | |

The method selected based on cclm_reduced_sample_threshold value (i.e., a value derived by decoding cclm_reduced_sample_threshold) transmitted through the slice header, the PPS or the SPS may be derived as represented in the following table.

TABLE 39

| cclm_reduced_sample_threshold | Proposed method |
|---|---|
| 0 | 1 ($N_{th}$ = 1, 2, 4) |
| 1 | 2 ($N_{th}$ = 1, 2) |
| 2 | 3 ($N_{th}$ = 4) |
| 3 | 4 ($N_{th}$ = 2) |

Referring to Table. 39, in the case that the cclm_reduced_sample_threshold value is 0, method 1 may be selected as the method applied to the current chroma block, in the case that the cclm_reduced_sample_threshold value is 1, method 2 may be selected as the method applied to the current chroma block, in the case that the cclm_reduced_sample_threshold value is 2, method 3 may be selected as the method applied to the current chroma block, and in the case that the cclm_reduced_sample_threshold value is 3, method 4 may be selected as the method applied to the current chroma block.

The method proposed in the present embodiment may be used for the CCLM mode (LM_T mode, LM_T mode or LM_LT mode) which is an intra-prediction mode for the chroma component, and the chroma block predicted through the CCLM mode may be used for deriving a residual image through a differential from an original image in the encoding apparatus or used for reconstructed image through an addition with a residual signal in the decoding apparatus.

Meanwhile, the experimental result data of method 1 and method 2 proposed in the embodiment described above may be as below.

The following table may represent the experimental result data of method 1.

TABLE 40

| | All Intra Main10 Over VTM-3.0rc1 | | | | |
|---|---|---|---|---|---|
| | Y | U | V | EncT | DecT |
| Class A1 | −0.05% | −0.27% | −0.43% | 99% | 99% |
| Class A2 | 0.01% | 0.05% | 0.06% | 100% | 99% |
| Class B | 0.00% | −0.24% | −0.32% | 99% | 98% |
| Class C | −0.04% | −0.05% | −0.03% | 97% | 91% |
| Class E | −0.02% | −0.04% | −0.06% | 98% | 95% |
| Overall | −0.02% | −0.12% | −0.17% | 99% | 96% |
| Class D | 0.02% | 0.07% | 0.00% | 98% | 97% |

In addition, the following table may represent the experimental result data of method 2.

TABLE 41

| | All Intra Main10 Over VTM-3.0rc1 | | | | |
|---|---|---|---|---|---|
| | Y | U | V | EncT | DecT |
| Class A1 | 0.01% | −0.02% | −0.13% | 99% | 99% |
| Class A2 | 0.07% | 0.42% | 0.24% | 98% | 97% |
| Class B | 0.03% | −0.10% | −0.15% | 98% | 96% |
| Class C | −0.01% | 0.17% | 0.12% | 98% | 93% |
| Class E | −0.02% | 0.10% | −0.02% | 98% | 97% |
| Overall | 0.02% | 0.09% | 0.00% | 98% | 96% |
| Class D | 0.03% | 0.22% | 0.25% | 98% | 99% |

Table 40 and Table 41 may represent coding efficiency and operation complexity to which method 1 and method 2 are applied. In this experiment, an anchor is VTM3.0rc1, and this is All intra experimental result.

Referring to Table 40, when method 1 is applied, although an amount of CCLM parameter calculation operation is reduced ($N_{th}$=1, 2 and 4), there is no encoding loss, but rather, slight performance gain may be obtained (e.g., performance gain of Y 0.02%, Cb 0.12%, Cr 0.17%). Furthermore, referring to Table 40, it is identified that encoding and decoding complexity are decreased to 99% and 96%, respectively.

In addition, referring to Table 41, when method 2 is applied, although an amount of CCLM parameter calculation operation is reduced ($N_{th}$=1 and 2), encoding efficiency is not different from that of the existing CCLM prediction, and it is identified that encoding and decoding complexity are decreased to 99% and 96%, respectively.

Meanwhile, in the case that the information representing one of the methods is transmitted in a unit of CU, slice, picture and sequence, the encoding apparatus may determine one of method 1 to method 4 and transmit the information to the decoding apparatus as below.

In the case that the information representing whether the method of the present embodiment described above is applied is transmitted in a unit of CU, when an intra-prediction mode of the current chroma block is CCLM mode (i.e., in the case that the CCLM prediction (LM_T mode, LM_T mode or LM_LT mode) is applied to the current chroma block), the encoding apparatus may determine a side of good encoding efficiency between two following cases through RDO and transmit information of the determined method to the decoding apparatus.

1) In the case that encoding efficiency is good when the $N_{th}$ is set to 4 for all blocks and a CCLM parameter calculation is performed through the reference sample selection method of the present embodiment proposed in FIG. 8 described above, cclm_reduced_sample_flag of value 0 (false) is transmitted.

2) In the case that encoding efficiency is good when it is configured that method 2 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in Table 36, Table 37 or Table 38 described above and transmit the information representing one method among the methods. The encoding apparatus may configure the method applied among the methods by considering a size of input image or in accordance with an encoding target bitrate.

1) For example, in the case that an input image is HD quality or more, the encoding apparatus may apply method 1 ($N_{th}$=1, 2 or 4), and in the case that an input image is HD quality or less, the encoding apparatus may apply method 2 ($N_{th}$=1 or 2).

2) In the case that image encoding of high quality is required, the encoding apparatus may apply method 3 ($N_{th}$=4), and in the case that image encoding of normal quality is required, the encoding apparatus may apply method 4 ($N_{th}$=2).

The method proposed in the present embodiment may be used for a CCLM mode (LM_T mode, LM_T mode or LM_LT mode) which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 20A:
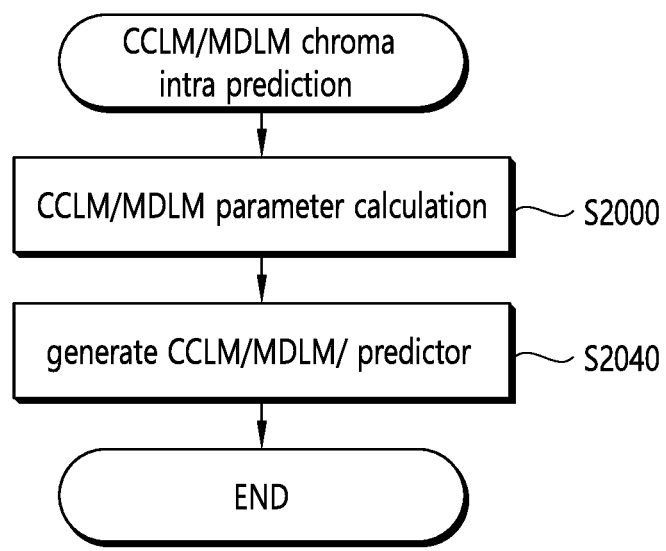
FIGS. 20a and 20b are diagrams for describing a procedure of performing CCLM prediction based on the CCLM parameters of the current chroma block derived according to method 1 of the present embodiment described above.
Figure 20B:
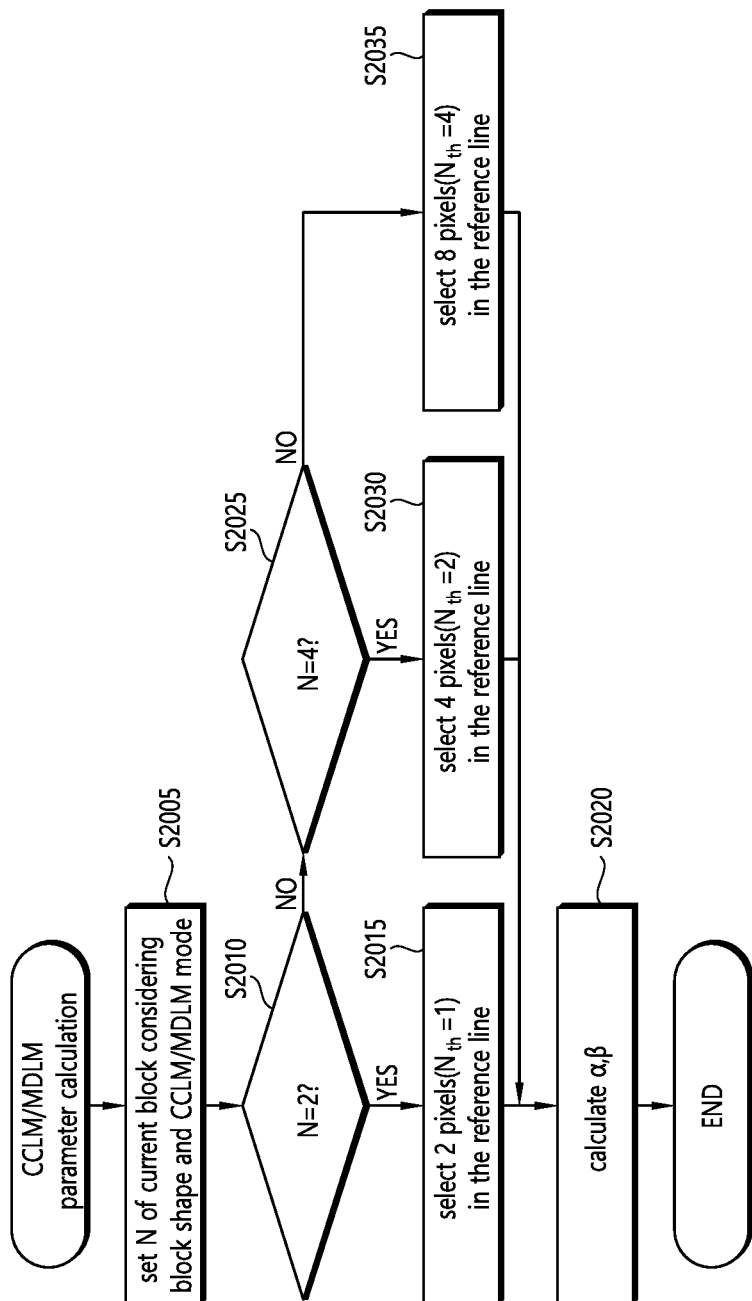

FIGS. 20a and 20b are diagrams for describing a procedure of performing CCLM prediction based on the CCLM parameters of the current chroma block derived according to method 1 of the present embodiment described above. The CCLM prediction may represent the existing CCLM prediction, that is, CCLM prediction performed based on the LM_LT mode or CCLM prediction performed based on the LM_T mode.

Referring to FIG. 20a, the encoding apparatus/decoding apparatus may calculate a CCLM parameter for the current block (step, S2000). For example, the CCLM parameter may be calculated as the present embodiment shown in FIG. 20b.

FIG. 20b may illustrate a specific embodiment of calculating the CCLM parameter. For example, referring to FIG. 20b, the encoding apparatus/decoding apparatus may set N based on a shape of the current chroma block and a CCLM prediction mode of the current chroma block (step, S2005). In the case that the LM_LT mode is applied to the current chroma block, a smaller value between a width and a height of the current chroma block may be set to N. Further, for example, in the case that the current chroma block is a non-square block of which width is greater than a height, and the LM_T mode is applied to the current chroma block, a width of the current chroma block may be set to N. In addition, for example, in the case that the current chroma block is a non-square block of which height is greater than a width, and the LM_L mode is applied to the current chroma block, a height of the current chroma block may be set to N.

Later, the encoding apparatus/decoding apparatus may determine whether the N is 2 (N=2) (step, S2010).

In the case that the N is 2, the encoding apparatus/decoding apparatus may select 2 (i.e., $2N_{th}$) neighboring samples in a reference line adjacent to the current block as a reference sample for the CCLM parameter calculation (step, S2015). Here, the $N_{th}$ may be 1 ($N_{th}$=1).

The encoding apparatus/decoding apparatus may derive the parameters α and β for the CCLM prediction based on the selected reference samples (step, S2020).

Meanwhile, in the case that the N is not 2, the encoding apparatus/decoding apparatus may determine whether the N is 4 (N=4) (step, S2025).

In the case that the N is 4, the encoding apparatus/decoding apparatus may select 4 (i.e., $2N_{th}$) neighboring samples in a reference line adjacent to the current block as a reference sample for the CCLM parameter calculation (step, S2030). Here, the $N_{th}$ may be 2 ($N_{th}$=2). Later, the encoding apparatus/decoding apparatus may derive the parameters α and β for the CCLM prediction based on the selected reference samples (step, S2020).

Alternatively, in the case that the N is not 4, the encoding apparatus/decoding apparatus may select 8 (i.e., $2N_{th}$) neighboring samples in a reference line adjacent to the current block as a reference sample for the CCLM parameter calculation (step, S2035). Here, the $N_{th}$ may be 4 ($N_{th}$=4). Later, the encoding apparatus/decoding apparatus may derive the parameters α and β for the CCLM prediction based on the selected reference samples (step, S2020).

Referring to FIG. 20a again, in the case that the parameters for CCLM prediction for the current chroma block is calculated, the encoding apparatus/decoding apparatus may perform the CCLM prediction based on the parameters and generate a prediction sample for the current chroma block (step, S2040). For example, the encoding apparatus/decoding apparatus may generate a prediction sample for the current chroma block based on the calculated parameters and Equation 1 described above in which reconstructed samples of the current luma block for the current chroma block.

Figure 21A:
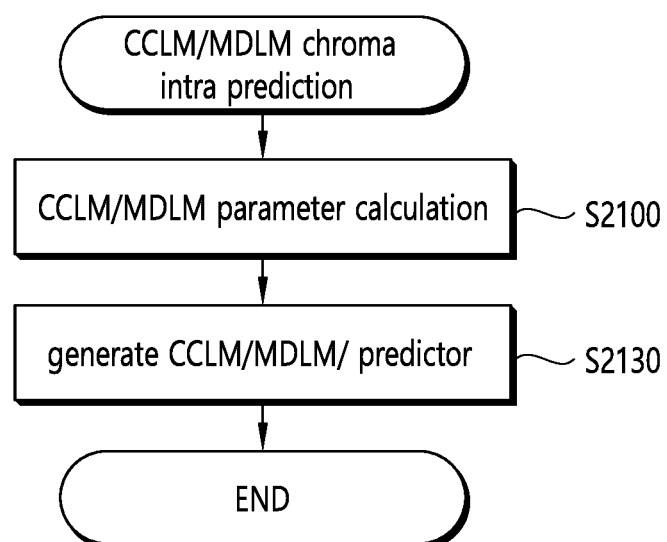
FIGS. 21a and 21b are diagrams for describing a procedure of performing CCLM prediction based on the CCLM parameters of the current chroma block derived according to method 2 of the present embodiment described above.
Figure 21B:
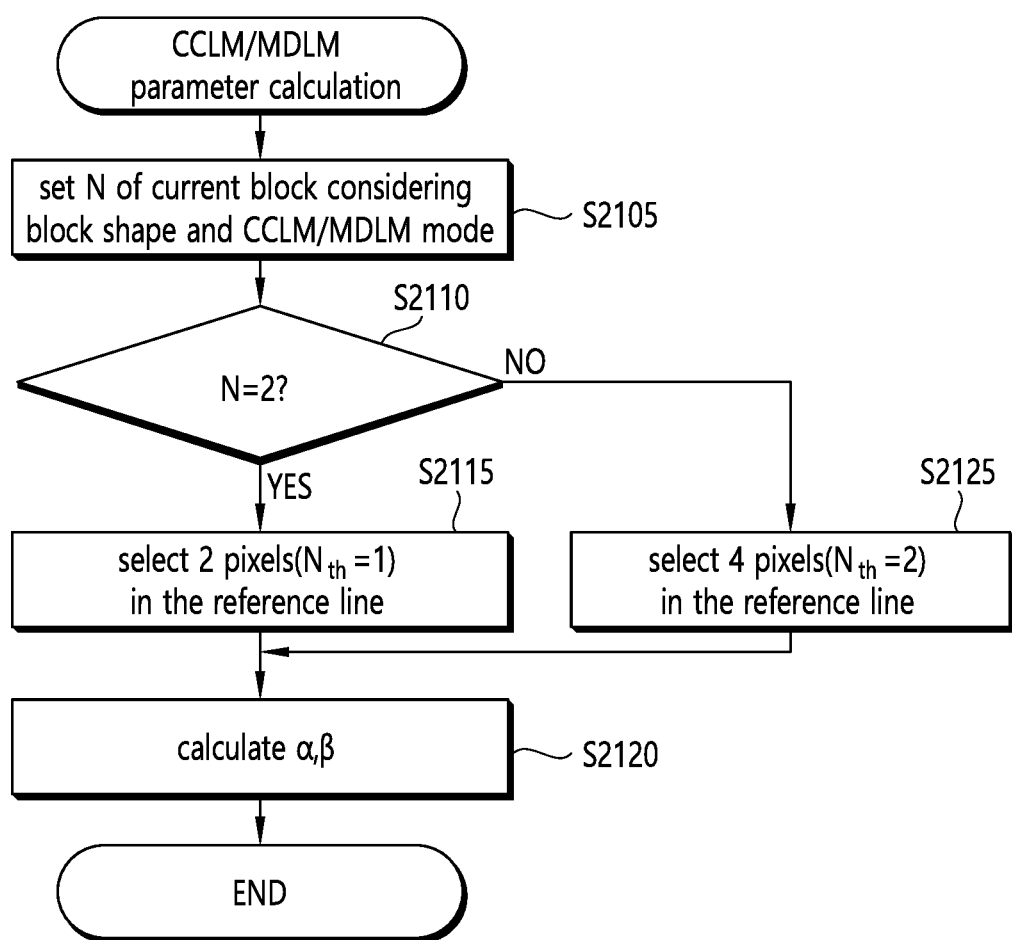

FIGS. 21a and 21b are diagrams for describing a procedure of performing CCLM prediction based on the CCLM parameters of the current chroma block derived according to method 2 of the present embodiment described above. The CCLM prediction may represent the existing CCLM prediction, that is, CCLM prediction performed based on the LM_LT mode or CCLM prediction performed based on the LM_T mode.

Referring to FIG. 21a, the encoding apparatus/decoding apparatus may calculate a CCLM parameter for the current block (step, S2100). For example, the CCLM parameter may be calculated as the present embodiment shown in FIG. 21b.

FIG. 21b may illustrate a specific embodiment of calculating the CCLM parameter. For example, referring to FIG. 21b, the encoding apparatus/decoding apparatus may set N based on a shape of the current chroma block and a CCLM prediction mode of the current chroma block (step, S2105). In the case that the LM_LT mode is applied to the current chroma block, a smaller value between a width and a height of the current chroma block may be set to N. Further, for example, in the case that the current chroma block is a non-square block of which width is greater than a height, and the LM_T mode is applied to the current chroma block, a width of the current chroma block may be set to N. In addition, for example, in the case that the current chroma block is a non-square block of which height is greater than a width, and the LM_L mode is applied to the current chroma block, a height of the current chroma block may be set to N.

Later, the encoding apparatus/decoding apparatus may determine whether the N is 2 (N=2) (step, S2110).

In the case that the N is 2, the encoding apparatus/decoding apparatus may select 2 (i.e., $2N_{th}$) neighboring samples in a reference line adjacent to the current block as a reference sample for the CCLM parameter calculation (step, S2115). Here, the $N_{th}$ may be 1 ($N_{th}$=1).

The encoding apparatus/decoding apparatus may derive the parameters α and β for the CCLM prediction based on the selected reference samples (step, S2120).

Meanwhile, in the case that the N is not 2, the encoding apparatus/decoding apparatus may select 4 (i.e., $2N_{th}$) neighboring samples in a reference line adjacent to the current block as a reference sample for the CCLM parameter calculation (step, S2125). Here, the $N_{th}$ may be 2 ($N_{th}$=2).

Later, the encoding apparatus/decoding apparatus may derive the parameters α and β for the CCLM prediction based on the selected reference samples (step, S2120).

Referring to FIG. 21a again, in the case that the parameters for CCLM prediction for the current chroma block is calculated, the encoding apparatus/decoding apparatus may perform the CCLM prediction based on the parameters and generate a prediction sample for the current chroma block (step, S2130). For example, the encoding apparatus/decoding apparatus may generate a prediction sample for the current chroma block based on the calculated parameters and Equation 1 described above in which reconstructed samples of the current luma block for the current chroma block.

Figure 22A:
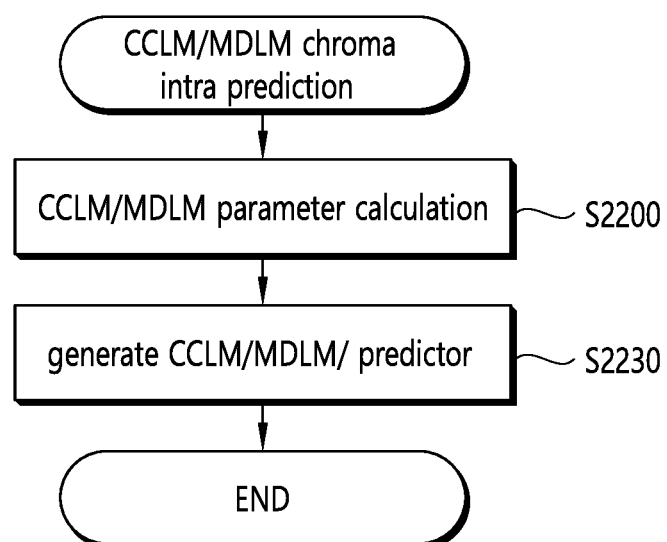
FIGS. 22a and 22b are diagrams for describing a procedure of performing CCLM prediction based on the CCLM parameters of the current chroma block derived according to method 3 of the present embodiment described above.
Figure 22B:
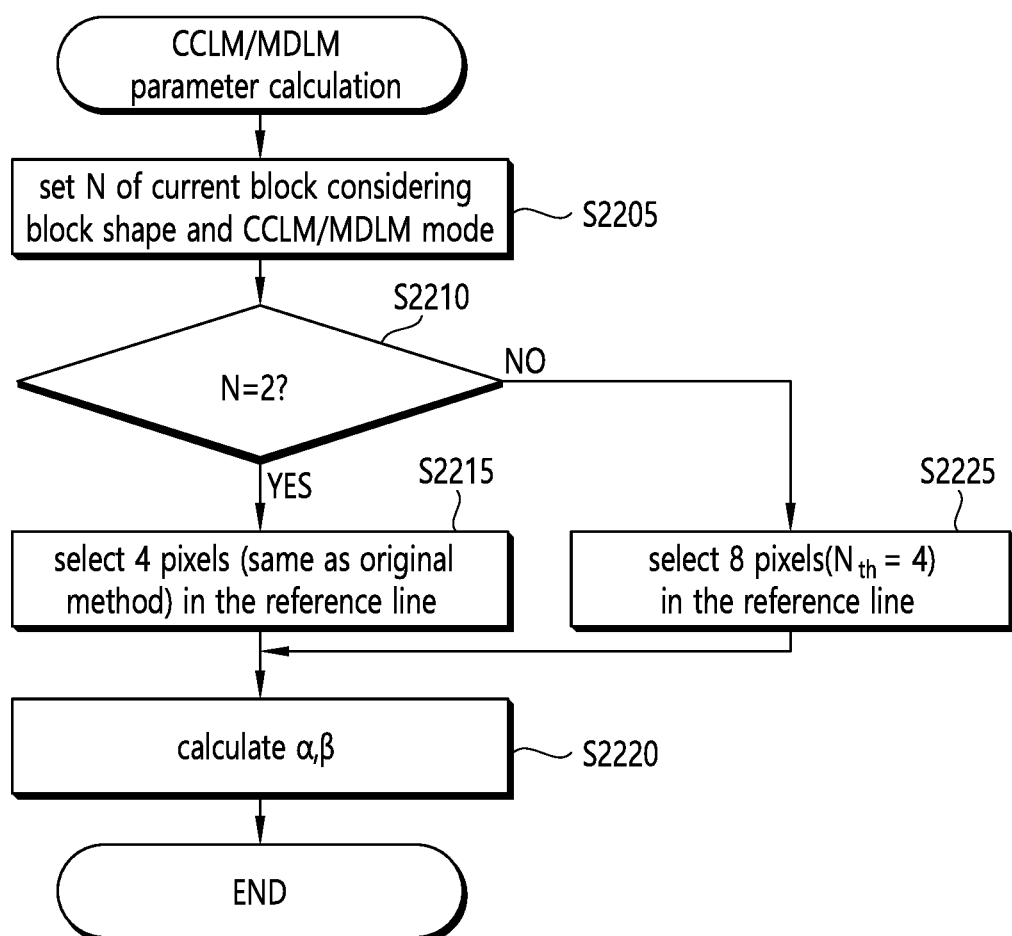

FIGS. 22a and 22b are diagrams for describing a procedure of performing CCLM prediction based on the CCLM parameters of the current chroma block derived according to method 3 of the present embodiment described above. The CCLM prediction may represent the existing CCLM prediction, that is, CCLM prediction performed based on the LM_LT mode or CCLM prediction performed based on the LM_T mode.

Referring to FIG. 22a, the encoding apparatus/decoding apparatus may calculate a CCLM parameter for the current block (step, S2200). For example, the CCLM parameter may be calculated as the present embodiment shown in FIG. 22b.

FIG. 22b may illustrate a specific embodiment of calculating the CCLM parameter. For example, referring to FIG. 22b, the encoding apparatus/decoding apparatus may set N based on a shape of the current chroma block and a CCLM prediction mode of the current chroma block (step, S2205). In the case that the LM_LT mode is applied to the current chroma block, a smaller value between a width and a height of the current chroma block may be set to N. Further, for example, in the case that the current chroma block is a non-square block of which width is greater than a height, and the LM_T mode is applied to the current chroma block, a width of the current chroma block may be set to N. In addition, for example, in the case that the current chroma block is a non-square block of which height is greater than a width, and the LM_L mode is applied to the current chroma block, a height of the current chroma block may be set to N.

Later, the encoding apparatus/decoding apparatus may determine whether the N is 2 (N=2) (step, S2210).

In the case that the N is 2, the encoding apparatus/decoding apparatus may select 4 neighboring samples in a reference line adjacent to the current block as a reference sample for the CCLM parameter calculation (step, S2215). That is, the CCLM parameter may be calculated using reference samples in the reference line.

The encoding apparatus/decoding apparatus may derive the parameters α and β for the CCLM prediction based on the selected reference samples (step, S2220).

Meanwhile, in the case that the N is not 2, the encoding apparatus/decoding apparatus may select 8 (i.e., $2N_{th}$) neighboring samples in a reference line adjacent to the current block as a reference sample for the CCLM parameter calculation (step, S2225). Here, the $N_{th}$ may be 4 ($N_{th}$=4). Later, the encoding apparatus/decoding apparatus may derive the parameters α and β for the CCLM prediction based on the selected reference samples (step, S2220).

Referring to FIG. 22a again, in the case that the parameters for CCLM prediction for the current chroma block is calculated, the encoding apparatus/decoding apparatus may perform the CCLM prediction based on the parameters and generate a prediction sample for the current chroma block (step, S2230). For example, the encoding apparatus/decoding apparatus may generate a prediction sample for the current chroma block based on the calculated parameters and Equation 1 described above in which reconstructed samples of the current luma block for the current chroma block.

Figure 23:
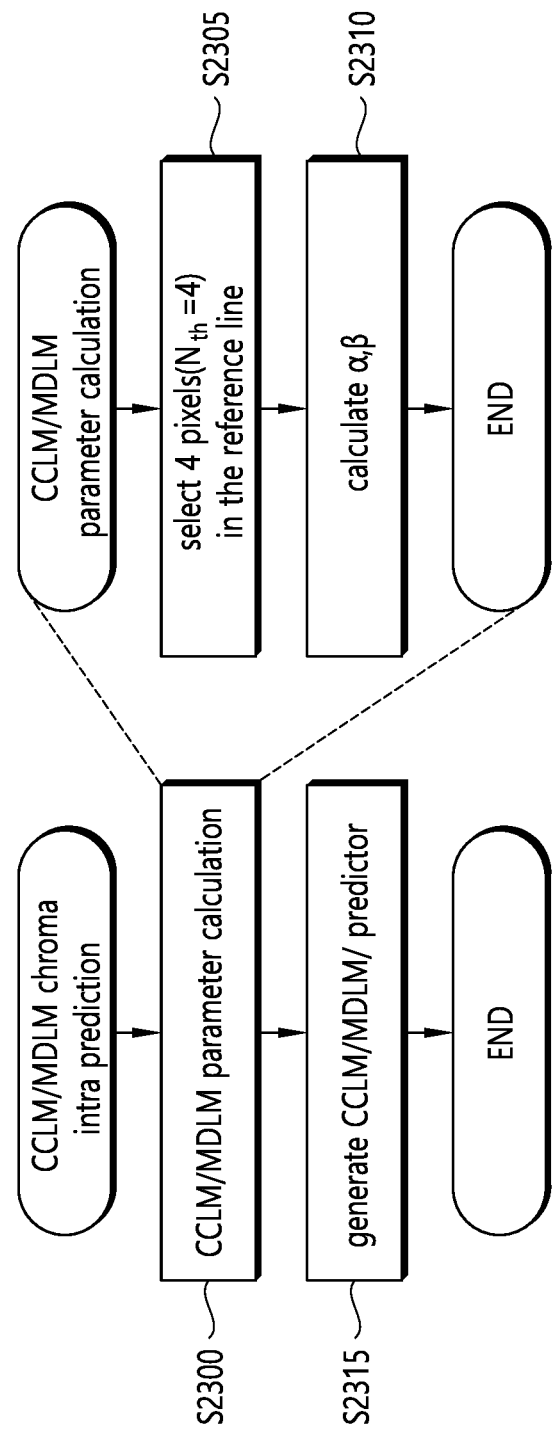
FIG. 23 is a diagram for describing a procedure of performing CCLM prediction based on the CCLM parameters of the current chroma block derived according to method 4 of the present embodiment described above.

FIG. 23 is a diagram for describing a procedure of performing CCLM prediction based on the CCLM parameters of the current chroma block derived according to method 4 of the present embodiment described above. The CCLM prediction may represent the existing CCLM prediction, that is, CCLM prediction performed based on the LM_LT mode or CCLM prediction performed based on the LM_T mode.

Referring to FIG. 23, the encoding apparatus/decoding apparatus may calculate a CCLM parameter for the current block (step, S2300).

For example, the encoding apparatus/decoding apparatus may select 4 (i.e., $2N_{th}$) neighboring samples in a reference line adjacent to the current block as a reference sample for the CCLM parameter calculation (step, S2305). Here, the $N_{th}$ may be 2 ($N_{th}$=2). Or, the $N_{th}$ may be 4 ($N_{th}$=4). Later, the encoding apparatus/decoding apparatus may derive the parameters α and β for the CCLM prediction based on the selected reference samples (step, S2310).

In the case that the parameters for CCLM prediction for the current chroma block is calculated, the encoding apparatus/decoding apparatus may perform the CCLM prediction based on the parameters and generate a prediction sample for the current chroma block (step, S2320). For example, the encoding apparatus/decoding apparatus may generate a prediction sample for the current chroma block based on the calculated parameters and Equation 1 described above in which reconstructed samples of the current luma block for the current chroma block.

Figure 24:
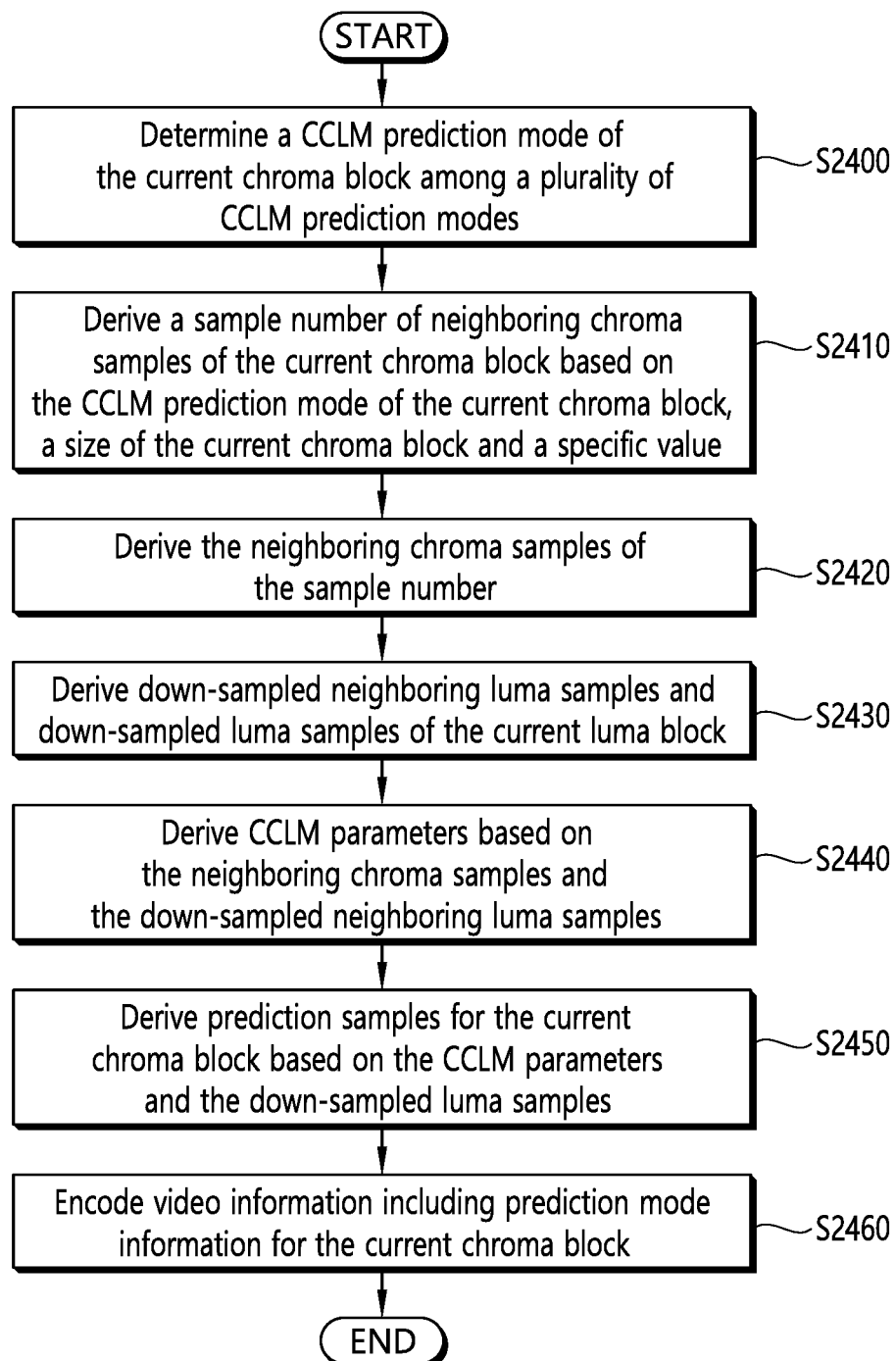
FIG. 24 schematically illustrates a video encoding method by the encoding apparatus according to the present disclosure.

FIG. 24 schematically illustrates a video encoding method by the encoding apparatus according to the present disclosure. The method shown in FIG. 24 may be performed by the encoding apparatus shown in FIG. 2. In a specific example, steps S2400 to S2460 of FIG. 24 may be performed by the predictor of the encoding apparatus, and step S2470 may be performed by the entropy encoder of the encoding apparatus. In addition, although it is not shown in the drawings, the process of deriving the residual sample for the current chroma block based on the original sample and the prediction sample for the current chroma block may be performed by the subtractor of the encoding apparatus, the process of deriving reconstructed samples for the current chroma block based on the residual samples and the prediction samples for the current chroma block may be performed by the adder of the encoding apparatus, the process of generating information for the residual for the current chroma block based on the residual sample may be performed by the transformer of the encoding apparatus, and the process of encoding information for the residual may be performed by the entropy encoder of the encoding apparatus.

The encoding apparatus determines a CCLM prediction mode of the current chroma block among a plurality of cross-component linear model (CCLM) prediction modes (step, S2400). For example, the encoding apparatus may determine an intra-prediction mode of the current chroma block based on Rate-distortion cost (RD cost; or RDO). Here, the RD cost may be derived based on Sum of Absolute Difference (SAD). The encoding apparatus may determine one of the CCLM prediction modes as the intra-prediction mode of the current chroma block based on the RD cost. That is, the encoding apparatus may determine the CCLM prediction mode of the current chroma block among the CCLM prediction modes based on the RD cost.

In addition, the encoding apparatus may encode the prediction mode information that represents the intra-prediction mode of the current chroma block, and the prediction mode information may be signaled through a bitstream. The syntax element representing the prediction mode information for the current chroma block may be intra_chroma_pred_mode. The video information may include the prediction mode information.

Further, the encoding apparatus may encode the index information indicating the CCLM prediction mode of the current chroma block and signal the index information through a bitstream. The prediction mode information may include the index information indicating the CCLM prediction mode of the current chroma block among the cross-component linear model (CCLM) prediction modes. Here, the CCLM prediction modes may include a left top LM mode, a top LM mode and a left LM mode. The left top LM mode may represent the LM_LT mode described above, the left LM mode may represent the LM_L mode described above, and the top LM mode may represent the LM_T mode described above. In addition, the encoding apparatus may encode the flag representing whether the CCLM prediction is applied to the current chroma block and signal the flag through a bitstream. The prediction mode information may include the flag representing whether the CCLM prediction is applied to the current chroma block. For example, in the case that the CCLM prediction is applied to the current chroma block, the CCLM prediction mode indicated by the index information may be derived as the CCLM prediction mode for the current chroma block.

The encoding apparatus derives a sample number of neighboring chroma samples of the current chroma block based on the CCLM prediction mode of the current chroma block, a size of the current chroma block and a specific value (step, S2410).

Here, in the case that the CCLM prediction mode of the current chroma block is the left LM mode, the neighboring chroma samples may include only the left neighboring chroma samples of the current chroma block. In addition, in the case that the CCLM prediction mode of the current chroma block is the top LM mode, the neighboring chroma samples may include only the top neighboring chroma samples of the current chroma block. Furthermore, in the case that the CCLM prediction mode of the current chroma block is the left top LM mode, the neighboring chroma samples may include the left neighboring chroma samples and the top neighboring chroma samples of the current chroma block.

For example, in the case that the CCLM prediction mode of the current chroma block is the left LM mode, the encoding apparatus may derive the sample number based on a height of the current chroma block and the specific value.

As an example, the encoding apparatus may derive the sample number of the neighboring chroma samples by comparing double of the height and double of the specific value. For example, in the case that double of the height of the current chroma block is greater than double of the specific value, the sample number may be derived as double of the specific value. Further, for example, in the case that double of the height of the current chroma block is double of the specific value or less, the sample number may be derived as double of the height.

In addition, for example, in the case that the CCLM prediction mode of the current chroma block is the top LM mode, the encoding apparatus may derive the sample number based on the width of the current chroma block and the specific value.

As an example, the encoding apparatus may derive the sample number of the neighboring chroma samples by comparing double of the width and double of the specific value. For example, in the case that double of the width of the current chroma block is greater than double of the specific value, the sample number may be derived as double of the specific value. Further, for example, in the case that double of the width of the current chroma block is double of the specific value or less, the sample number may be derived as double of the width.

In addition, for example, in the case that the CCLM prediction mode of the current chroma block is the left LM mode, the encoding apparatus may derive the sample number of the top neighboring chroma samples and the left neighboring chroma samples by comparing the width and the height with the specific value.

For example, in the case that the width and the height of the current chroma block are greater than the specific value, the sample number may be derived as the specific value.

Further, for example, in the case that the width and the height of the current chroma block are the specific value or less, the sample number may be derived as one value of the width and the height. As an example, the sample number may be derived as the smaller value of the width and the height.

Meanwhile, the specific value may be derived for deriving the CCLM parameters of the current chroma block. Here, the specific value may be referred to as a neighboring sample number upper limit or a maximum neighboring sample number. As an example, the specific value may be derived as 2. Or, the specific value may be derived as 4, 8 or 16.

In addition, for example, the specific value may be derived as a predetermined value. That is, the specific value may be derived as a value which is promised between the encoding apparatus and the decoding apparatus. In other words, the specific value may be derived as a predetermined value for the current chroma block to which the CCLM mode is applied.

Alternatively, for example, the encoding apparatus may encode information representing the specific value and signal the information representing the specific value through a bitmap. The video information may include the information representing the specific value. The information representing the specific value may be signaled in a unit of coding unit (CU). Or, the information representing the specific value may be signaled in a unit of slice header, Picture Parameter Set (PPS) or Sequence Parameter Set (SPS). That is, the information representing the specific value may be signaled with a slice header, a Picture Parameter Set (PPS) or a Sequence Parameter Set (SPS).

Alternatively, for example, the encoding apparatus may encode flag information representing whether the number of neighboring reference samples is derived based on the specific value and signal the flag information through a bitmap. The video information may include the flag information representing whether the number of neighboring reference samples is derived based on the specific value. In the case that the flag information value is 1, the flag information may represent that the number of neighboring reference samples is derived based on the specific value, and in the case that the flag information value is 0, the flag information may represent that the number of neighboring reference samples is not derived based on the specific value. In the case that the flag information value is 1, the prediction related information may include information representing the specific value, and the specific value may be derived based on the information representing the specific value. The flag information and/or the information representing the specific value may be signaled in a unit of coding unit (CU). Or, flag information and/or the information representing the specific value may be signaled in a unit of slice header, Picture Parameter Set (PPS) or Sequence Parameter Set (SPS). That is, the flag information and/or the information representing the specific value may be signaled with a slice header, a PPS or a SPS.

Alternatively, for example, the specific value may be derived based on a size of the current chroma block.

As an example, in the case that a smaller value between the width and the height of the current chroma block is 2 or less, the specific value may be derived as 1, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a smaller value between the width and the height of the current chroma block is 2 or less, the specific value may be derived as 1, in the case that a smaller value between the width and the height of the current chroma block is 4, the specific value may be derived as 2, in the case that a smaller value between the width and the height of the current chroma block is 8, the specific value may be derived as 4, and in the case that a smaller value between the width and the height of the current chroma block is greater than 8, the specific value may be derived as 8.

In addition, as an example, in the case that a smaller value between the width and the height of the current chroma block is 2 or less, the specific value may be derived as 1, and in the case that a smaller value between the width and the height of the current chroma block is greater than 2, the specific value may be derived as 2.

In addition, as an example, in the case that a smaller value between the width and the height of the current chroma block is 2 or less, the specific value may be derived as 1, and in the case that a smaller value between the width and the height of the current chroma block is greater than 2, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, and in the case that a smaller value between the width and the height of the current chroma block is greater than 2, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, in the case that a smaller value between the width and the height of the current chroma block is 4, the specific value may be derived as 4, and in the case that a smaller value between the width and the height of the current chroma block is greater than 4, the specific value may be derived as 4.

In addition, as an example, in the case that a smaller value between the width and the height of the current chroma block is 2, the specific value may be derived as 1, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a smaller value between the width and the height of the current chroma block is 2, the specific value may be derived as 1, and in the case that a smaller value between the width and the height of the current chroma block is 4, the specific value may be derived as 2.

In addition, as an example, in the case that a smaller value between the width and the height of the current chroma block is greater than 4, the specific value may be derived as 4.

In addition, as an example, in the case that a smaller value between the width and the height of the current chroma block is greater than 2, the specific value may be derived as 2.

In addition, as an example, the specific value may be derived based on whether a smaller value between the width and the height of the current block is greater than a specific threshold value. For example, in the case that a smaller value between the width and the height of the current block is greater than a specific threshold value, the specific threshold value may be derived as 4, in the case that a smaller value between the width and the height of the current block is a specific threshold value or less, the specific threshold value may be derived as 2. The specific threshold value may be derived as a predetermined value. That is, the specific threshold value may be derived as a value which is promised between the encoding apparatus and the decoding apparatus. Alternatively, for example, the encoding apparatus may encode the video information including the prediction related information, and the prediction related information may include the information representing the specific threshold value. In this case, the specific threshold value may be derived based on the information representing the specific threshold value. For example, the derived specific threshold value may be 4 or 8.

The encoding apparatus may derive the neighboring chroma samples of the sample number (step, S2420). The encoding apparatus may derive the neighboring chroma samples of the sample number.

For example, in the case that the CCLM prediction mode of the current chroma block is the left top LM mode, the encoding apparatus may derive left neighboring chroma samples of the sample number and the top neighboring chroma samples of the sample number. Particularly, in the case that a size of the current chroma block is N×M, the encoding apparatus may derive the top neighboring chroma samples of the sample number among N top neighboring chroma samples and derive the left neighboring chroma samples of the sample number among N left neighboring chroma samples. Here, N may be equal to or smaller than M.

In addition, for example, in the case that the CCLM prediction mode of the current chroma block is the top LM mode, the encoding apparatus may derive the top neighboring chroma samples of the sample number. Particularly, in the case that a size of the current chroma block is N×M, the encoding apparatus may derive the top neighboring chroma samples of the sample number among 2N top neighboring chroma samples. Here, N may be equal to or smaller than M.

In addition, for example, in the case that the CCLM prediction mode of the current chroma block is the left LM mode, the encoding apparatus may derive the left neighboring chroma samples of the sample number. Particularly, in the case that a size of the current chroma block is M×N, the encoding apparatus may derive the left neighboring chroma samples of the sample number among 2N left neighboring chroma samples. Here, N may be equal to or smaller than M.

The encoding apparatus may derive down-sampled neighboring luma samples and down-sampled luma samples of the current luma block (step, S2430). Here, the neighboring luma samples may correspond to the neighboring chroma samples. For example, the down-sampled neighboring luma samples may include down-sample top neighboring luma samples of the current luma block corresponding to the top neighboring chroma samples and down-sampled left neighboring luma samples of the current luma block corresponding to the left neighboring chroma samples.

That is, for example, the neighboring luma samples may include down-sample top neighboring luma samples of the sample number corresponding to the top neighboring chroma samples and down-sampled left neighboring luma samples of the sample number corresponding to the left neighboring chroma samples.

Alternatively, for example, the down-sampled neighboring luma samples may include down-sample top neighboring luma samples of the current luma block corresponding to the top neighboring chroma samples. That is, for example, the neighboring luma samples may include down-sample top neighboring luma samples of the sample number corresponding to the top neighboring chroma samples.

Alternatively, for example, the down-sampled neighboring luma samples may include down-sampled left neighboring luma samples of the current luma block corresponding to the left neighboring chroma samples. That is, for example, the neighboring luma samples may include down-sampled left neighboring luma samples of the sample number corresponding to the left neighboring chroma samples.

The encoding apparatus derives CCLM parameters based on the neighboring chroma samples and the down-sampled neighboring luma samples (step, S2440). The encoding apparatus may derive the CCLM parameters based on the neighboring chroma samples and the down-sampled neighboring luma samples. For example, the CCLM parameters may be derived based on Equation 3 described above. Alternatively, for example, the CCLM parameters may be derived based on Equation 4 described above.

The encoding apparatus derives prediction samples for the current chroma block based on the CCLM parameters and the down-sampled luma samples (step, S2450). The encoding apparatus may derive the prediction samples for the current chroma block based on the CCLM parameters and the down-sampled luma samples. The encoding apparatus may apply the CCLM derived by the CCLM parameters to the own-sampled luma samples and generate prediction samples for the current chroma block. That is, the encoding apparatus may perform a CCLM prediction based on the CCLM parameters and generate prediction samples for the current chroma block. For example, the prediction samples may be derived based on Equation 1 described above.

The encoding apparatus encodes video information including prediction mode information for the current chroma block (step, S2460). The encoding apparatus may encode the video information including prediction mode information for the current chroma block and signal through a bitstream. The prediction mode information may include a flag representing whether the CCLM prediction is applied to the current chroma block. Further, the prediction mode information may include index information representing a CCLM prediction mode of the current chroma block.

In addition, for example, the video information may include information representing the specific value. In addition, for example, the video information may include the information representing the specific value. In addition, for example, the video information may include flag information representing whether the number of neighboring reference samples is derived based on the specific value.

Meanwhile, although it is not shown in the drawings, the encoding apparatus may derive residual samples for the current chroma block based on the original samples and the prediction samples for the current chroma block, generate information for residual for the current chroma block based on the residual samples, and encode the information for the residual. The video information may include the information for the residual. In addition, the encoding apparatus may generate reconstructed samples for the current chroma block based on the prediction samples and the residual samples for the current chroma block.

Meanwhile, the bitstream may be transferred to the decoding apparatus through a network or (digital) storage medium. Here, the network may include a broadcasting network and/or a communication network, and the digital storage medium may include various storage media such as USB, SD, CD, DVD, blue-ray, HDD, SSD, and the like.

Figure 25:
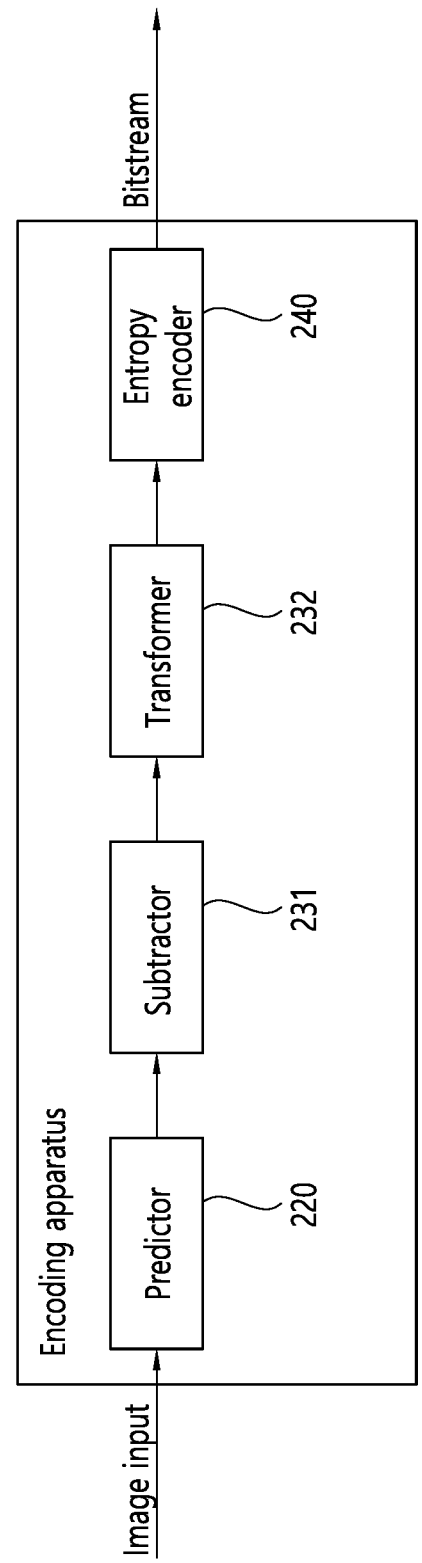
FIG. 25 schematically illustrates the encoding apparatus performing the image encoding method according to the present disclosure.

FIG. 25 schematically illustrates the encoding apparatus performing the image encoding method according to the present disclosure. The method shown in FIG. 24 may be performed by the encoding apparatus shown in FIG. 25. In a specific example, the predictor of the encoding apparatus may perform steps S2400 to S2450 of FIG. 24, and the entropy encoder of the encoding apparatus may perform step S2460 of FIG. 24. In addition, although it is not shown in the drawings, the process of deriving the residual sample for the current chroma block based on the original sample and the prediction sample for the current chroma block may be performed by the subtractor of the encoding apparatus shown in FIG. 25, the process of deriving reconstructed samples for the current chroma block based on the residual samples and the prediction samples for the current chroma block may be performed by the adder of the encoding apparatus shown in FIG. 25, the process of generating information for the residual for the current chroma block based on the residual sample may be performed by the transformer of the encoding apparatus shown in FIG. 25, and the process of encoding information for the residual may be performed by the entropy encoder of the encoding apparatus shown in FIG. 17.

Figure 26:
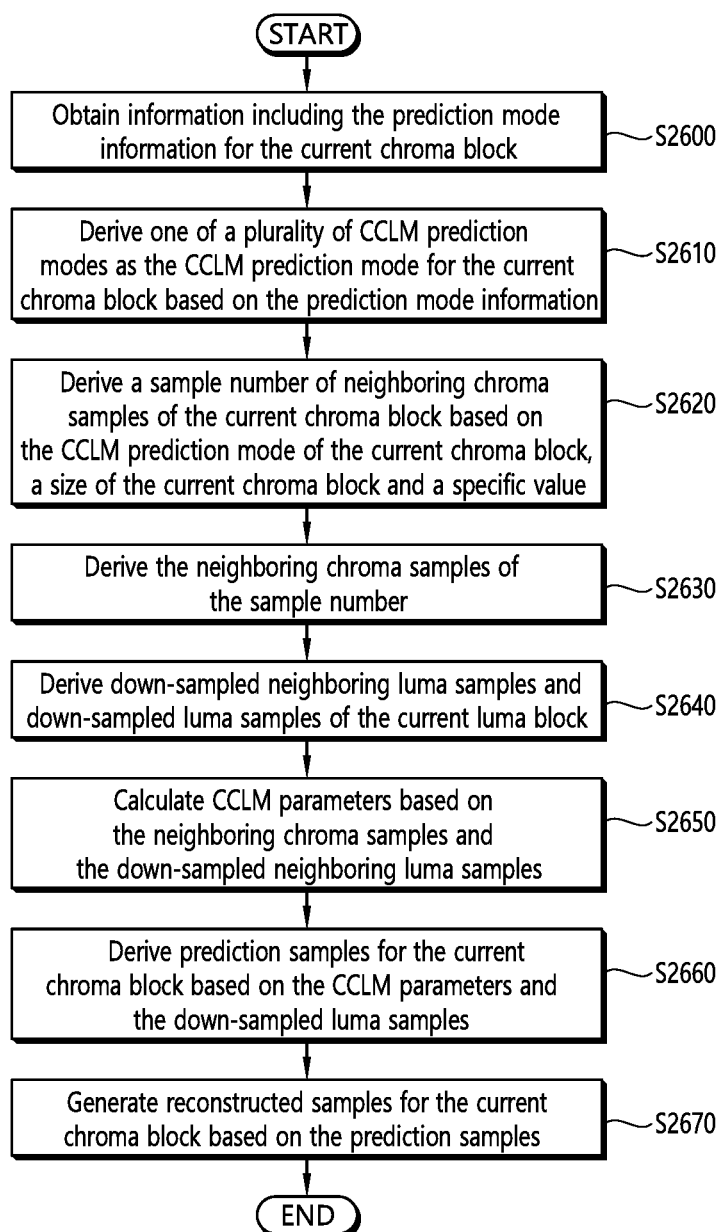
FIG. 26 schematically illustrates a video decoding method by the decoding apparatus according to the present disclosure.

FIG. 26 schematically illustrates a video decoding method by the decoding apparatus according to the present disclosure. The method shown in FIG. 26 may be performed by the decoding apparatus shown in FIG. 3. In a specific example, step S2600 of FIG. 26 may be performed by the entropy decoder of the decoding apparatus, and steps S2610 to S2650 may be performed by the predictor of the decoding apparatus, and step S1860 may be performed by the adder of the decoding apparatus. In addition, although it is not shown in the drawings, the process of acquiring information for residual of the current block through a bitstream may be performed by the entropy decoder of the decoding apparatus, and the process of deriving the residual sample for the current block based on the residual information may be performed by the inverse transformer of the decoding apparatus.

The decoding apparatus obtains information including the prediction mode information for the current chroma block (step, S2600). The decoding apparatus may receive video information including the prediction mode information for the current chroma block. The prediction mode information may represent the intra-prediction mode of the current chroma block. In addition, the syntax element representing the prediction mode information for the current chroma block may be intra_chroma_pred_mode. The video information may include the prediction mode information.

Further, the prediction mode information may include the index information indicating the CCLM prediction mode of the current chroma block among the cross-component linear model (CCLM) prediction modes. The CCLM prediction modes may include a left top LM mode, a top LM mode and a left LM mode. The left top LM mode may represent the LM_LT mode described above, the left LM mode may represent the LM_L mode described above, and the top LM mode may represent the LM_T mode described above. In addition, the prediction mode information may include the flag representing whether the CCLM prediction is applied to the current chroma block. For example, in the case that the CCLM prediction is applied to the current chroma block, the CCLM prediction mode indicated by the index information may be derived as the CCLM prediction mode for the current chroma block.

The decoding apparatus may derive one of a plurality of CCLM prediction modes as the CCLM prediction mode for the current chroma block based on the prediction mode information (step, S2610). The decoding apparatus an intra-prediction mode of the current chroma intra-prediction mode based on the prediction mode information. For example, the prediction mode information may represent the CCLM prediction mode for the current chroma block. For example, the CCLM prediction mode for the current chroma block may be derived based on the index information. Among the plurality of CCLM prediction modes, the CCLM prediction mode indicated by the index information may be derived as the CCLM prediction mode for the current chroma block.

The decoding apparatus derives a sample number of neighboring chroma samples of the current chroma block based on the CCLM prediction mode of the current chroma block, a size of the current chroma block and a specific value (step, S2620).

Here, in the case that the CCLM prediction mode of the current chroma block is the left LM mode, the neighboring chroma samples may include only the left neighboring chroma samples of the current chroma block. In addition, in the case that the CCLM prediction mode of the current chroma block is the top LM mode, the neighboring chroma samples may include only the top neighboring chroma samples of the current chroma block. Furthermore, in the case that the CCLM prediction mode of the current chroma block is the left top LM mode, the neighboring chroma samples may include the left neighboring chroma samples and the top neighboring chroma samples of the current chroma block.

For example, in the case that the CCLM prediction mode of the current chroma block is the left LM mode, the decoding apparatus may derive the sample number based on a height of the current chroma block and the specific value.

As an example, the decoding apparatus may derive the sample number of the neighboring chroma samples by comparing double of the height and double of the specific value. For example, in the case that double of the height of the current chroma block is greater than double of the specific value, the sample number may be derived as double of the specific value. Further, for example, in the case that double of the height of the current chroma block is double of the specific value or less, the sample number may be derived as double of the height.

In addition, for example, in the case that the CCLM prediction mode of the current chroma block is the top LM mode, the decoding apparatus may derive the sample number based on the width of the current chroma block and the specific value.

As an example, the decoding apparatus may derive the sample number of the neighboring chroma samples by comparing double of the width and double of the specific value. For example, in the case that double of the width of the current chroma block is greater than double of the specific value, the sample number may be derived as double of the specific value. Further, for example, in the case that double of the width of the current chroma block is double of the specific value or less, the sample number may be derived as double of the width.

In addition, for example, in the case that the CCLM prediction mode of the current chroma block is the left LM mode, the decoding apparatus may derive the sample number of the top neighboring chroma samples and the left neighboring chroma samples by comparing the width and the height with the specific value.

For example, in the case that the width and the height of the current chroma block are greater than the specific value, the sample number may be derived as the specific value.

Further, for example, in the case that the width and the height of the current chroma block are the specific value or less, the sample number may be derived as one value of the width and the height. As an example, the sample number may be derived as the smaller value of the width and the height.

Meanwhile, the specific value may be derived for deriving the CCLM parameters of the current chroma block. Here, the specific value may be referred to as a neighboring sample number upper limit or a maximum neighboring sample number. As an example, the specific value may be derived as 2. Or, the specific value may be derived as 4, 8 or 16.

In addition, for example, the specific value may be derived as a predetermined value. That is, the specific value may be derived as a value which is promised between the encoding apparatus and the decoding apparatus. In other words, the specific value may be derived as a predetermined value for the current chroma block to which the CCLM mode is applied.

Alternatively, for example, the decoding apparatus may obtain the prediction related information through a bitstream. In other words, the video information may include the information representing the specific value, and the specific value may be derived based on the information representing the specific value. The information representing the specific value may be signaled in a unit of coding unit (CU). Or, the information representing the specific value may be signaled in a unit of slice header, Picture Parameter Set (PPS) or Sequence Parameter Set (SPS). That is, the information representing the specific value may be signaled with a slice header, a Picture Parameter Set (PPS) or a Sequence Parameter Set (SPS).

Alternatively, for example, the decoding apparatus may obtain flag information representing whether the number of neighboring reference samples is derived based on the specific value through a bitstream. In other words, the video information may include the flag information representing whether the number of neighboring reference samples is derived based on the specific value, and in the case that the flag information value is 1, the video information may include the information representing the specific value, and the specific value may be derived based on the information representing the specific value. Meanwhile, in the case that the flag information value is 0, the flag information may represent that the number of neighboring reference samples is not derived based on the specific value. The flag information and/or the information representing the specific value may be signaled in a unit of coding unit (CU). Or, flag information and/or the information representing the specific value may be signaled in a unit of slice header, Picture Parameter Set (PPS) or Sequence Parameter Set (SPS). That is, the flag information and/or the information representing the specific value may be signaled with a slice header, a PPS or a SPS.

Alternatively, for example, the specific value may be derived based on a size of the current chroma block.

As an example, in the case that a smaller value between the width and the height of the current chroma block is 2 or less, the specific value may be derived as 1, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a smaller value between the width and the height of the current chroma block is 2 or less, the specific value may be derived as 1, in the case that a smaller value between the width and the height of the current chroma block is 4, the specific value may be derived as 2, in the case that a smaller value between the width and the height of the current chroma block is 8, the specific value may be derived as 4, and in the case that a smaller value between the width and the height of the current chroma block is greater than 8, the specific value may be derived as 8.

In addition, as an example, in the case that a smaller value between the width and the height of the current chroma block is 2 or less, the specific value may be derived as 1, and in the case that a smaller value between the width and the height of the current chroma block is greater than 2, the specific value may be derived as 2.

In addition, as an example, in the case that a smaller value between the width and the height of the current chroma block is 2 or less, the specific value may be derived as 1, and in the case that a smaller value between the width and the height of the current chroma block is greater than 2, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, and in the case that a smaller value between the width and the height of the current chroma block is greater than 2, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a size of the current chroma block is 2×2, the specific value may be derived as 1, in the case that a smaller value between the width and the height of the current chroma block is 2, the specific value may be derived as 2, in the case that a smaller value between the width and the height of the current chroma block is 4, the specific value may be derived as 4, and in the case that a smaller value between the width and the height of the current chroma block is greater than 4, the specific value may be derived as 4.

In addition, as an example, in the case that a smaller value between the width and the height of the current chroma block is 2, the specific value may be derived as 1, in the case that a smaller value between the width and the height of the current chroma block is 4, the specific value may be derived as 2, and in the case that a smaller value between the width and the height of the current chroma block is greater than 4, the specific value may be derived as 4.

In addition, as an example, in the case that a smaller value between the width and the height of the current chroma block is 2, the specific value may be derived as 1, and in the case that a smaller value between the width and the height of the current chroma block is 4, the specific value may be derived as 2.

In addition, as an example, in the case that a smaller value between the width and the height of the current chroma block is greater than 4, the specific value may be derived as 4.

In addition, as an example, in the case that a smaller value between the width and the height of the current chroma block is greater than 2, the specific value may be derived as 2.

In addition, as an example, the specific value may be derived based on whether a smaller value between the width and the height of the current block is greater than a specific threshold value. For example, in the case that a smaller value between the width and the height of the current block is greater than a specific threshold value, the specific threshold value may be derived as 4, in the case that a smaller value between the width and the height of the current block is a specific threshold value or less, the specific threshold value may be derived as 2. The specific threshold value may be derived as a predetermined value. That is, the specific threshold value may be derived as a value which is promised between the encoding apparatus and the decoding apparatus. Alternatively, for example, the video information may include the information representing the specific threshold value. In this case, the specific threshold value may be derived based on the information representing the specific threshold value. For example, the derived specific threshold value may be 4 or 8.

The decoding apparatus may derive the neighboring chroma samples of the sample number (step, S2630). The decoding apparatus may derive the neighboring chroma samples of the sample number.

For example, in the case that the CCLM prediction mode of the current chroma block is the left top LM mode, the decoding apparatus may derive left neighboring chroma samples of the sample number and the top neighboring chroma samples of the sample number. Particularly, in the case that a size of the current chroma block is N×M, the encoding apparatus may derive the top neighboring chroma samples of the sample number among N top neighboring chroma samples and derive the left neighboring chroma samples of the sample number among N left neighboring chroma samples. Here, N may be equal to or smaller than M.

In addition, for example, in the case that the CCLM prediction mode of the current chroma block is the top LM mode, the decoding apparatus may derive the top neighboring chroma samples of the sample number. Particularly, in the case that a size of the current chroma block is N×M, the decoding apparatus may derive the top neighboring chroma samples of the sample number among 2N top neighboring chroma samples. Here, N may be equal to or smaller than M.

In addition, for example, in the case that the CCLM prediction mode of the current chroma block is the left LM mode, the decoding apparatus may derive the left neighboring chroma samples of the sample number. Particularly, in the case that a size of the current chroma block is M×N, the decoding apparatus may derive the left neighboring chroma samples of the sample number among 2N left neighboring chroma samples. Here, N may be equal to or smaller than M.

The decoding apparatus may derive down-sampled neighboring luma samples and down-sampled luma samples of the current luma block (step, S2640). Here, the neighboring luma samples may correspond to the neighboring chroma samples. For example, the down-sampled neighboring luma samples may include down-sample top neighboring luma samples of the current luma block corresponding to the top neighboring chroma samples and down-sampled left neighboring luma samples of the current luma block corresponding to the left neighboring chroma samples.

That is, for example, the neighboring luma samples may include down-sample top neighboring luma samples of the sample number corresponding to the top neighboring chroma samples and down-sampled left neighboring luma samples of the sample number corresponding to the left neighboring chroma samples.

Alternatively, for example, the down-sampled neighboring luma samples may include down-sample top neighboring luma samples of the current luma block corresponding to the top neighboring chroma samples. That is, for example, the neighboring luma samples may include down-sample top neighboring luma samples of the sample number corresponding to the top neighboring chroma samples.

Alternatively, for example, the down-sampled neighboring luma samples may include down-sampled left neighboring luma samples of the current luma block corresponding to the left neighboring chroma samples. That is, for example, the neighboring luma samples may include down-sampled left neighboring luma samples of the sample number corresponding to the left neighboring chroma samples.

The decoding apparatus derives CCLM parameters based on the neighboring chroma samples and the down-sampled neighboring luma samples (step, S2650). The decoding apparatus may derive the CCLM parameters based on the neighboring chroma samples and the down-sampled neighboring luma samples. For example, the CCLM parameters may be derived based on Equation 3 described above. Alternatively, for example, the CCLM parameters may be derived based on Equation 4 described above.

The decoding apparatus derives prediction samples for the current chroma block based on the CCLM parameters and the down-sampled luma samples (step, S2660). The decoding apparatus may derive the prediction samples for the current chroma block based on the CCLM parameters and the down-sampled luma samples. The decoding apparatus may apply the CCLM derived by the CCLM parameters to the own-sampled luma samples and generate prediction samples for the current chroma block. That is, the decoding apparatus may perform a CCLM prediction based on the CCLM parameters and generate prediction samples for the current chroma block. For example, the prediction samples may be derived based on Equation 1 described above.

The decoding apparatus generates reconstructed samples for the current chroma block based on the prediction samples (step, S2670). The decoding apparatus may generate the reconstructed samples based on the prediction samples. For example, the decoding apparatus may receive information for a residual for the current chroma block from the bitstream. The information for the residual may include a transform coefficient for the (chroma) residual sample. The decoding apparatus may derive the residual sample (or residual sample array) for the current chroma block based on the residual information. In this case, the decoding apparatus may generate the reconstructed samples based on the prediction samples and the residual sampled. The decoding apparatus may derive a reconstructed block or a reconstructed picture based on the reconstructed sample. Later, the decoding apparatus may apply the in-loop filtering procedure such as deblocking filtering and/or SAO process to the reconstructed picture to improve subjective/objective image quality, as described above.

Figure 27:
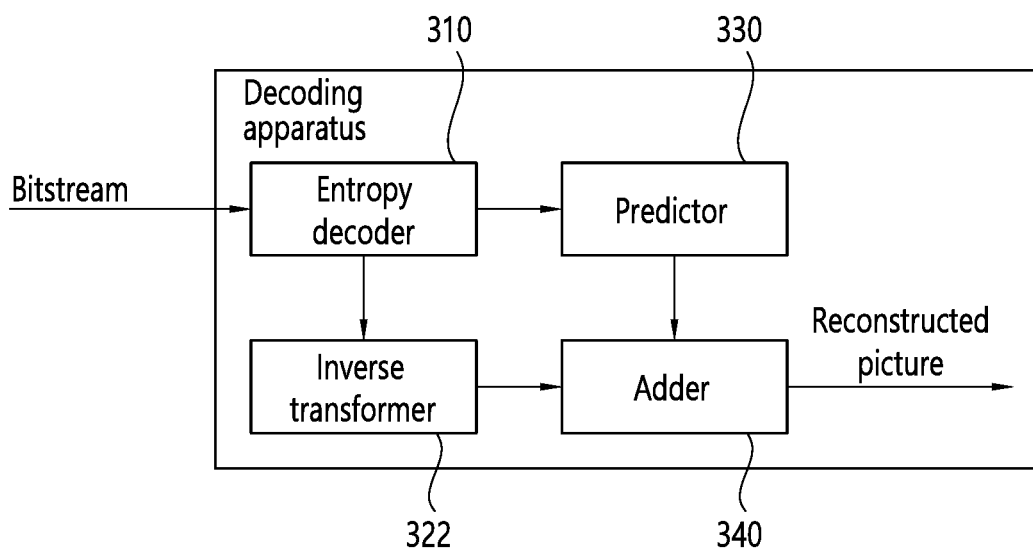
FIG. 27 schematically illustrates a decoding apparatus for performing a video decoding method according to the present disclosure.

FIG. 27 schematically illustrates a decoding apparatus for performing a video decoding method according to the present disclosure. The method shown in FIG. 26 may be performed by the decoding apparatus shown in FIG. 27. In a specific example, the entropy decoder of the decoding apparatus of FIG. 27 may perform step S2600 of FIG. 26, the predictor of the decoding apparatus of FIG. 27 may perform steps S2610 to S2660 of FIG. 26, and the adder of the decoding apparatus of FIG. 27 may perform step S2670 of FIG. 26. In addition, although it is not shown in the drawings, the process of acquiring information for residual of the current block through a bitstream may be performed by the entropy decoder of the decoding apparatus, and the process of deriving the residual sample for the current block based on the residual information may be performed by the inverse transformer of the decoding apparatus of FIG. 27.

According to the present disclosure described above, an intra-prediction is performed based on CCLM, and video coding efficiency may be improved.

In addition, according to the present disclosure, the efficiency of intra-prediction can be improved, which is based on CCLM including a plurality of LM modes, that is, multi-directional Linear Model (MDLM).

In addition, according to the present disclosure, the number of neighboring samples selected for deriving a linear model parameter for multi-directional Linear Model (MDLM) performed in a chroma block having a great size is limited to a specific number, and accordingly, intra-prediction complexity can be reduced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding device and the encoding device to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 28:
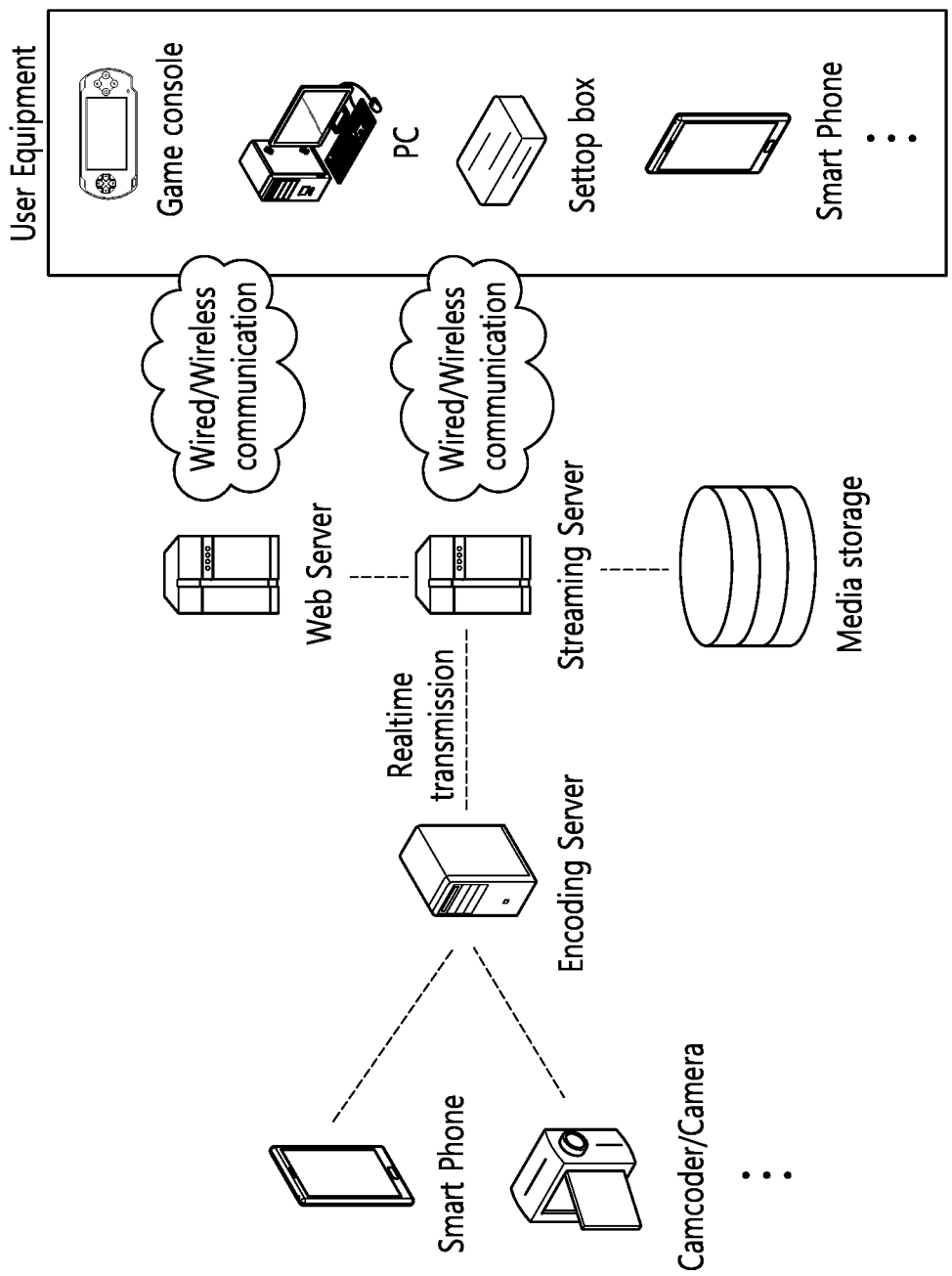
FIG. 28 illustrates a structural diagram of a contents streaming system to which the present disclosure is applied.

FIG. 28 illustrates a structural diagram of a contents streaming system to which the present disclosure is applied.

The content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

What is claimed is:

1. A video decoding method performed by a decoding apparatus, the method comprising:
   obtaining video information comprising prediction mode information for a current chroma block;
   deriving one of a plurality of cross-component linear model (CCLM) prediction modes as a CCLM prediction mode of the current chroma block;
   deriving a sample number of neighboring chroma samples of the current chroma block based on a width or height of the current chroma block and a specific value;
   deriving the neighboring chroma samples of the sample number;
   deriving down sampled neighboring luma samples related with the neighboring chroma samples and down sampled luma samples of a current luma block;
   calculating CCLM parameters based on the neighboring chroma samples and the down sampled neighboring luma samples;
   deriving prediction samples for the current chroma block based on the CCLM parameters and the down sampled luma samples; and
   generating reconstructed samples for the current chroma block based on the prediction samples,
   wherein the specific value is derived as 2,
   wherein the width or height of the current chroma block is N,
   wherein based on the N being less than or equal to the specific value, the sample number of the neighboring chroma samples is derived as 2N, and
   based on the N being greater than the specific value, the sample number of the neighboring chroma samples is derived as 4.

2. The method of claim 1, wherein the CCLM prediction modes includes a left top LM mode, a top LM mode and a left LM mode.

3. The method of claim 2, wherein
   based on the CCLM prediction mode of the current chroma block being the left LM mode and the N being greater than the specific value, the neighboring chroma samples include 4 left neighboring chroma samples of the current chroma block.

4. The method of claim 2, wherein based on the CCLM prediction mode of the current chroma block being the left top LM mode, and the N being less than or equal to the specific value, the neighboring chroma samples include N left neighboring chroma samples and N top neighboring chroma samples of the current chroma block.

5. The method of claim 3, wherein the prediction mode information includes index information indicating one of the CCLM prediction modes, and
wherein the CCLM prediction mode of the current chroma block is derived based on the index information.

6. The method of claim 1, wherein the specific value is derived as a predetermined value for the current chroma block to which the CCLM mode is applied.

7. The method of claim 2, wherein based on the CCLM prediction mode of the current chroma block being the top LM mode, and the N being less than or equal to the specific value, the neighboring chroma samples include 2N top neighboring chroma samples of the current chroma block.

8. The method of claim 2, wherein based on the CCLM prediction mode of the current chroma block being the left LM mode, and the N being less than or equal to the specific value, the neighboring chroma samples include 2N left neighboring chroma samples of the current chroma block.

9. The method of claim 8, wherein the information representing the specific value is signaled in a unit of coding unit (CU).

10. The method of claim 8, wherein the information representing the specific value is signaled with a slice header, a Picture Parameter Set (PPS) and a Sequence Parameter Set (SPS).

11. A video encoding method performed by an encoding apparatus, the method comprising:
determining a cross-component linear model (CCLM) prediction mode among a plurality of CCLM prediction modes;
deriving a sample number of neighboring chroma samples of the current chroma block based on a width or height of the current chroma block and a specific value;
deriving the neighboring chroma samples of the sample number;
deriving down sampled neighboring luma samples related with the neighboring chroma samples and down sampled luma samples of a current luma block;
deriving CCLM parameters based on the neighboring chroma samples and the down sampled neighboring luma samples;
deriving prediction samples for the current chroma block based on the CCLM parameters and the down sampled luma samples; and
encoding video information including prediction mode information for the current chroma block,
wherein the specific value is derived as 2,
wherein the width or height of the current chroma block is N,
wherein based on the N being less than or equal to the specific value, the sample number of the neighboring chroma samples is derived as 2N, and
based on the N being greater than the specific value, the sample number of the neighboring chroma samples is derived as 4.

12. The method of claim 11, wherein the CCLM prediction modes includes a left top LM mode, a top LM mode and a left LM mode, and
wherein the prediction mode information includes index information indicating the CCLM prediction mode of the current chroma block among the CCLM prediction modes.

13. A non-transitory computer-readable storage medium storing a bitstream, the bitstream, when executed, causing a decoding apparatus to perform the following steps:
obtaining video information comprising prediction mode information for a current chroma block;
deriving one of a plurality of cross-component linear model (CCLM) prediction modes as a CCLM prediction mode of the current chroma block;
deriving a sample number of neighboring chroma samples of the current chroma block based on a width or height of the current chroma block and a specific value;
deriving the neighboring chroma samples of the sample number;
deriving down sampled neighboring luma samples related with the neighboring chroma samples and down sampled luma samples of a current luma block;
calculating CCLM parameters based on the neighboring chroma samples and the down sampled neighboring luma samples;
deriving prediction samples for the current chroma block based on the CCLM parameters and the down sampled luma samples; and
generating reconstructed samples for the current chroma block based on the prediction samples,
wherein the specific value is derived as 2,
wherein the width or height of the current chroma block is N,
wherein based on the N being less than or equal to the specific value, the sample number of the neighboring chroma samples is derived as 2N, and
based on the N being greater than the specific value, the sample number of the neighboring chroma samples is derived as 4.

14. The method of claim 2, wherein
based on the CCLM prediction mode of the current chroma block being the top LM mode and the N being greater than the specific value, the neighboring chroma samples include 4 top neighboring chroma samples of the current chroma block.

15. The method of claim 2, wherein
based on the CCLM prediction mode of the current chroma block being the left top LM mode and the N being greater than the specific value, the neighboring chroma samples include the 2 left neighboring chroma samples and the 2 top neighboring chroma samples of the current chroma block.

16. The method of claim 12, wherein
based on the CCLM prediction mode of the current chroma block being the left LM mode and the N being greater than the specific value, the neighboring chroma samples include 4 left neighboring chroma samples of the current chroma block.

17. The method of claim 12, wherein
based on the CCLM prediction mode of the current chroma block being the top LM mode and the N being greater than the specific value, the neighboring chroma samples include 4 top neighboring chroma samples of the current chroma block.

18. The method of claim 12, wherein
based on the CCLM prediction mode of the current chroma block being the left top LM mode and the N being greater than the specific value, the neighboring chroma samples include the 2 left neighboring chroma samples and the 2 top neighboring chroma samples of the current chroma block.

* * * * *